United States Patent
Fujioka

(10) Patent No.: US 10,460,085 B2
(45) Date of Patent: Oct. 29, 2019

(54) TABLET COMPUTER

(71) Applicant: Mattel, Inc., El Segundo, CA (US)

(72) Inventor: Robb Fujioka, Manhattan Beach, CA (US)

(73) Assignee: MATTEL, INC., El Segundo, CA (US)

( * ) Notice: Subject to any disclaimer, the term of this patent is extended or adjusted under 35 U.S.C. 154(b) by 909 days.

(21) Appl. No.: 13/852,840

(22) Filed: Mar. 28, 2013

(65) Prior Publication Data

US 2013/0227675 A1 Aug. 29, 2013

Related U.S. Application Data

(63) Continuation-in-part of application No. 12/381,663, filed on Mar. 13, 2009, now abandoned, and a continuation-in-part of application No. 12/381,666, filed on Mar. 12, 2009, now abandoned, and a continuation-in-part of application No. 12/381,905, filed on Mar. 17, 2009, now Pat. No. 8,463,764, and (Continued)

(51) Int. Cl.
*G06F 21/12* (2013.01)
*G06F 21/30* (2013.01)
*G06F 9/44* (2018.01)

(52) U.S. Cl.
CPC .............. *G06F 21/12* (2013.01); *G06F 9/44* (2013.01); *G06F 21/30* (2013.01)

(58) Field of Classification Search
CPC .................................. G06F 21/12; G06F 21/30
See application file for complete search history.

(56) References Cited

U.S. PATENT DOCUMENTS 5,715,014 A 2/1998 Perkins et al.
5,730,602 A 3/1998 Gierhart et al.
(Continued)

FOREIGN PATENT DOCUMENTS

WO 2008008675 1/2008
WO 2008073618 6/2008

OTHER PUBLICATIONS

"Embedded Linux for microprocessors" by Tara Morris, Innovations-report.com, Apr. 16, 2004.
(Continued)

*Primary Examiner* — Jay Huang
(74) *Attorney, Agent, or Firm* — Edell, Shapiro & Finnan, LLC

(57) ABSTRACT

A tablet computer comprises an operating system, including an application framework layer and an application layer, and an overlay system. The overlay system controls access to application programs and provides a first user interface and a second operating environment associated with a second user interface. Optionally, the overlay system provides a first operating environment associated with the first user interface. The overlay system includes an access control configured to permit or deny a request for access in the second operating environment to resources and/or data. Optionally, the overlay system is executed in the application framework layer of the operating system and may comprise a hypervisor providing an operating platform comprising the first user interface, the second operating environment, and an application space providing access to the application layer.

17 Claims, 38 Drawing Sheets

Related U.S. Application Data a continuation-in-part of application No. 12/383,001, filed on Mar. 17, 2009, now abandoned, and a continuation-in-part of application No. 12/383,456, filed on Mar. 27, 2009, and a continuation-in-part of application No. 12/459,171, filed on Feb. 26, 2009, and a continuation-in-part of application No. 12/494,940, filed on Jun. 30, 2009, which is a continuation-in-part of application No. 12/381,663, filed on Mar. 13, 2009, now abandoned, application No. 13/852,840, which is a continuation-in-part of application No. 12/544,129, filed on Aug. 19, 2009, and a continuation-in-part of application No. 12/584,264, filed on Sep. 2, 2009, now abandoned, application No. 13/852,840, which is a continuation-in-part of application No. 12/584,265, filed on Sep. 2, 2009, now abandoned, and a continuation-in-part of application No. 12/584,275, filed on Sep. 2, 2009, now abandoned, and a continuation-in-part of application No. 12/586,777, filed on Sep. 28, 2009, now abandoned, and a continuation-in-part of application No. 12/586,884, filed on Sep. 29, 2009, now abandoned, and a continuation-in-part of application No. 12/586,904, filed on Sep. 29, 2009, now abandoned, which is a continuation of application No. 12/586,884, filed on Sep. 29, 2009, now abandoned, application No. 13/852,840, which is a continuation-in-part of application No. 12/592,207, filed on Nov. 20, 2009, now Pat. No. 8,533,610, which is a continuation of application No. 12/381,663, filed on Mar. 13, 2009, now abandoned, application No. 13/852,840, which is a continuation-in-part of application No. 12/592,508, filed on Nov. 25, 2009, now abandoned, which is a continuation-in-part of application No. 12/383,456, filed on Nov. 25, 2009, said application No. 13/852,840 is a continuation-in-part of application No. 12/628,046, filed on Nov. 30, 2009, now abandoned, which is a continuation-in-part of application No. 12/592,207, filed on Nov. 20, 2009, now Pat. No. 8,553,610, which is a continuation-in-part of application No. 12/381,663, filed on Mar. 13, 2009, now abandoned, application No. 13/852,840, which is a continuation-in-part of application No. 12/628,075, filed on Nov. 30, 2009, now abandoned, which is a continuation of application No. 12/592,207, filed on Nov. 20, 2009, now Pat. No. 8,533,610, and a continuation of application No. 12/494,940, filed on Jun. 30, 2009, which is a continuation of application No. 12/381,663, filed on Mar. 13, 2009, now abandoned, application No. 13/852,840, which is a continuation-in-part of application No. 12/628,031, filed on Nov. 30, 2009, now abandoned, which is a continuation-in-part of application No. 12/592,207, filed on Nov. 20, 2009, now Pat. No. 8,533,610, which is a continuation of application No. 12/381,663, filed on Mar. 13, 2009, now abandoned, application No. 13/852,840, which is a continuation-in-part of application No. 12/628,090, filed on Nov. 30, 2009, now abandoned, which is a continuation-in-part of application No. 12/592,207, filed on Nov. 20, 2009, now Pat. No. 8,533,610, which is a continuation of application No. 12/381,663, filed on Mar. 13, 2009, now abandoned, and application No. 13/852,840, which is a continuation-in-part of application No. 12/655,308, filed on Dec. 29, 2009, now abandoned, and a continuation-in-part of application No. 12/701,000, filed on Feb. 5, 2010, now abandoned, which is a continuation-in-part of application No. 12/628,046, filed on Nov. 30, 2009, now abandoned, which is a continuation-in-part of application No. 12/592,207, filed on Nov. 20, 2009, now Pat. No. 8,553,610, which is a continuation of application No. 12/381,663, filed on Mar. 13, 2009, now abandoned, application No. 13/852,840, which is a continuation-in-part of application No. 12/707,203, filed on Feb. 17, 2010, and a continuation-in-part of application No. 12/709,710, filed on Feb. 22, 2010, now abandoned, which is a continuation of application No. 12/701,000, filed on Feb. 5, 2010, now abandoned, which is a continuation-in-part of application No. 12/628,046, filed on Nov. 30, 2009, now abandoned, and a continuation-in-part of application No. 12/592,207, filed on Nov. 20, 2009, now Pat. No. 8,533,610, which is a continuation of application No. 12/381,663, filed on Mar. 13, 2009, now abandoned, application No. 13/852,840, which is a continuation-in-part of application No. 12/709,839, filed on Feb. 22, 2010, now Pat. No. 8,489,577, and a continuation-in-part of application No. 12/711,666, filed on Feb. 24, 2010, now abandoned, which is a continuation-in-part of application No. 12/383,001, filed on Mar. 17, 2009, now abandoned, application No. 13/852,840, which is a continuation-in-part of application No. 12/719,218, filed on Mar. 8, 2010, now abandoned, which is a continuation-in-part of application No. 12/628,046, filed on Nov. 30, 2009, now abandoned, which is a continuation-in-part of application No. 12/592,207, filed on Nov. 20, 2009, now Pat. No. 8,533,610, which is a continuation of application No. 12/381,663, filed on Mar. 13, 2009, now abandoned, application No. 13/852,840, which is a continuation-in-part of application No. 12/722,058, filed on Mar. 11, 2010, now Pat. No. 9,141,261, and a continuation-in-part of application No. 12/730,500, filed on Mar. 24, 2010, now Pat. No. 8,479,113, and a continuation-in-part of application No. 12/783,153, filed on May 19, 2010, now abandoned, which is a continuation-in-part of application No. 12/586,884, filed on Sep. 29, 2009, now abandoned, and a continuation-in-part of application No. 12/568,904, filed on Sep. 29, 2009, now Pat. No. 8,347,911, application No. 13/852,840, which is a continuation of application No. 12/783,172, filed on May 19, 2010, now abandoned, and a continuation-in-part of application No. 12/848,276, filed on Aug. 2, 2010, now abandoned, which is a continuation-in-part of application No. 12/719,218, filed on Mar. 8, 2010, now abandoned, which is a continuation-in-part of application No. 12/628,046, filed on Nov. 30, 2009, now abandoned, application No. 13/852,840, which is a continuation of application No. 13/841,461, filed on Mar. 15, 2013, now abandoned.

(60) Provisional application No. 61/069,336, filed on Mar. 13, 2008, provisional application No. 61/070,942, filed on Mar. 26, 2008, provisional application No. 61/069,775, filed on Mar. 17, 2008, provisional application No. 61/069,777, filed on Mar. 17, 2008, provisional application No. 61/070,611, filed on Mar. 24, 2008, provisional application No. 61/090,054, filed on Aug. 19, 2008, provisional application No. 61/106,645, filed on Oct. 20, 2008, provisional application No. 61/190,810, filed on Sep. 2, 2008, provisional application No. 61/190,809, filed on Sep. 2, 2008, provisional application No. 61/190,806, filed on Sep. 2, 2008, provisional application No. 61/100,416, filed on Sep. 26, 2008, provisional application No. 61/210,190, filed on Mar. 12, 2009, provisional application No. 61/207,980, filed on Feb. 17, 2009, provisional application No. 61/204,141, filed on Dec. 31, 2008, provisional application No. 61/208,177, filed on Feb. 20, 2009, provisional application No. 61/209,974, filed on Mar. 11, 2009, provisional application No. 61/210,936, filed on Mar. 24, 2009, provisional application No. 61/216,718, filed on May 20, 2009, provisional application No. 61/216,717, filed on May 20, 2009, provisional application No. 61/707,845, filed on Sep. 28, 2012.

(56) References Cited

U.S. PATENT DOCUMENTS

| | | |
|---|---|---|
| 5,845,260 A | 12/1998 | Nakano et al. |
| 5,884,029 A | 3/1999 | Brush et al. |
| 5,903,896 A | 5/1999 | Waldman et al. |
| 5,914,472 A | 6/1999 | Foladare et al. |
| 6,009,480 A | 12/1999 | Pleso |
| 6,067,582 A | 5/2000 | Smith et al. |
| 6,215,901 B1 | 4/2001 | Schwartz |
| 6,341,314 B1 | 1/2002 | Doganata et al. |
| 6,356,284 B1 | 3/2002 | Manduley et al. |
| 6,396,481 B1 | 5/2002 | Challa et al. |
| 6,405,364 B1 | 6/2002 | Bowman-Amuah |
| 6,421,706 B1 | 7/2002 | McNeill et al. |
| 6,442,573 B1 | 8/2002 | Schiller et al. |
| 6,480,753 B1 | 11/2002 | Calder et al. |
| 6,493,677 B1 | 12/2002 | von Rosen et al. |
| 6,502,756 B1 | 1/2003 | Fahraeus |
| 6,515,239 B2 | 2/2003 | Marchant |
| 6,526,424 B2 | 2/2003 | Kanno et al. |
| 6,539,424 B1 | 3/2003 | Dutta |
| 6,548,768 B1 | 4/2003 | Pettersson et al. |
| 6,651,044 B1 | 11/2003 | Stoneman |
| 6,663,008 B1 | 12/2003 | Pettersson et al. |
| 6,666,376 B1 | 12/2003 | Ericson |
| 6,667,695 B2 | 12/2003 | Pettersson et al. |
| 6,674,025 B1 | 1/2004 | Marchant |
| 6,674,427 B1 | 1/2004 | Pettersson et al. |
| 6,675,001 B2 | 1/2004 | Hudecek et al. |
| 6,687,745 B1 | 2/2004 | Franco et al. |
| 6,732,927 B2 | 5/2004 | Olsson et al. |
| 6,792,323 B2 | 9/2004 | Krzyzanowski et al. |
| 6,836,555 B2 | 12/2004 | Ericson et al. |
| 7,042,361 B2 | 5/2006 | Kazdin et al. |
| 7,046,139 B2 | 5/2006 | Kuhn et al. |
| 7,050,039 B1 | 5/2006 | McGloin et al. |
| 7,065,494 B1 | 6/2006 | Evans |
| 7,082,526 B2 | 7/2006 | Chang |
| 7,107,605 B2 | 9/2006 | Janik |
| 7,172,131 B2 | 2/2007 | Pettersson et al. |
| 7,216,304 B1 | 5/2007 | Gourdol et al. |
| 7,237,046 B2 | 6/2007 | Paley et al. |
| 7,248,250 B2 | 7/2007 | Pettersson et al. |
| 7,281,664 B1 | 10/2007 | Thaeler et al. |
| 7,281,668 B2 | 10/2007 | Pettersson et al. |
| 7,293,117 B2 | 11/2007 | Ohta |
| 7,298,835 B1 | 11/2007 | Perry |
| 7,302,272 B2 | 11/2007 | Ackley |
| 7,404,147 B2 | 7/2008 | Bell et al. |
| 7,424,291 B1 | 9/2008 | Lunsford et al. |
| 7,441,113 B2 | 10/2008 | Chong et al. |
| 7,490,295 B2 | 2/2009 | Chaudhri et al. |
| 7,490,332 B2 | 2/2009 | Sesma |
| 7,506,144 B2 | 3/2009 | Zhao et al. |
| 7,523,096 B2 | 4/2009 | Badros et al. |
| 7,557,939 B2 | 7/2009 | Marggraff et al. |
| 7,584,267 B2 | 9/2009 | Sane |
| 7,594,019 B2 | 9/2009 | Clapper |
| 7,670,263 B2 | 3/2010 | Ellis et al. |
| 7,680,881 B2 | 3/2010 | Knapp et al. |
| 7,783,578 B2 | 8/2010 | Mann et al. |
| 7,814,041 B2 | 10/2010 | Caporale et al. |
| 7,836,192 B2 | 11/2010 | Johnson et al. |
| 7,849,301 B2 | 12/2010 | Kwong et al. |
| 7,853,535 B2 | 12/2010 | Colella |
| 7,869,792 B1 | 1/2011 | Zhou et al. |
| 7,913,176 B1 | 3/2011 | Blattner et al. |
| 7,918,388 B2 | 4/2011 | Abecassis et al. |
| 7,922,099 B1 | 4/2011 | Schmidt et al. |
| 7,970,388 B2 | 6/2011 | Pfeffer et al. |
| 7,974,400 B1 | 7/2011 | Perry |
| 7,987,432 B1 | 7/2011 | Grechishkin et al. |
| 8,068,825 B2 | 11/2011 | Mikan et al. |
| 8,086,836 B2 | 12/2011 | Chong et al. |
| 8,091,141 B2 | 1/2012 | Evans et al. |
| 2001/0003846 A1 | 6/2001 | Rowe et al. |
| 2001/0043235 A1 | 11/2001 | Best et al. |
| 2002/0049738 A1 | 4/2002 | Epstein |
| 2002/0049806 A1 | 4/2002 | Gatz et al. |
| 2002/0052913 A1 | 5/2002 | Yamada et al. |
| 2002/0052918 A1 | 5/2002 | Rekimoto et al. |
| 2002/0070969 A1 | 6/2002 | Barksdale et al. |
| 2002/0161666 A1 | 10/2002 | Fraki et al. |
| 2002/0175918 A1 | 11/2002 | Barber |
| 2003/0005439 A1 | 1/2003 | Rovira |
| 2003/0007123 A1 | 1/2003 | Broderick et al. |
| 2003/0014423 A1 | 1/2003 | Chuah et al. |
| 2003/0071899 A1 | 4/2003 | Joao |
| 2003/0084066 A1 | 5/2003 | Waterman et al. |
| 2003/0084257 A1 | 5/2003 | Mowery et al. |
| 2003/0156134 A1 | 8/2003 | Kim |
| 2003/0172174 A1 | 9/2003 | Mihalcheon |
| 2003/0208397 A1 | 11/2003 | Van Dusen |
| 2003/0217192 A1 | 11/2003 | White et al. |
| 2004/0003071 A1 | 1/2004 | Mathew et al. |
| 2004/0003400 A1 | 1/2004 | Carney et al. |
| 2004/0042599 A1 | 3/2004 | Zaner et al. |
| 2004/0051733 A1 | 3/2004 | Katzir |
| 2004/0098360 A1 | 5/2004 | Witwer et al. |
| 2004/0102931 A1 | 5/2004 | Ellis et al. |
| 2004/0167787 A1 | 8/2004 | Lynch et al. |
| 2004/0172526 A1 | 9/2004 | Tann et al. |
| 2005/0010670 A1 | 1/2005 | Greschler et al. |
| 2005/0027543 A1 | 2/2005 | Labrou et al. |
| 2005/0038686 A1 | 2/2005 | Lauffer |
| 2005/0055244 A1 | 3/2005 | Mullan et al. |
| 2005/0056700 A1 | 3/2005 | McKinley et al. |
| 2005/0137015 A1 | 6/2005 | Rogers et al. |
| 2005/0137980 A1 | 6/2005 | Bullock et al. |
| 2005/0143174 A1 | 6/2005 | Goldman et al. |
| 2005/0149397 A1 | 7/2005 | Morgenstern et al. |
| 2005/0160368 A1 | 7/2005 | Liu et al. |
| 2005/0196046 A1 | 9/2005 | Hudnet et al. |
| 2005/0198354 A1* | 9/2005 | Holloway, Jr. ........ G06Q 10/06 709/232 |
| 2005/0198369 A1 | 9/2005 | Armstrong et al. |
| 2005/0216346 A1 | 9/2005 | Kusumoto et al. |
| 2005/0248574 A1 | 11/2005 | Ashtekar et al. |
| 2005/0283734 A1 | 12/2005 | Santoro et al. |
| 2006/0005207 A1 | 1/2006 | Louch et al. |
| 2006/0010395 A1 | 1/2006 | Aaltonen |
| 2006/0025891 A1 | 2/2006 | Budike |
| 2006/0036652 A1 | 2/2006 | Cope et al. |
| 2006/0053389 A1 | 3/2006 | Michelman |
| 2006/0069701 A1 | 3/2006 | O'Rourke, III |
| 2006/0112354 A1 | 5/2006 | Park et al. |
| 2006/0149813 A1 | 7/2006 | Janik |
| 2006/0154642 A1 | 7/2006 | Scannell |
| 2006/0184378 A1 | 8/2006 | Agarwal et al. |
| 2006/0195832 A1 | 8/2006 | Chandley et al. |
| 2006/0200493 A1 | 9/2006 | Shih |
| 2006/0200587 A1 | 9/2006 | Hindman |
| 2006/0203815 A1 | 9/2006 | Couillard |
| 2006/0218111 A1 | 9/2006 | Cohen |
| 2006/0235873 A1 | 10/2006 | Thomas |

(56) References Cited

U.S. PATENT DOCUMENTS

| | | |
|---|---|---|
| 2006/0282899 A1 | 12/2006 | Raciborski |
| 2006/0288087 A1 | 12/2006 | Sun |
| 2006/0293103 A1 | 12/2006 | Mendelsohn |
| 2006/0294465 A1 | 12/2006 | Ronen et al. |
| 2007/0013873 A9 | 1/2007 | Jacobson et al. |
| 2007/0043766 A1 | 2/2007 | Nicholas et al. |
| 2007/0064004 A1 | 3/2007 | Bonner et al. |
| 2007/0073936 A1 | 3/2007 | Cardenas et al. |
| 2007/0078718 A1 | 4/2007 | Gorodyansky |
| 2007/0101276 A1 | 5/2007 | Yuen |
| 2007/0101297 A1 | 5/2007 | Forstall et al. |
| 2007/0113181 A1 | 5/2007 | Blattner et al. |
| 2007/0113227 A1 | 5/2007 | Oney et al. |
| 2007/0118728 A1 | 5/2007 | Zhao et al. |
| 2007/0128899 A1 | 6/2007 | Mayer |
| 2007/0132733 A1 | 6/2007 | Ram |
| 2007/0136745 A1 | 6/2007 | Garbow et al. |
| 2007/0138275 A1 | 6/2007 | Hall |
| 2007/0150603 A1 | 6/2007 | Crull et al. |
| 2007/0168226 A1 | 7/2007 | Brown |
| 2007/0168357 A1 | 7/2007 | Mo |
| 2007/0168863 A1 | 7/2007 | Blattner et al. |
| 2007/0174900 A1 | 7/2007 | Marueli et al. |
| 2007/0198946 A1 | 8/2007 | Viji et al. |
| 2007/0203828 A1 | 8/2007 | Jung et al. |
| 2007/0212025 A1* | 9/2007 | Barton ............... G11B 27/105 386/261 |
| 2007/0218900 A1 | 9/2007 | Abhyanker |
| 2007/0219794 A1 | 9/2007 | Park et al. |
| 2007/0226736 A1 | 9/2007 | Johnson et al. |
| 2007/0250901 A1 | 10/2007 | McIntire et al. |
| 2007/0273711 A1 | 11/2007 | Maffei |
| 2007/0288860 A1 | 12/2007 | Ording et al. |
| 2008/0010133 A1 | 1/2008 | Pyhalammi et al. |
| 2008/0014829 A1 | 1/2008 | Dyer et al. |
| 2008/0021755 A1 | 1/2008 | Jones et al. |
| 2008/0034040 A1 | 2/2008 | Wherry et al. |
| 2008/0034314 A1 | 2/2008 | Louch et al. |
| 2008/0040426 A1 | 2/2008 | Synstelien et al. |
| 2008/0086696 A1 | 4/2008 | Sri Prakash et al. |
| 2008/0092199 A1 | 4/2008 | McCarthy et al. |
| 2008/0097843 A1 | 4/2008 | Menon et al. |
| 2008/0097975 A1 | 4/2008 | Guay et al. |
| 2008/0113797 A1 | 5/2008 | Egozy |
| 2008/0120558 A1 | 5/2008 | Nathan et al. |
| 2008/0141247 A1 | 6/2008 | Saravanan |
| 2008/0158222 A1 | 7/2008 | Li et al. |
| 2008/0163379 A1 | 7/2008 | Robinson et al. |
| 2008/0168188 A1 | 7/2008 | Yue et al. |
| 2008/0172689 A1* | 7/2008 | Feder ................. G06Q 30/02 725/28 |
| 2008/0177641 A1 | 7/2008 | Herniak et al. |
| 2008/0178230 A1 | 7/2008 | Eyal et al. |
| 2008/0195483 A1 | 8/2008 | Moore |
| 2008/0201326 A1 | 8/2008 | Cotter et al. |
| 2008/0201386 A1 | 8/2008 | Maharajh et al. |
| 2008/0215450 A1 | 9/2008 | Gates et al. |
| 2008/0229209 A1 | 9/2008 | Matsuzaki |
| 2008/0244681 A1 | 10/2008 | Gossweiler et al. |
| 2008/0250315 A1 | 10/2008 | Eronen et al. |
| 2008/0255962 A1 | 10/2008 | Chang et al. |
| 2008/0255989 A1 | 10/2008 | Altberg et al. |
| 2008/0276279 A1 | 11/2008 | Gossweiler et al. |
| 2008/0288996 A1* | 11/2008 | Walter ............... H04N 21/443 725/131 |
| 2008/0294998 A1 | 11/2008 | Pyhalammi et al. |
| 2008/0307385 A1 | 12/2008 | Dreiling et al. |
| 2008/0309675 A1 | 12/2008 | Fleury et al. |
| 2008/0320295 A1 | 12/2008 | Chong et al. |
| 2009/0006206 A1 | 1/2009 | Groe et al. |
| 2009/0006388 A1 | 1/2009 | Ives et al. |
| 2009/0011743 A1 | 1/2009 | Johanson et al. |
| 2009/0019366 A1 | 1/2009 | Abhyanker |
| 2009/0024482 A1 | 1/2009 | Synstelien et al. |
| 2009/0037291 A1 | 2/2009 | Dawson et al. |
| 2009/0037722 A1 | 2/2009 | Chong et al. |
| 2009/0037813 A1 | 2/2009 | Newman et al. |
| 2009/0063283 A1 | 3/2009 | Kusumoto et al. |
| 2009/0064052 A1 | 3/2009 | Mihalcheon |
| 2009/0070221 A1 | 3/2009 | Carmichael et al. |
| 2009/0089162 A1 | 4/2009 | Davis et al. |
| 2009/0089260 A1 | 4/2009 | Chong et al. |
| 2009/0094260 A1 | 4/2009 | Cheng et al. |
| 2009/0094517 A1 | 4/2009 | Brody et al. |
| 2009/0113349 A1 | 4/2009 | Zohar et al. |
| 2009/0115776 A1 | 5/2009 | Bimbra et al. |
| 2009/0125383 A1 | 5/2009 | Jung et al. |
| 2009/0138355 A1 | 5/2009 | Jung et al. |
| 2009/0138377 A1 | 5/2009 | Oh et al. |
| 2009/0144105 A1 | 6/2009 | Blatchley et al. |
| 2009/0144173 A1 | 6/2009 | Mo et al. |
| 2009/0144639 A1 | 6/2009 | Nims et al. |
| 2009/0150387 A1 | 6/2009 | Marchewitz |
| 2009/0152349 A1 | 6/2009 | Bonev et al. |
| 2009/0157495 A1 | 6/2009 | Cahuzac et al. |
| 2009/0158163 A1 | 6/2009 | Stephens et al. |
| 2009/0158170 A1 | 6/2009 | Narayanan et al. |
| 2009/0164641 A1 | 6/2009 | Rogers et al. |
| 2009/0199132 A1 | 8/2009 | Chong et al. |
| 2009/0215512 A1 | 8/2009 | Gannon et al. |
| 2009/0217211 A1 | 8/2009 | Hildreth et al. |
| 2009/0222805 A1 | 9/2009 | Faus et al. |
| 2009/0222808 A1 | 9/2009 | Faus et al. |
| 2009/0249451 A1 | 10/2009 | Su et al. |
| 2009/0259946 A1 | 10/2009 | Dawson et al. |
| 2009/0271205 A1 | 10/2009 | Finn et al. |
| 2009/0276704 A1 | 11/2009 | Finn et al. |
| 2009/0299891 A1 | 12/2009 | Sapir et al. |
| 2009/0300525 A1 | 12/2009 | Jolliff et al. |
| 2009/0300584 A1 | 12/2009 | Faus et al. |
| 2009/0300593 A1 | 12/2009 | Faus et al. |
| 2009/0313556 A1 | 12/2009 | Hamilton et al. |
| 2010/0017260 A1 | 1/2010 | Hamilton et al. |
| 2010/0023506 A1 | 1/2010 | Sahni et al. |
| 2010/0030578 A1 | 2/2010 | Siddique et al. |
| 2010/0050088 A1 | 2/2010 | Neustaedter et al. |
| 2010/0057772 A1 | 3/2010 | Manolescu et al. |
| 2010/0058208 A1 | 3/2010 | Finn et al. |
| 2010/0064234 A1 | 3/2010 | Schreiber et al. |
| 2010/0070377 A1 | 3/2010 | Williams et al. |
| 2010/0094713 A1 | 4/2010 | Wax |
| 2010/0121729 A1 | 5/2010 | Betzler et al. |
| 2010/0153862 A1 | 6/2010 | Schreiber |
| 2010/0161788 A1 | 6/2010 | Boss et al. |
| 2010/0162137 A1 | 6/2010 | Ganz et al. |
| 2010/0169798 A1 | 7/2010 | Hyndman et al. |
| 2010/0185640 A1 | 7/2010 | Dettinger et al. |
| 2010/0211886 A1 | 8/2010 | Forstall et al. |
| 2010/0223664 A1 | 9/2010 | Naranjo et al. |
| 2010/0306773 A1 | 12/2010 | Lee et al. |
| 2011/0010272 A1 | 1/2011 | Ur |
| 2011/0022621 A1 | 1/2011 | Luo et al. |
| 2011/0034242 A1* | 2/2011 | Aronzon ............... A63F 13/79 463/29 |
| 2011/0055726 A1 | 3/2011 | Hamilton et al. |
| 2011/0107239 A1 | 5/2011 | Adoni et al. |
| 2011/0281639 A1* | 11/2011 | Porat .................... A63F 13/80 463/23 |
| 2013/0017806 A1* | 1/2013 | Sprigg ................. H04M 1/66 455/411 |
| 2013/0227675 A1* | 8/2013 | Fujioka .................. G06F 21/30 726/16 |

OTHER PUBLICATIONS

Engadget—Phoenix Technologies launches HyperSpace "instant on" embedded OS, Nov. 6, 2007; http://www.engadget/2007/11/06/phoenix-technologies-launches-hyperspace-instant . . . ; pp. 1-3.

Engadget—DeviceVM's SplashTop: more info about the five second Linux system, Oct. 9, 2007; http://www.engadget.com/2007/10/09/devicevms-splashtop-more-info-about-the-five-seco . . . ; pp. 1-3.

(56) References Cited

OTHER PUBLICATIONS

Engadget—ASUS P5E3 Deluxe mobo boots in five seconds with embedded Linux, Oct. 8, 2007; http://engadget.com/2007/10/08/asus-p5e3-deluxe-mobo-boots-in-five-seconds-with . . . ; pp. 1-2.
InfoWorld—Phoenix Technologies tries again with instant-on apps, Nov. 5, 2007; http://www.infoworld.com/article/07/11/05/Phoenix-Technologies-tries-instant-on-apps 1 . . . ; pp. 1-2.
Kriko, Quest3d Activex app on Linux and other browers, Feb. 14, 2008, http://quest3d.com/forum/index.php?action=printpage;topic=64008.0.
Lennartson et al., Evaluation of possible SIX SIGMA Implementation including a DMAIC project. Lulea: Lulea University of Technology, 2004, ISSN 1402-1617 [retrieved on Mar. 25, 2010 (Mar. 25, 2010)] Retrieved from the Internet: <URL:http://epubl.luth.se/1402-1617/2004/070/LTU-EX-04070.
MarkR, activex under Linux, Oct. 1, 2006, http://www.phpbuilder.com/board/archive/index.php/t-2126604.html.
"Open-source Hardware" by Scott Davidson, IEEE Design & Test of Computers, copyright IEEE, 2004.
"Open Source Hardware" by Erik Rubow, Nov. 20, 2008.
U.S. Appl. No. 60/991,589, filed Nov. 30, 2007 (Interactive Avatar for Social Network Services).
U.S. Appl. No. 60/893,968, filed Mar. 9, 2007.
U.S. Appl. No. 60/975,724, filed Sep. 27, 2007.
Wikipedia article "Barebone Computer" from wikipedia.org published on Dec. 8, 2007.
"IE for Linux" hack offers one more reason not to boot Windows, Fernando Cassia, Sep. 26, 2006; <<http://www.theinquirer.net/inquirer/review/1017477/-ie-linux-hack-ofFfers-reason-boot-windows>>.

\* cited by examiner

TABLET COMPUTER

CROSS-REFERENCE TO RELATED APPLICATIONS

This application is a continuation-in-part of U.S. application Ser. No. 12/381,663, entitled "Widgetized Avatar and a Method and System of Creating and Using Same," filed Mar. 13, 2009, which claims the benefit of U.S. Provisional Application Ser. No. 61/069,336, entitled "Widgetized Avatar and a Method and System of Creating and Using Same," filed Mar. 13, 2008, the entireties of each of which are hereby incorporated herein by this reference as if fully set forth herein.

This application is a continuation-in-part of U.S. application Ser. No. 12/381,666, entitled "Hypervisor and Virtual Machine Ware," filed Mar. 12, 2009, which claims the benefit of U.S. Provisional Application Ser. No. 61/070,942, entitled "Hypervisor and Virtual Machine Ware," filed Mar. 26, 2008, the entireties of each of which are hereby incorporated herein by this reference as if fully set forth herein.

This application is a continuation-in-part of U.S. application Ser. No. 12/381,905, entitled "Social Based Search Engine, System and Method," filed Mar. 17, 2009, which claims the benefit of U.S. Provisional Application Ser. No. 61/069,775, entitled "Social Based Search Engine, System And Method," filed Mar. 17, 2008, the entireties of each of which are hereby incorporated herein by this reference as if fully set forth herein.

This application is a continuation-in-part of U.S. application Ser. No. 12/383,001, entitled "Widget Platform, System and Method," filed Mar. 17, 2009, which claims the benefit of U.S. Provisional Application Ser. No. 61/069,777, entitled "A Widgetized Platform, System and Method," filed Mar. 17, 2008, the entireties of each of which are hereby incorporated herein by this reference as if fully set forth herein.

This application is a continuation-in-part of U.S. application Ser. No. 12/383,456, entitled "Webtop and Monetization Engine, System and Method," filed Mar. 24, 2009, which claims the benefit of U.S. Provisional Application Ser. No. 61/070,611, entitled "Webtop and Monetization Engine, System and Method," filed Mar. 24, 2008, the entireties of each of which are hereby incorporated herein by this reference as if fully set forth herein.

This application is a continuation-in-part of U.S. application Ser. No. 12/459,171, entitled "System and Method for Providing Applications and Peripherals to a Fixed Price Component-based Computing Platform," filed Jun. 26, 2009, which claims the benefit of U.S. Provisional Application Ser. No. 61/090,054, entitled "Modular Application Computing Apparatus, System and Method," filed Aug. 19, 2008, and U.S. Provisional Application Ser. No. 61/106,645, entitled "System and Method for Providing Applications and Peripherals to a Fixed Price Component-based Computing Platform," filed Oct. 20, 2008, the entireties of each of which are hereby incorporated herein by this reference as if fully set forth herein.

This application is a continuation-in-part of U.S. application Ser. No. 12/494,940, entitled "Widgetized Avatar And A Method And System Of Creating And Using Same," filed Jun. 30, 2009, which claims the benefit of U.S. Provisional Application Ser. No. 61/190,810, entitled "Widgetized Avatar and a Method and System of Creating and Using Same," filed Sep. 2, 2008, and also claims priority to U.S. application Ser. No. 12/381,663, entitled "Widgetized Avatar and a Method and System of Creating and Using Same," filed Mar. 13, 2009, which claims the benefit of U.S. Provisional Application Ser. No. 61/069,336, entitled "Widgetized Avatar and a Method and System of Creating and Using Same," filed Mar. 13, 2008, the entireties of each of which are hereby incorporated herein by this reference as if fully set forth herein.

This application is a continuation-in-part of U.S. application Ser. No. 12/544,129, entitled, "Modular Application Computing Apparatus, System and Method," filed Aug. 19, 2009, which claims the benefit of U.S. Provisional Application Ser. No. 61/090,054, entitled "Modular Application Computing Apparatus, System and Method," filed Aug. 19, 2008, the entireties of each of which are hereby incorporated herein by this reference as if fully set forth herein.

This application is a continuation-in-part of U.S. application Ser. No. 12/584,264, entitled "Widgetized Avatar and a Method and System of Creating and Using Same," filed Sep. 2, 2009, which claims the benefit of U.S. Provisional Application Ser. No. 61/190,810, entitled "A Widgetized Avatar and a Method and System of Creating and Using Same," filed Sep. 2, 2008, the entireties of each of which are hereby incorporated herein by this reference as if fully set forth herein.

This application is a continuation-in-part of U.S. application Ser. No. 12/584,265, entitled "Stable Active X Linux Based Operating Environment," filed Sep. 2, 2009, which claims the benefit of U.S. Provisional Application No. 61/190,809, entitled "Stable Active X Linux Based Operating Environment," filed Sep. 2, 2008, the entireties of each of which are hereby incorporated herein by this reference as if fully set forth herein.

This application is a continuation-in-part of U.S. application Ser. No. 12/584,275, entitled "Modular Application Computing Apparatus, System and Method," filed Sep. 2, 2009, which claims the benefit of U.S. Provisional Application Ser. No. 61/190,806, entitled "Modular Application Computing Apparatus, System and Method," filed on Sep. 2, 2008, the entireties of each of which are hereby incorporated herein by this reference as if fully set forth herein.

This application is a continuation-in-part of U.S. application Ser. No. 12/586,777, entitled "Hypervisor and Webtop in a Set Top Box Environment," filed Sep. 28, 2009, which application claims the benefit of U.S. Provisional Application No. 61/100,416, entitled "Hypervisor and Webtop in a Set Top Box Environment," filed Sep. 26, 2008, the entireties of each of which are hereby incorporated herein by this reference as if fully set forth herein.

This application is a continuation-in-part of U.S. application Ser. No. 12/586,884, entitled "Device and Method for Creating, Distributing, Managing and Monetizing Widgets," filed Sep. 29, 2009, which claims the benefit of U.S. Provisional Application Ser. No. 61/210,190, entitled "A Device and Method for Creating, Distributing, Managing and Monetizing Widgets," filed Mar. 12, 2009, the entireties of each of which are hereby incorporated herein by this reference as if fully set forth herein.

This application is a continuation-in-part of U.S. application Ser. No. 12/586,904, entitled "Device and Method for Creating, Distributing, Managing and Monetizing Widgets," filed Sep. 29, 2009, which is a continuation of U.S. application Ser. No. 12/586,884, entitled "Device and Method for Creating, Distributing, Managing and Monetizing Widgets," filed Sep. 29, 2009, which claims the benefit of U.S. Provisional Application Ser. No. 61/210,190, entitled "A Device and Method for Creating, Distributing, Managing and Monetizing Widgets," filed Mar. 12, 2009, the entireties of each of which are hereby incorporated herein by this reference as if fully set forth herein.

This application is a continuation-in-part of U.S. application Ser. No. 12/592,207, entitled "Widgetized Avatar and a Method and System of Creating and Using Same," filed Nov. 20, 2009, which is a continuation of U.S. application Ser. No. 12/381,663, entitled "A Widgetized Avatar and a Method and System of Creating and Using Same," filed Mar. 13, 2009, the entireties of each of which are hereby incorporated herein by this reference as if fully set forth herein.

This application is a continuation-in-part of U.S. application Ser. No. 12/592,508, entitled "Webtop and Monetization Engine, System and Method," filed Nov. 25, 2009, which is a continuation-in-part of U.S. application Ser. No. 12/383,456, entitled "Webtop and Monetization Engine, System and Method," filed Mar. 24, 2009, the entireties of each of which are hereby incorporated herein by this reference as if fully set forth herein.

This application is a continuation-in-part of U.S. application Ser. No. 12/628,046, entitled "Virtual Marketplace Accessible to Widgetized Avatars," filed Nov. 30, 2009, which claims the benefit of U.S. Provisional Application Ser. No. 61/207,980, entitled "System And Method For Providing Expert Search In A Modular Computing System," filed Feb. 17, 2009, and is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/628,075, entitled "Widgetized Avatar and A Method and System of Virtual Commerce Including Same," filed Nov. 30, 2009, which is a continuation of U.S. application Ser. No. 12/592,207, entitled "Widgetized Avatar and a Method and System of Creating and Using Same," filed Nov. 20, 2009, and is a continuation of U.S. application Ser. No. 12/494,940, entitled "Widgetized Avatar And A Method And System Of Creating And Using Same," filed Jun. 30, 2009, which claims the benefit of U.S. Provisional Application Ser. No. 61/190,810, entitled "Widgetized Avatar And A Method And System Of Creating And Using Same," filed Sep. 2, 2008; U.S. application Ser. Nos. 12/592,207, and 12/494,940 are continuations of U.S. application Ser. No. 12/381,663, entitled "Widgetized Avatar And A Method And System Of Creating And Using Same," filed Mar. 13, 2009, which claims the benefit of U.S. Provisional Application Ser. No. 61/069,336, entitled "Widgetized Avatar And A Method And System Of Creating And Using Same," filed Mar. 13, 2008; the entireties of each of the applications enumerated in this paragraph are hereby incorporated herein by this reference as if fully set forth herein.

This application is a continuation-in-part of U.S. application Ser. No. 12/628,031, entitled "Widgetized Avatar and a Method and System of Creating and Using Same Including Storefronts," filed Nov. 30, 2009, which claims the benefit of U.S. Provisional Application Ser. No. 61/207,980, entitled "System And Method For Providing Expert Search In A Modular Computing System," filed Feb. 17, 2009, and is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/628,090, entitled "Widgetized Avatar and a Method and System of Creating and Using Same," filed Nov. 30, 2009, which is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/655,308, entitled "System and Method for Purchasing Applications and Peripherals," filed Dec. 29, 2009, which claims the benefit of U.S. Provisional Application Ser. No. 61/204,141, entitled "System and Method for Purchasing Applications and Peripherals," filed Dec. 31, 2008, the entireties of each of which are hereby incorporated herein by this reference as if fully set forth herein.

This application is a continuation-in-part of U.S. application Ser. No. 12/701,000, entitled "Virtual Marketplace Accessible To Widgetized Avatars," filed Feb. 5, 2010, which is a continuation-in-part of U.S. application Ser. No. 12/628,046, entitled "A Virtual Marketplace Accessible To Widgetized Avatars," filed Nov. 30, 2009, which claims the benefit of U.S. Provisional Application Ser. No. 61/207,980, entitled "System And Method For Providing Expert Search In A Modular Computing System," filed Feb. 17, 2009, and is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/707,203, entitled "System and Method For Providing Expert Search In A Modular Computing System," filed Feb. 17, 2010, which claims the benefit of U.S. Provisional Application Ser. No. 61/207,980, entitled "System and Method for Providing Expert Search In a Modular Computing System," filed Feb. 17, 2009, the entireties of each of which are hereby incorporated herein by this reference as if fully set forth herein.

This application is a continuation-in-part of U.S. application Ser. No. 12/709,710, entitled "Virtual Marketplace Accessible To Widgetized Avatars," filed Feb. 22, 2010, which is a continuation of U.S. application Ser. No. 12/701,000, entitled "Virtual Marketplace Accessible To Widgetized Avatars," filed Feb. 5, 2010, which is a continuation-in-part of U.S. application Ser. No. 12/628,046, entitled "A Virtual Marketplace Accessible To Widgetized Avatars," filed Nov. 30, 2009, which claims the benefit of U.S. Provisional Application Ser. No. 61/207,980, entitled "System And Method For Providing Expert Search In A Modular Computing System," filed Feb. 17, 2009, and is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/709,839, entitled "System And Method For Defined Searching And Web Crawling," filed Feb. 22, 2010, which claims the benefit of U.S. Provisional Application Ser. No. 61/208,277, entitled "System And Method For Defined Searching And Web Crawling," filed on Feb. 20, 2009, the entireties of each of which are hereby incorporated herein by this reference as if fully set forth herein.

This application is a continuation-in-part of U.S. application Ser. No. 12/711,666, entitled "Widget Platform, System and Method," filed Feb. 24, 2010, which is continuation-in-part of U.S. application Ser. No. 12/383,001, entitled "Widget Platform, System and Method," filed Mar. 17, 2009, which claims the benefit of U.S. Provisional Application Ser. No. 61/069,777, entitled "Widget Platform, System and Method," filed Mar. 17, 2008, the entireties of each of which are hereby incorporated herein by this reference as if fully set forth herein.

This application is a continuation-in-part of U.S. application Ser. No. 12/719,218, entitled "Virtual Marketplace Accessible To Widgetized Avatars," filed Mar. 8, 2010, which is a continuation-in-part of U.S. application Ser. No. 12/628,046, entitled "A Virtual Marketplace Accessible To Widgetized Avatars," filed Nov. 30, 2009, which claims the benefit of U.S. Provisional Application Ser. No. 61/207,980, entitled "System And Method For Providing Expert Search In A Modular Computing System," filed Feb. 17, 2009, and is a continuation-in-part of U.S. application Ser. No. 12/592,207, entitled "A Widgetized Avatar And A Method And System Of Creating And Using Same," filed Nov. 20, 2009, which is a continuation of U.S. application Ser. No. 12/381,663, entitled "A Widgetized Avatar And A Method And System Of Creating And Using Same," filed Mar. 13, 2009, the entireties of each of which are hereby incorporated herein by this reference as if fully set forth herein.

This application is a continuation-in-part of U.S. application Ser. No. 12/722,058, entitled "System And Method For Providing User Access," filed Mar. 11, 2010, which claims the benefit of U.S. Provisional Application Ser. No. 61/209,974, entitled "System And Method For Providing User Access," filed Mar. 11, 2009, entitled "System and Method for Providing User Access," the entireties of each of which are hereby incorporated herein by this reference as if fully set forth herein.

This application is a continuation-in-part of U.S. application Ser. No. 12/730,500, entitled, "Apparatus, System and Method for an Icon Drive Tile Bar in a Graphical User Interface," filed Mar. 24, 2010, which application claims the benefit of U.S. Provisional Application No. 61/210,936, entitled, "Apparatus, System and Method for an Icon Drive Tile Bar in a Graphical User Interface," filed Mar. 24, 2009, the entireties of each of which are hereby incorporated herein by this reference as if fully set forth herein.

This application is a continuation-in-part of U.S. application Ser. No. 12/783,153, entitled "Device and Method for Creating, Distributing, Managing and Monetizing Widgets in a Mobile Environment," filed May 19, 2010, which claims the benefit of U.S. Provisional Application Ser. No. 61/216,718, entitled "A Device And Method For Creating, Distributing, Managing And Monetizing Widgets In A Mobile Environment," filed May 20, 2009, and also claims priority to U.S. application Ser. No. 12/586,884, entitled "A Device and Method for Creating, Distributing, Managing and Monetizing Widgets," filed Sep. 29, 2009, and U.S. application Ser. No. 12/568,904, entitled "Device and Method for Creating, Distributing, Managing and Monetizing Widgets", filed Sep. 29, 2009, each of which claims the benefit of U.S. Provisional Application Ser. No. 61/210,190, entitled "A Device and Method for Creating, Distributing, Managing and Monetizing Widgets," filed Mar. 12, 2009, and U.S. application Ser. No. 12/755,818, entitled "A Device and Method For Creating, Distributing, Management and Monetizing Widgets Using Templates," filed Apr. 7, 2010, which claims the benefit of U.S. Provisional Application Ser. No. 61/212,129, entitled "A Device and Method for Creating, Distributing, Managing and Monetizing Widgets Using Templates," filed Apr. 7, 2009, the entireties of each of which are hereby incorporated herein by this reference as if fully set forth herein.

This application is a continuation-in-part of U.S. application Ser. No. 12/783,172, entitled "Device and Method for Creating, Distributing, Managing and Monetizing Widgets Including Streaming," filed May 19, 2010, which claims the benefit of U.S. Provisional Application Ser. No. 61/216,717, entitled "Device and Method for Creating, Distributing, Managing and Monetizing Widgets Including Streaming," filed May 20, 2009, the entireties of each of which are hereby incorporated herein by this reference as if fully set forth herein.

This application is a continuation-in-part of U.S. application Ser. No. 12/848,276, entitled "Virtual Marketplace Accessible To Widgetized Avatars," filed Aug. 2, 2010, which is a continuation-in-part of U.S. application Ser. No. 12/719,218, entitled "A Virtual Marketplace Accessible To Widgetized Avatars," filed Mar. 8, 2010, which is a continuation-in-part of U.S. application Ser. No. 12/628,046, entitled "A Virtual Marketplace Accessible To Widgetized Avatars," filed Nov. 30, 2009, the entireties of each of which are hereby incorporated herein by this reference as if fully set forth herein.

This application claims the benefit of U.S. Provisional Application Ser. No. 61/707,845, entitled "Tablet Computer for Children," filed Sep. 28, 2012, the entirety of which is hereby incorporated herein by this reference as if fully set forth herein.

FIELD OF THE INVENTION

The present invention relates to the field of computers and, more particularly, to user environments and access controls for operating systems and applications.

BACKGROUND OF THE INVENTION

In a tablet computer, an operating system (OS) and one or more application programs may run. The OS usually boots up to its own user interface (UI) or a customized UI that resides on top of the operating system. A single UI can be problematic for at least the following reasons:

Open/Restricted Access for Everyone: every user (e.g., Parent or Child) of the tablet computer has access to the same applications and content;

Privacy: personal information about a user may be disclosed to another user;

Security: one user may have unauthorized access to another user's information; and Content Management: content cannot be filtered or restricted based on a user profile.

Personal computers also have been susceptible to some of the same problems that tablet computer users are facing today. Known methods for addressing these problems included providing a dual OS computing environment. In a typical dual OS computing environment, a user would have to: (1) install two OSs whereby the user would select one OS prior to boot up and would have to reboot to select the other OS; (2) install and simultaneously boot up two different OSs whereby the user would switch from one OS to the other via a keystroke or action; or (3) access another OS on a virtual machine resident on the Internet or on a network.

Disadvantages of configurations requiring a reboot to switch between OSs include, without limitation, the time and inconvenience required to reboot when switching from one OS to the other OS.

Disadvantages of configurations involving different OSs running simultaneously include, without limitation, incompatibility of applications and/or content across the OSs.

Disadvantages of configurations involving accessing an OS on a remote virtual machine include, without limitation, the requirement of Internet and/or network access.

There is a need for a user environment for a tablet computer that overcomes the problems associated with a single UI while providing multiple users with customizable, manageable, user-appropriate user environments and access to applications, content, and device settings. There is also a need for user environments to encourage desired behaviors by incensing users to perform activities of educational or other constructive benefit as prerequisites to receiving access to other activities of interest to the user, such as consuming entertainment content like games, music, and/or videos.

BRIEF SUMMARY OF PREFERRED
EMBODIMENTS OF THE INVENTION

In an exemplary embodiment, a tablet computer is provided with an OS Overlay system, an Integrated Adaptive Learning System, highly granular, customizable, and remotely accessible Parental Controls, a Curated Application Store, Multiple Profile Management capabilities, and Kid-safe Browsing capabilities.

A tablet computer may comprise in some embodiments a touch screen display, one or more processors, a storage media, a wireless data communication interface, an operating system comprising an application framework layer and an application layer, and an overlay system stored in the storage media and configured to be executed by the one or more processors.

An overlay system may comprise, in some embodiments, instructions for controlling substantially all access to application programs in the application layer of the operating system, instructions for providing a first user interface, instructions for providing a second operating environment associated with a second user interface, instructions for requiring input of an authentication code to access the first user interface from the second operating environment, and instructions for accepting in the first user interface a configuration of an access control configured to permit or deny a request for access in the second operating environment to one or more of a system setting, an application program, a data, and a hardware resource, wherein the data comprises one or more of an internet resource, a text file, an image file, an audio file, a video file, and an electronic book. Optionally, the overlay system may be configured to be executed by the one or more processors in the application framework layer of the operating system. In some embodiments, the overlay system may comprise instructions for executing a hypervisor configured to provide an operating platform comprising the first user interface, the second operating environment, and an application space providing access to the application layer. The overlay system may also, optionally, include instructions for providing a first operating environment associated with the first user interface.

In some embodiments, the overlay system may be configured to default to the second operating environment responsive to one or more events such as a boot up of the tablet computer, an activation of the tablet computer from a dormant state, an activation of the tablet computer from a locked state, and an inactivity of the tablet computer for a predetermined period of time.

In some embodiments, the overlay system may further comprise instructions for providing an e-commerce interface configured to communicate with a remote content source using the wireless data communication interface, and instructions for mediating acquisition and installation on the tablet computer of a content from the remote content source.

In some embodiments, an access control may comprise instructions for intercepting user input in the second operating environment, instructions for determining whether a request for access in the second operating environment is permitted under an operative configuration of the access control, and instructions for granting the request for access in the second operating environment only if the request for access in the second operating environment is permitted under the operative configuration of the access control.

In some embodiments, an access control may comprise instructions for requiring a confirmation of compliance with one or more conditions specified in the first user interface before permitting the request for access in the second operating environment, wherein the one or more conditions specified in the first user interface comprises one or more of an event external to the tablet computer and an event in the second operating environment.

In some embodiments, the overlay system may further comprise instructions for tracking a user activity in the second operating environment, instructions for generating a report regarding the user activity in the second operating environment, and instructions for displaying in the first user interface the report regarding the user activity in the second operating environment.

In some embodiments, the overlay system may further comprise instructions for accepting a configuration of the access control from a different computer using the wireless data communication interface, and instructions for communicating the report regarding the user activity in the second operating environment to a different computer using the wireless data communication interface.

In some embodiments, the tablet computer may further comprise an adaptive learning system comprising instructions for executing at least one direct instructional component comprising at least one of a definition of a desired skill, a skill acquisition exercise, and a configuration and evaluation interface, instructions for executing at least one indirect instructional component comprising one or more reinforcements designed to encourage one or more behaviors associated with acquisition or reinforcement of the desired skill, and instructions for executing at least one technological enabler to support at least one of the direct instructional component and the indirect instructional component.

In some embodiments, the at least one indirect instructional component of the adaptive learning system is associated with a configuration of the access control requiring a confirmation of compliance with one or more conditions specified in the first user interface before a request for access in the second operating environment is permitted, wherein the one or more conditions specified in the first user interface comprises one or more of an event external to the tablet computer, an event in the second operating environment, and a performance of a skill acquisition exercise.

In some embodiments, the adaptive learning system may further comprise a dynamic learning path comprising instructions for analyzing a data captured regarding a performance of the skill acquisition exercise, instructions for determining an assessment regarding the performance of the skill acquisition exercise based on one or more predetermined criteria, and instructions for personalizing a subsequent instance of a skill acquisition exercise automatically based on the assessment. The one or more predetermined criteria may comprise one or more of a user proficiency in the desired skill and a user learning style.

In some embodiments, the adaptive learning system may further comprise instructions for awarding to a user of the second operating environment a virtual award responsive to performance of the one or more behaviors associated with acquisition or reinforcement of the desired skill, wherein the virtual award comprises one or more of a virtual credit and a badge, and instructions for mediating an exchange of the virtual award for one or more of a status, a usage time allotment, and an authorization to access a content.

In some embodiments, the adaptive learning system may further comprise instructions for awarding to a user of the second operating environment a supplemental virtual award responsive to performance of a desired award behavior, wherein the desired award behavior comprises one or more of maintaining some or all of the virtual award for a predetermined period of time and conforming with predetermined goals regarding allocation of virtual awards.

In some embodiments, the at least one technological enabler of the adaptive learning system may comprise at least one of instructions for capturing an input data from an input source, the input source comprising one or more of the touch screen display and an alternate input source operable to capture and transmit input data for processing by the one or more processors, wherein the alternate input source comprises one or more of a keyboard, a touch sensitive pad, a mouse, a track ball, a pen device, a joystick, a game controller, a motion detecting device, a microphone, and a camera; instructions for capturing an offline use data reflecting use of the tablet computer in an offline mode; and instructions for using the wireless data communication interface to automatically transmit the offline use data reflecting use of the tablet computer in an offline mode to a different computer when the tablet computer is in an online mode.

Various embodiments may incorporate one or more of these and other features described herein while remaining within the spirit and scope of the invention. Further features of the tablet computer, its nature, and various advantages and embodiments will be more apparent by reference to the accompanying drawings and the following detailed description.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Figure 1:
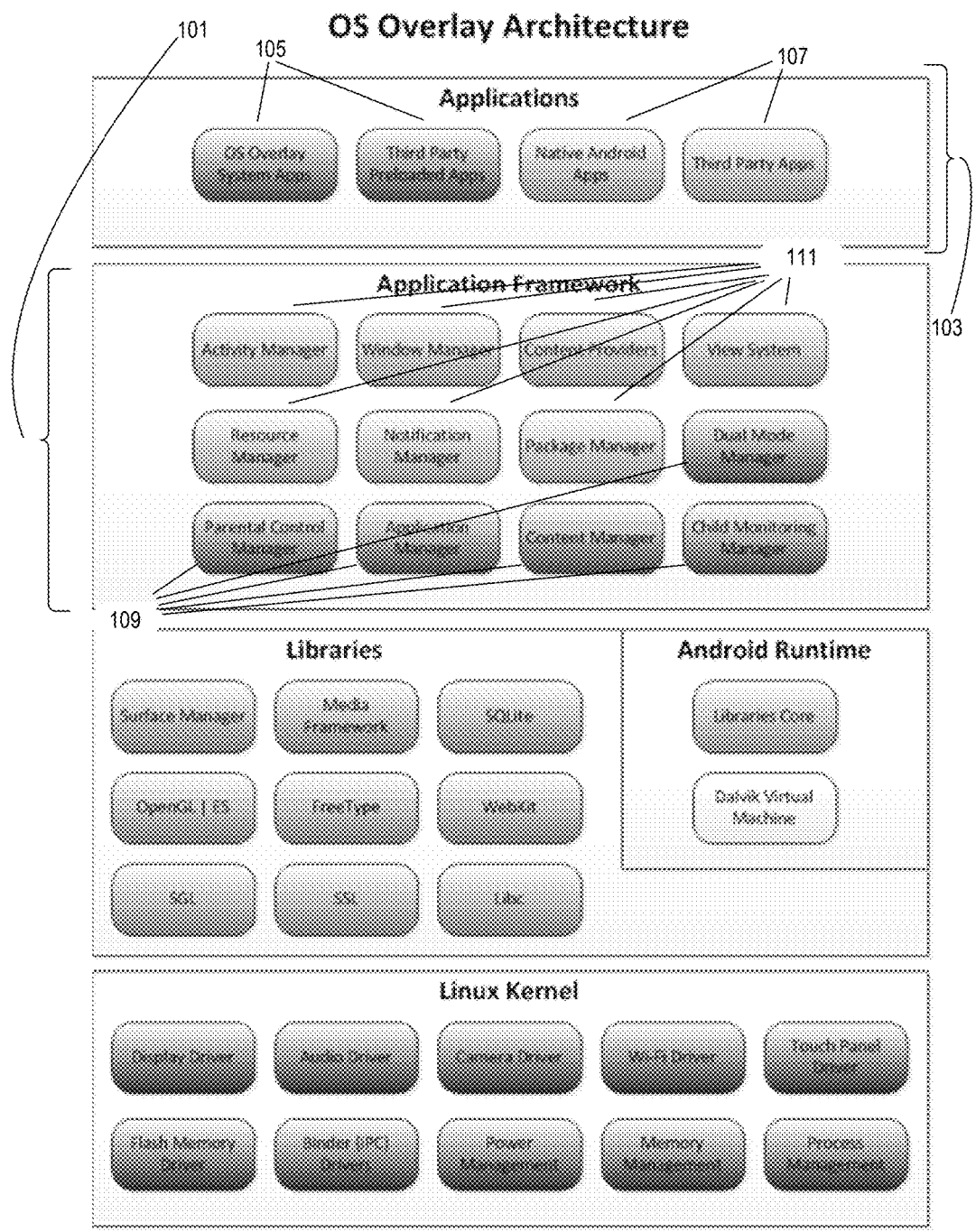
FIG. 1 is a diagram illustrating a core architecture of the OS Overlay system, according to some embodiments.

In the following description, numerous specific details have been set forth to provide a more thorough understanding of some embodiments of the present invention. However, it will be appreciated by those skilled in the art that embodiments of the invention may be practiced without such specific details or with different implementations for such details. Additionally some well known structures have not been shown in detail to avoid unnecessarily obscuring the present invention.

Operating System Overlay and Multi-Function User Interface on a Tablet Computer

According to some embodiments, a computer's operating system (OS) is provided with at least two different user interfaces (UIs), whereby each UI may be customized based on a specific user type or profile. For example, in the context of a family group, user interface types or profiles may include one or more interfaces or profiles for children ("Kid Mode") and one or more interfaces or profiles for parents ("Parent Mode"). Exemplary embodiments described herein refer to Parent/Parent Mode and Kid/Kid Mode to represent examples of different user types and user interfaces. However, such descriptions are solely for illustrative purposes and shall not limit the scope of the invention, and such embodiments may be useful in any multi-user environment that may benefit from user profile-based customization of UI and access to applications and content. Other users and user types may be used with embodiments of the invention without departing from the spirit of the invention. In some embodiments, each type of UI is different in visual appearance and in work flow. Embodiments may be implemented with any OS, including mobile OSs, such as Android, iOS, bada, BlackBerry OS, S40, and Windows Phone, as well as desktop or laptop OSs, such as Windows and Mac OS. For illustrative purposes, some exemplary embodiments described herein are implemented with the Android OS for mobile devices.

In an exemplary Kid Mode, a user is provided with a "kid-friendly" environment permitting access to curated (e.g., previously identified as appropriate for an age or gender group) apps and games specifically made for kids; to browse Web content specific to their age and gender; to earn virtual currency by performing activities on the tablet; to spend virtual currency in an app store for kids; and to improve their educational skills through core-curriculum, state-standardized lessons.

In an exemplary Parent Mode, a user is provided with the default OS environment that allows them to have unrestricted access to all applications and content; to access the tablet's settings; to configure access controls for other users (e.g., Kid Mode); and to have unrestricted access to content acquisition facilities such as an online app store, music store or video store; and to make purchases with one-click.

According to some embodiments, a parent, or supervisory user, can monitor their child's time and usage of content in Kid Mode by viewing reports and analytics. In addition, a parent can allow or restrict their child's access in Kid Mode to certain apps, games or types of content via a series of on/off switches or other indications of whether access is enabled. In some embodiments, monitoring and configuration capabilities may be implemented via an online Parental Dashboard that is accessible via the Internet.

An advantage of combining a single OS with multiple different UIs is that one environment can control or be a supervisor of the other environment. Another advantage is that each user of the tablet can have his or her own UI and user experience.

OS Overlay

The architecture of the OS Overlay is vastly different from other solutions. According to some exemplary embodiments, the core architecture is as shown in FIG. 1. As shown, the OS Overlay is built on an existing OS Core, with OS Overlay system manager libraries added to the Application Framework level 101 of the existing OS Core, and additional applications included in the Application level 103 of the existing OS Core. As shown in the diagram of FIG. 1, native and third party OS Overlay applications 105 are included in the OS Core's Applications layer alongside native and third party Android applications 107. In the Application framework layer 100, OS Overlay system manager libraries 109 are included alongside Android system manager libraries 111.

The OS Overlay architecture enables a single OS to provide multiple switchable and customizable UIs supported and managed by a Mode Manager. In exemplary embodiments for use in a family group, switchable UI modes allow kids to use the tablet device in a protected Kid Mode environment, while allowing parents to manage Kid Mode's access to apps, content, and settings with the Parental Control Manager in Parent Mode and/or an online Parental Dashboard. Parents can also enjoy unrestricted access to the full capability of the OS in Parent Mode. The OS Overlay architecture also allows an embedded parental control that helps safeguard what kids can access within a safe environment, as well as providing a monitoring mechanism within the OS level to provide access, usage, and time spent on apps by the kid with the device.

At the Application Framework level, the OS Overlay system includes the following features and elements:

1. Mode Manager

In some exemplary embodiments, Mode Manager provides advantages over tablets shared by kids and parents using the same interface without a separate controlled environment for kids. Typically in such cases, controls are available but are applied indiscriminately in what may be referred to as a "locked down" mode, or the controls are turned off, resulting in an uncontrolled environment in which any user can access content and change system settings regardless of whether such activities are appropriate for a given user. Mode Manager provides for switchable user interface modes, including Parent Mode and Kid Mode.

2. Parental Control Manager

In exemplary embodiments, Parent Control Manager provides the ability to manage and limit access for applications, content, and other settings in Kid Mode.

3. Child Monitoring Manager

In exemplary embodiments, Child Monitoring Manager offers access, usage, and time tracking for all activities in Kid Mode. In some embodiments, the Child Monitoring Manager is linked with an online Parental Dashboard service accessible via the Internet to provide real time web based reports. In some embodiments, the Child Monitoring Manager further provides monitoring of results of the use of contents, tests, performance assessments, and other user interaction with content. In addition to being used immediately for use in conjunction with an adaptive learning system, as described herein, the monitored results can also be uploaded to a remote facility such as a server where more extensive performance analysis can be conducted.

4. Application Manager

In exemplary embodiments, Application Manager provides the ability to manage and limit access for applications via Add Apps interface based on individual user profiles. This allows authorized sets of applications to be made available in the Kid Mode. The authorized sets of applications available in Kid Mode may be curated by a service provider or by a parent or other authority figure so that they are identified to be appropriate for an age or gender group or other subgroup of users.

5. Content Manager

In exemplary embodiments, Content Manager filters content based on user profile parameters, such as age, gender, and interests. It limits access to provide a safe environment in Kid Mode. For example, Content Manager may use content with pre-defined categorization in metadata tags that are related to user profile parameters. Content Manager may limit content access to a user profile by comparing the content's metadata with a user profile's parameters, and only providing content with metadata that meets user profile parameters. Content Manager provides customizable settings that may be modified by parents for providing each user profile personalized access to the content.

At the Application level, an exemplary embodiment of the OS Overlay includes OS Overlay System Apps, Third Party Preloaded Apps, Native Android Apps, and Third Party Apps.

1. OS Overlay System Apps

An exemplary OS Overlay system applications environment includes a full line-up of custom applications that creates a tablet eco-system environment. This enables one central user account for application access as well as purchases made within applications ("in-app" purchases). An exemplary OS Overlay applications environment includes:

a. Content Service, including curated apps selected for kids for free or paid acquisition.
     b. Music Service for Kids & Parents;
     c. Video Service for Kids;
     d. Cloud Storage with Parental Control;
   e. File Sync Service—For easy file transfer between the tablet device and a computer;
   f. Education Service—Supports multiple education subjects with adaptive learning;
   g. Content—Contains online kid content for Web, online Video, Games, and Crafts;
     h. Books—Story Book creator;
   i. Diagnostic Tool—Designed for device and system trouble shooting and feedback;
   j. Parental Dashboard—Provides quick access to web based Parental Dashboard.

2. Preloaded Custom Third Party Apps

Exemplary embodiments of the OS Overlay include Preloaded Custom Third Party Apps, which may include one or more custom third party apps that are pre-selected to provide and/or complement experiences deemed important for children, such as learn, create, watch, read, and play. Certain third party apps are tightly integrated with the OS Overlay system environment, including linking to the OS Overlay system's App Zone electronic retail store application, for example, to facilitate upgrade of a free third party app to a paid version. In exemplary embodiments, Preloaded Custom Third Party Apps may include one or more of the following:

a. Apps
     b. Games
     c. Social Media
     d. E-Book
     e. Video

With these core manager libraries directly embedded at the Application Framework level of the mobile device's operation system, the OS Overlay offers a protected environment that provides distinctive benefits over other approaches, including without limitation the following advantages:

1. Compatibility. Since it is built as an overlay on top of an existing operating system, it has no compatibility issues with any applications or content that are designed for the generic operating system.

2. Instant On Experience. All Parental Control related features are enabled as soon as the device is powered on.

3. Security. Unlike an application-level implementation of security that can be easily circumvented or presented with application compatibility issues with other applications, the security of an OS Overlay relies on the security features of the underlying core OS, reducing the probability of circumvention.

4. Integration. Unlike approaches in which separate features are implemented individually, the OS Overlay provides a fully integrated eco-system for all applications and features. It also allows all compatible applications to request authorizations (e.g., by entry of a Parent password within Kid Mode or by configuration of controls in the Parental Dashboard) in the safety and security of the eco-system.

5. Ease of use. As part of the integrated OS Overlay system, settings and access controls for all applications and content in Kid Mode are managed within the eco-system without having to manage separate and individual settings on various applications.

6. Direct Access. Due to the integration of OS Overlay system with the core OS, applications and processes running under the OS Overlay system can directly access low level drivers such as Wi-Fi, Camera, Display, Audio, etc. This provides a heretofore unparalleled level of access to core OS features that otherwise would not be permitted.

Mode Manager (Multi-Mode UI)

Figure 2:
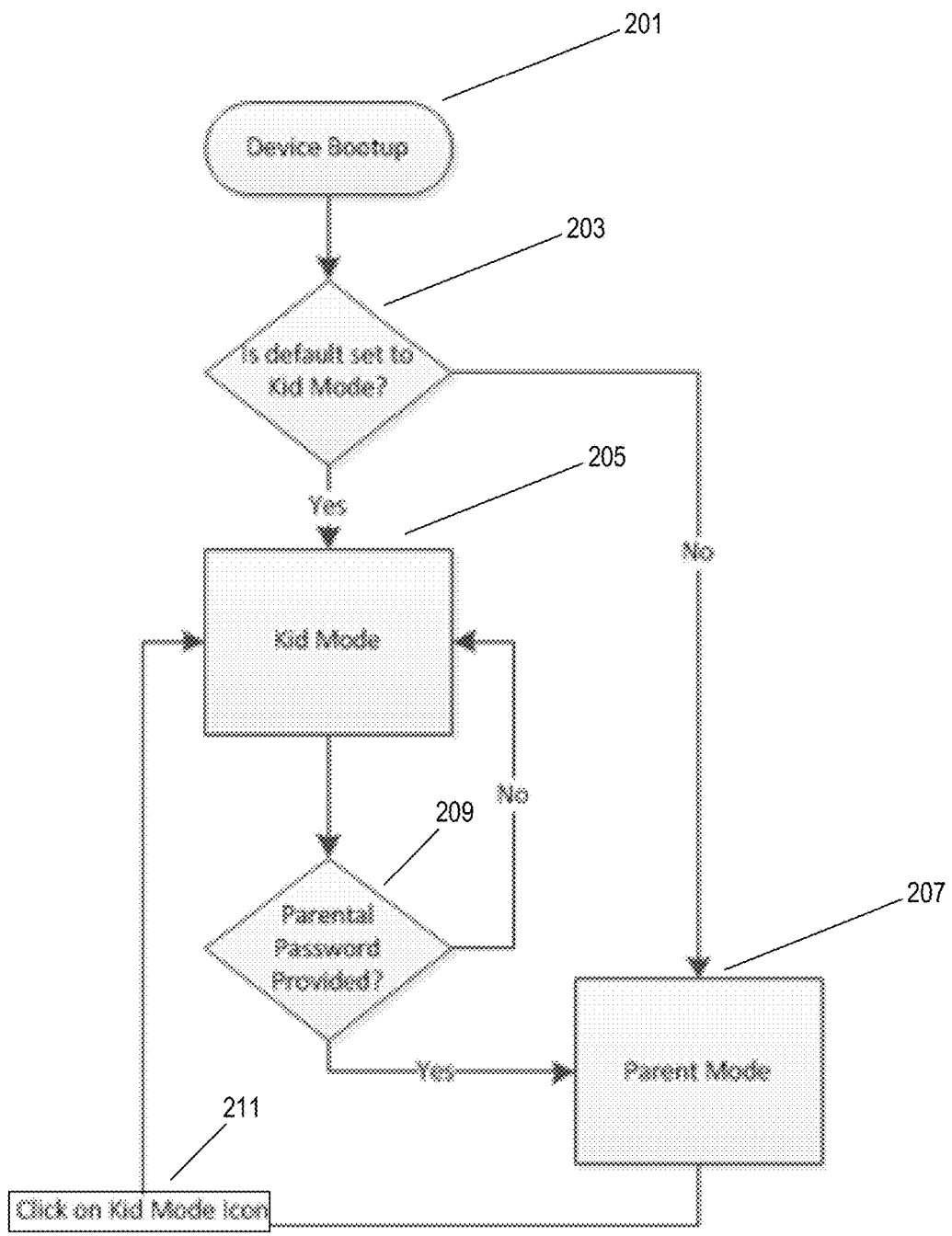
FIG. 2 is a flow diagram illustrating a process for entering an operational mode, according to some embodiments.

Mode Manager is embedded in the OS Overlay System to provide multi-user interface support for kids and parents. Kid Mode and Parent Mode can be switched back and forth using the usage flow shown in FIG. 2. As shown in FIG. 2, at step 201, device running the mobile operating system with the OS Overlay System is booted up. At step 203, the system determines if the default is set to Kid Mode. At step 205, Kid Mode is entered if the default is set to Kid Mode. At step 207, default is not set to Kid Mode, Parent mode is entered. At step 209, to enter from Kid Mode to Parent Mode, the system determines if a parent password is provided. If a parental password is provided, the system switches from Kid Mode to Parent Mode. At step 211, to enter from Parent Mode to Kid Mode, the Kid Mode icon is selected, and returning to step 205, Kid Mode is entered.

Parent Mode

In some embodiments, Parent Mode is the default user environment for the core OS. Parent Mode provides features including, but not limited to, a generic UI, open access to any application and content, open access to all device settings, full privileges to perform one-click purchases, and full control to perform system updates, among others.

Kid Mode

In some embodiments, Kid Mode provides an embedded solution to the unprotected and unrestricted access problem for any tablet. As part of the OS Overlay System, it allows a profile-based safe environment for kids as soon as the tablet is powered on. Kid Mode includes parent-controlled time, use, and access restrictions for applications. An example of such restrictions include restricting access to pre-defined kid friendly content and apps, time restrictions to restrict usage without direct parental monitoring, and parental monitoring of device usage through the Child Monitoring Manager.

In some embodiments, content consumption is managed in Kid Mode, including by manual and remote approaches. For example, a cloud-based service maintains and provides a content listing based on individual kid user's profile. The content consumption manager provides a personalized and customized content consumption model.

In some embodiments, an integrated OS Overlay system with preloaded applications and content, including specially selected games, apps, music, and videos that are appropriate for kids provides instant usability of the device regardless of available of internet access for content downloads. Preloaded applications and content may correspond with content categories, including the categories of learn, create, watch, read and play to help maximize a user's enjoyment of the tablet.

In some embodiments, preloaded apps, and available apps for downloading from the eco-system's content provision interfaces, including App Zone and Treasure Box interfaces, are curated, or specially selected and verified as kid-friendly apps or games.

In some embodiments, in Kid Mode, virtual currency can be earned by completing activities on the tablet, including but not limited to activities such as: getting a perfect score on a math lesson; for completing a chore. Virtual currency can be directly acquired by distribution by a parent. Virtual currency can be deducted for not completing an activity. The balance of virtual currency for a user profile may be stored locally and synchronized to the cloud-based profile of the eco-system for remote management. Virtual currency distribution not only provides an incentive and rewards a child for doing good things, but also disciplines them as well.

In some embodiments, an educational app is preloaded as part of the OS Overlay system and it can be accessed within Kid Mode. This offers a comprehensive learning solution bases on standard curriculum. It introduces serious learning as part of the overall user experience. The educational app is also linked with a cloud-based educational platform service, which tracks progress and performance of each child and offers analysis of suggested improvement area per subject.

In some embodiments, the Kid Mode user interface includes a simple and intuitive user interface for kids. The inherent problem with standard user interface for core OSs of mobile devices, which includes the user interface for Parent Mode, is the complexity and difficulty of navigation for kid. The following are features to specifically address issues that kids face with a generic tablet computer:

Large App Icons. For younger kids, finger control is not well developed to pinpoint a small area of surface. Therefore using larger app icons 301, as shown in the home page interface wireframe diagram 300 shown in FIG. 3, makes it easier for kids to launch apps. Kid Mode also offers multiple scrollable screens to store short cuts of these large app icons for easy access.

Figure 3:
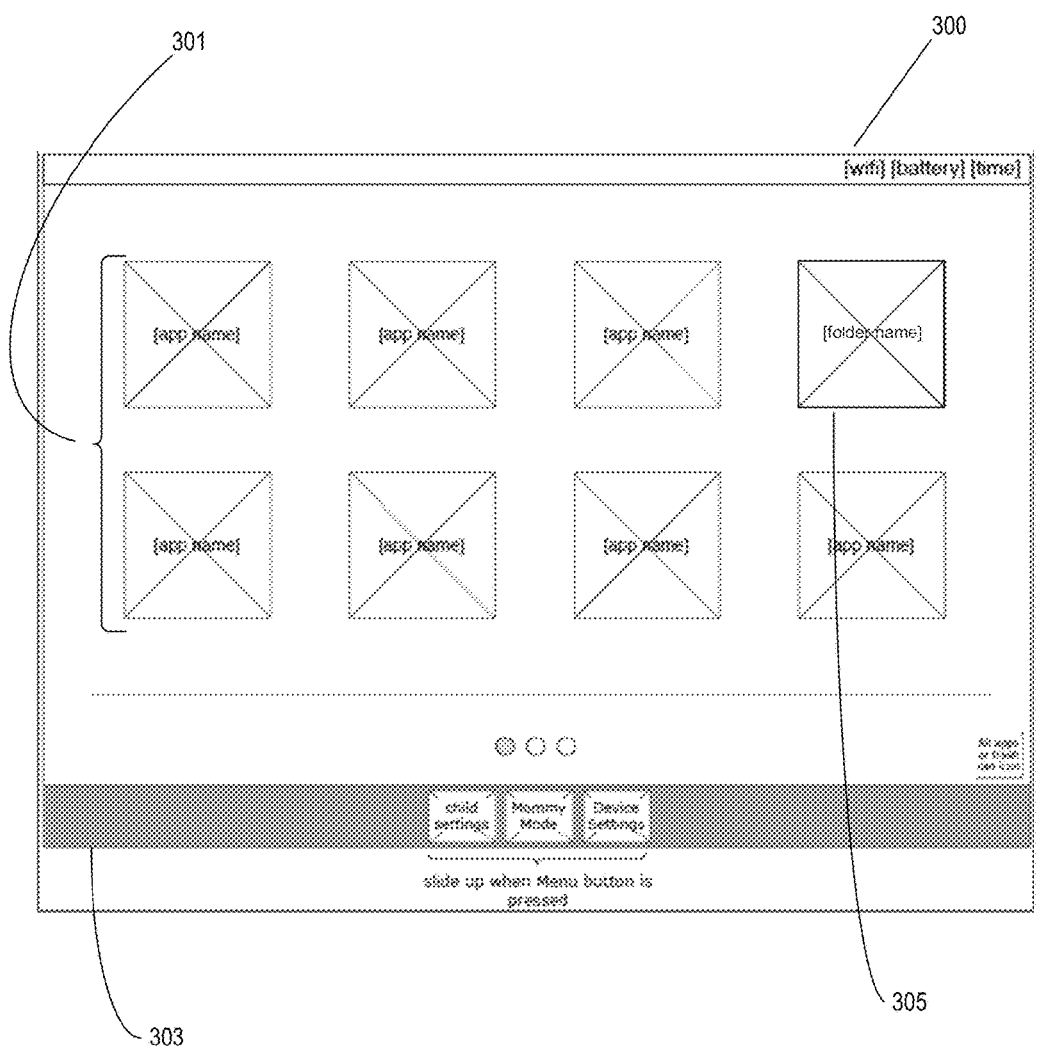
FIG. 3 is a diagram illustrating a graphical user interface for an operational mode, according to some embodiments.

Popup Access Bar. For typically infrequently accessed functions, Kid Mode interface includes a popup access bar 303, as shown in FIG. 3, to provide simple setting access as well as Parent Mode access link. This reduces clutter within the viewable interface and preserves the general kid friendly theme.

App Icon Organization & Placement. Kid Mode presents multiple ways for kids to customize their screen by allowing drag & drop of apps to user's desired locations as well as grouping multiple apps in app folders 305. This promotes personalization and creativity. Kid Mode also enables certain apps to be locked in their corresponding positions.

System Status Bar Filter. Unapproved notifications are filtered to prevent unsafe display and access that could breach the Kid Mode's safe environment for children.

Profile based Customization. Wallpaper, App button style, and App Shortcut organization can be customized based on different children's profiles. Parent Mode contains totally separate settings that allow for differentiation of the overall look and feel between UI modes.

In some embodiments, a multi-mode system provides curated child-safe content. Access is provided only to content that is predetermined by a parent or service provider to be appropriate for a given age or gender group or other subgroup. Multi-mode configurations may also filter content within the application, which provides a safer content access environment for kids. Content includes preloaded music for kids; preloaded music video for kids; preloaded e-books for kids; music store for kids; cartoon and video for kids; web content for kids; online video for kids; online crafts for kids.

Child-Safe, Learning and Rewards Ecosystem Overview

Figure 4:
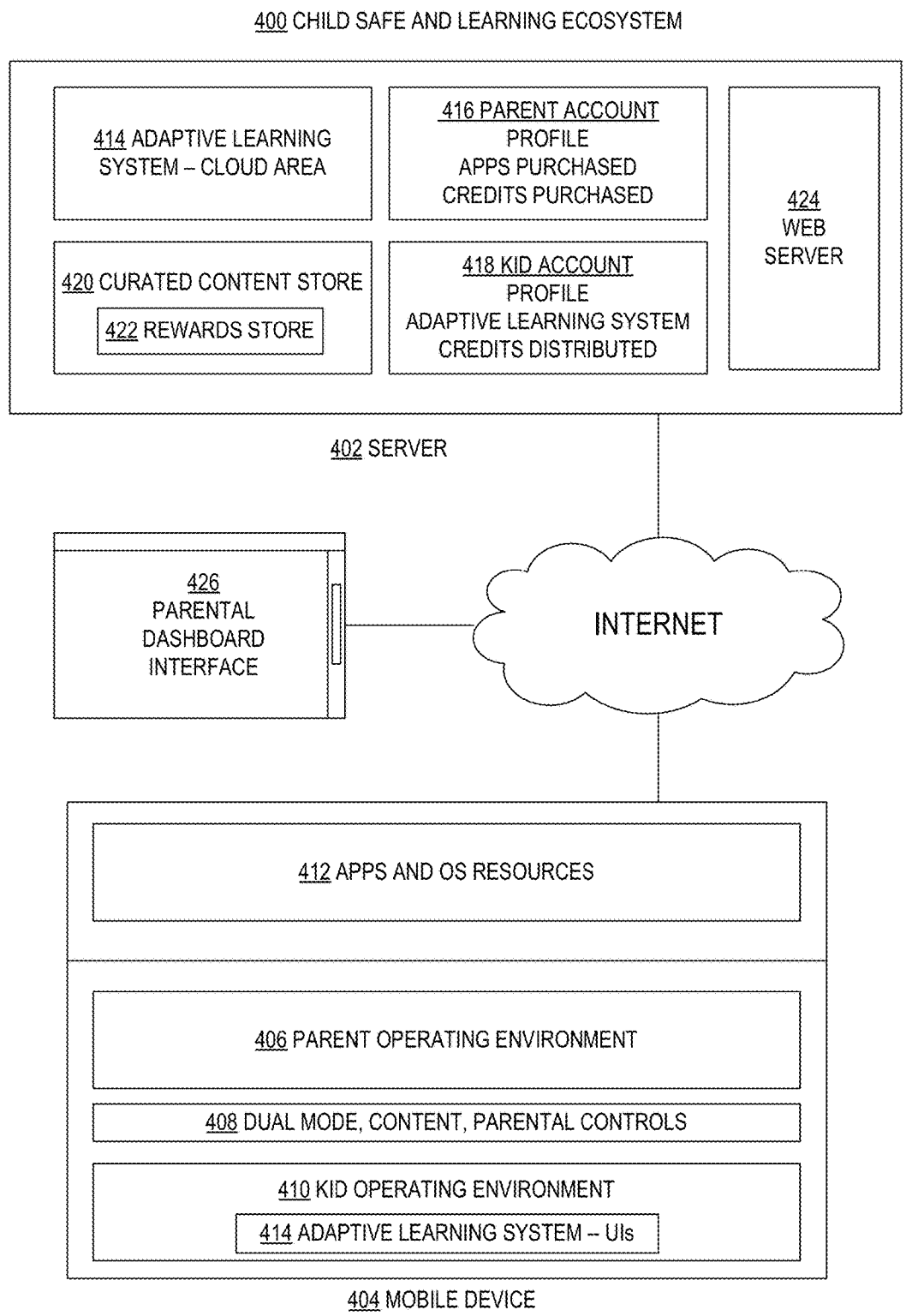
FIG. 4 is a diagram illustrating a child-safe and learning ecosystem, according to some embodiments.

FIG. 4 is a diagram showing aspects of a child-safe, learning, and rewards ecosystem 400, according to some embodiments of the invention. The ecosystem provides a bounded environment of child-safe systems and content. According to some embodiments, the ecosystem comprises a server 402, a mobile device 404, communicatively connected by a network, such as the internet. Mobile device 404 includes a parent operating environment 406, such as the parent mode and user interface running on an application layer framework of a mobile operating system, as described above, management processes 408, such as the mode manager, content manager, and parental controls manager as described above, and a kid operating environment 410, such as the kid mode and user interface as described above, whose access to apps and resources 412 are managed by the parent operating environment 406 and management process 408. Kid operating environment 410 also includes access to the user interfaces used by adaptive learning system, further described below.

FIG. 4 further shows aspects of server 402, providing online services and support to one or more mobile devices, including mobile device 404. In some embodiments, server 402 includes the engines and other online services of the adaptive learning system 414, further described below. Server 402 maintains user accounts, including parent account 416 and kid account 418. Parent account 416 includes account information such as profile parameters, apps purchased, reward credits purchased, authentication credentials, identities of ecosystem mobile devices owned, and kid accounts associated with parent account 416. Kid account 418 includes account information such as profile parameters (e.g., photo, age, gender, educational level, educational subjects, usage data, desired behaviors), data collected and acquired from the adaptive learning system, and any rewards credits distributed to kid account 418 from rewards credits in the parent account 416. According to some embodiments, personalization data for kid operating environment on a mobile device may be stored with kid account 418, and downloaded onto a different device upon association with kid account 418. In some embodiments, a single password or authentication credential is propagated through all accounts, profiles, and mobile device modes and operating environments, to access restricted areas of any of the interfaces resources of the ecosystem.

Server 402, as shown in FIG. 4, also hosts a curated content store system 420 that provides content for purchase for users of the ecosystem. Details of the curated content store system are further described below. The curated content store system 420 includes curated rewards store 422, which accepts credits as tender for purchasing curated content. In some embodiments, and further described below, credits accepted by rewards store 422 are tendered through the Kid Mode interface from the mobile device 404 for purchase of curated apps by a child user using reward credits earned by the child through satisfying certain conditions, such as by completing learning paths in the adaptive learning system, or by completing tasks from a chore list.

Server 402 includes a web server 424 for serving web sites and web pages of the ecosystem. Web sites served include a parental dashboard interface 426 from which a supervisory user may access parent account 416 to manage kid account 418, including monitoring usage data for kid account 418, reviewing and generating analytics, insight and recommendation reports from adaptive learning system 414, purchasing new credits for distributing to kid account 418, and managing the chore list and rewards system.

Parent account 416 may be associated with several mobile devices, and each kid account may be associated with any or all of such devices. Each parental account 416 thus provides a common child-safe, learning and rewards ecosystem from which features and resources can be customized for each kid account 418 and the kid user interface associated with kid account 418.

Adaptive Learning on a Tablet PC

Figure 5:
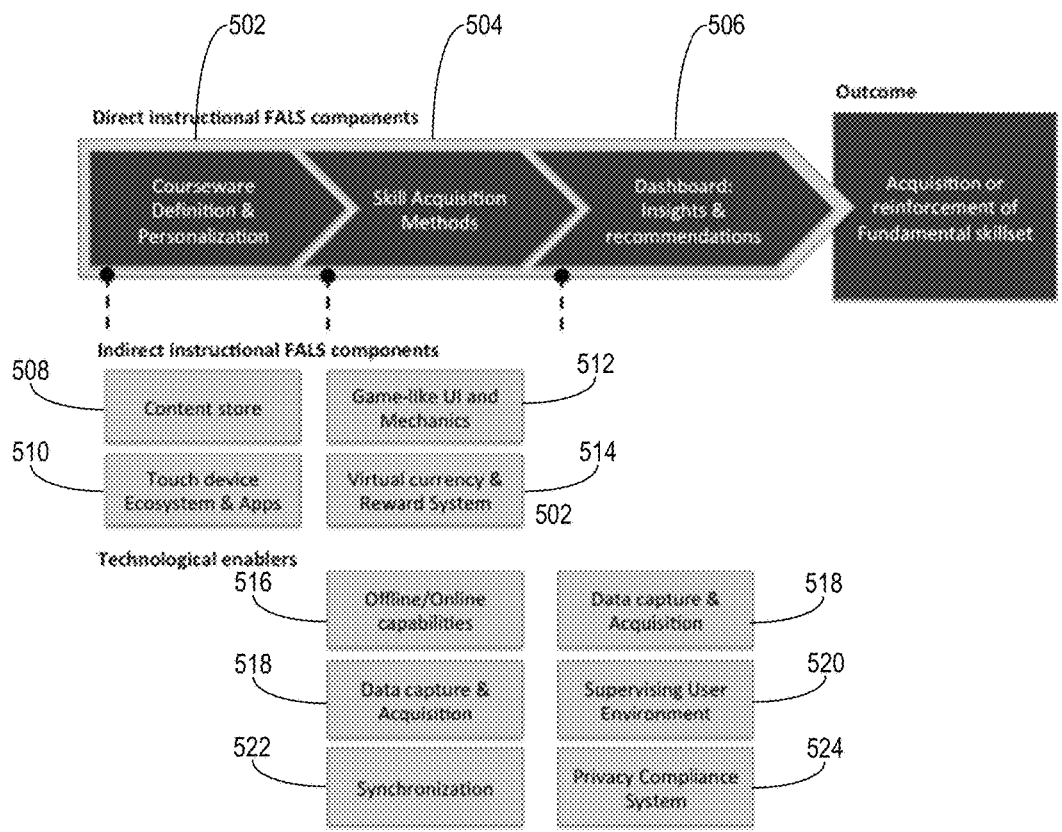
FIG. 5 is a diagram illustrating the components of the Fundamental Adaptive Learning System (FALS), according to some embodiments.

FIG. 5 shows a diagram of the components of the Fundamental Adaptive Learning System (FALS), according to aspects of some embodiments of the invention. FALS includes direct instructional components, indirect instructional components, and technological enablers. Direct instructional components organize, provide and monitor the skill acquisition activity, and are at the center of the FALS utility, which is to ensure the acquisition or reinforcement of the skill set. Direct instructional components comprise courseware definition and personalization 502 for presenting instructional material to users, skills acquisition methods 504 for providing interaction with the user to teach the coursework, and insights and recommendations dashboard 506 for evaluating the assessment and tracking for providing the next stage in an advancement path and other recommendations. Direct instructional components result in the acquisition or reinforcement of a fundamental skill set.

As shown in FIG. 5, indirect instructional components are part of the infrastructure of FALS in support of the direct instructional components. Indirect instructional components enable FALS to most effectively achieve acquisition and reinforcement of the fundamental skill set. Indirect instructional components are reinforcements, or features that indirectly contribute to the acquisition of the skill by having an effect on user motivation and behaviors, such as: practice frequency and quantity; repetition of practice; ambition to improve proficiency; competition to improve proficiency; symbolical rewards for achievements (progress and proficiency); and tangible or virtual rewards for achievements. Reinforcements are widely recognized in behavioral science and organizational literature as necessary to achieve and sustain a change in behavior that leads to an improvement in performance. As such, while indirect, they are critical to the achievement of the purpose of the FALS. Indirect instructional components include content store 508, touch device ecosystem and apps 510, game-like UI and mechanics 512, and virtual currency and rewards system 514.

As further shown in FIG. 5, technological enablers are part of the technological infrastructure developed to support the direct and the indirect instructional components. Technological enablers are software solutions and services required to operate the instructional components in a way that maximizes their utility value to the user and to the supervising user. Technological enablers include offline/online capabilities 516, data capture & acquisition 518, supervising user environment 520, synchronization 522, and privacy compliance system 524. The offline operation of the FALS, with the capability to sustain data capture and acquisition while in offline mode, and the added capability to automatically synchronize the dataset with the cloud-services, enable the user to sustain practice when an Internet connection is not available, while obtaining the same benefits as having an available Internet connection.

According to some embodiments of the invention, the Fundamental Adaptive Learning System (FALS) provides a personalized learning program to each user based on his or her level of proficiency in each of the fundamental skill sets required in the curriculum. It allows supervising users to gain insights into progress and proficiency in the fundamental skill set acquisition. In some aspects, it provides supplemental learning courseware that aligns to the compulsory skill sets required by the Core Curriculum State Standards and a working environment in which users can acquire or reinforce these skill sets autonomously through learning, practice, repetition, assessment, instant feedback, incentives and gratifications.

FALS is organized around skill sets, hereinafter referred to as "fundamentals," each of which is a specific skill set that must be acquired by the end of a grade level in a given subject to advance to the next grade level in the given subject. The FALS aligns to the Core Curriculum State Standards to determine what are the compulsory skillets and reflects in its structure and progression path how each Fundamental is taught and acquired in the classroom. The FALS then provides a personalized courseware to each user based on his or her level of proficiency in each of the fundamental skill set required in the curriculum.

The FALS may be implemented on mobile devices with a touch screen input interface. Each fundamental skill set benefits from its own set of user interfaces and look and feel, is optimized for touch-based user interactions, and is specifically designed to teach or reinforce the acquisition of the skill set.

According to aspects of some embodiments of the invention, the overall application user interface is a game-like interface designed to maximize practice and repeat visits. In providing a unique visual identity system to identify lessons belonging to a given fundamental and a visual learning path along which the user journeys, it incorporates gaming mechanics, visual, audio, kinesthetic and motor cues and interactions that reinforce engagement with the FALS, and drive repeat practice and repeat visits to the FALS.

The FALS operates in offline mode on the touch mobile device—i.e. in the absence of a connection to the internet and to cloud services—with access to all of the core features required for skill set acquisition, to automatically capture user information and user behaviors (the "dataset") while offline and automatically synchronize this dataset with cloud applications and services when the device comes online.

The FALS captures the user behaviors and interactions with a mobile device with a touch screen input interface. Specifically, the FALS captures information relating to the educational goals, including practice attempts that do not necessarily lead to a proficiency assessment or to the completion of an instructional item. In addition, the FALS captures user events and interactions with the software and allows to optimize the performance of the system overall, both from an educational standpoint and from an application standpoint.

Components of the FALS work in conjunction to meet the educational objective, which is to enable or reinforce the acquisition of the fundamental skill set. The nature, interactions and interdependencies of these components are detailed as follows.

The Fundamental Adaptive Learning System includes: a courseware definition and personalization system; applications and cloud-services integrated to a mobile computing device; a game-like user interface and dynamics, skill set acquisition methods integrated to a touch mobile computing device; an online analytics-based insight and recommendation solution; and a virtual-currency based reward system redeemable for virtual and tangible goods; a content store for FALS courseware and third-party applications and materials; and eco-system for seamless integration third-party applications with FALS platform, applications and accessories.

Each of the foregoing features will be described in further detail as follows.

Courseware Definition and Personalization System

In some embodiments, the Fundamental Adaptive Learning (FAL) System includes a Courseware Definition and Personalization System (CDPS). The CDPS includes: reference curriculum structured along fundamental compulsory skill sets; a programmatic learning path for each of the fundamental skill set; and an Adaptive Learning Algorithm that personalizes the learning path for each user and dynamically adjusts it based on the user individual performance and the proficiency level of the user in the skill set. The FAL System is unique in that it creates and dynamically adjusts an optimal learning path within a pre-defined courseware that leads to the mastery of fundamental skill sets aligned to a standard curriculum, such as the Common Core State Standards curriculum. Such dynamic updating and personalization to each user's level of comfort ensures motivation and continuous progress.

In some embodiments, the reference curriculum of the FAL system is aligned to Common Core State Standards. The primary element of the curriculum is the "fundamental" skill set. A fundamental skill set is a compulsory skill that the user must have acquired by the end of a school grade, and conditions the ability to progress through grade levels.

The hierarchy and interdependencies within and across fundamental skill sets define the sequencing of courseware. Progress within the fundamental skill set is based on achieving levels of proficiency above standards and completing the sequence of required lessons. Scoring and analytics fuel the dynamic update of the learning path within the fundamental skill set.

Game-Like User Interface and Dynamics

According to aspects of some embodiments of the invention, a game-like user interface ensures a high level of engagement, which translates into an increase in number of lessons practiced, repeat practicing of the same lesson, an increase in the number of hours spent practicing, and an improvement in proficiency scores and mastery of fundamental skill sets. The gaming mechanics operate as incentives and reinforcements of practicing behaviors, and specifically drives users to achieve higher levels of proficiency.

The main user interface is designed to provide a number of visual cues and menus that make the skill set acquisition an appealing and enjoyable interaction, while inspiring the user to progress on the learning path. Navigational elements within the user interface turns practice into a discovery process by organizing subject matters into specific areas of the user interface that are immediately recognizable after first time use; representing individual fundamental skill sets by a character and a theme that carry across grade levels; providing for lessons in a given fundamental a unique identity system and color-coding that extend beyond the presence of the character; using specific characters throughout the interface to provide specific features, such as tutorials, instructions, or hints; visually organizing lessons along a path on which the user journeys; disclosing content progressively to the user, as milestones are met and unlock new instructional items or additional lessons; visually representing completion levels and scores on the learning path; offering additional "unlocks" of previously locked content and discoveries, such as quests, upon completion of a given fundamental; performing educational activities that are not directly integrated to the user learning path, such as supplemental optional activities like quests, for fun, for rewards and badges; and providing a menu bar that is available at all times but in a collapsible form to provide shortcuts to features that tie into the game-like dynamics, described below.

In addition to navigational elements of the user interface, audio, video and animation are used throughout the application to provide an appealing experience. Game-like elements include illustrated backgrounds with animations; background music and sound effects accompanying interactions and outcomes; audio and video tutorials and instructions; quiz animations and sound effects.

Much like in a game, the user is put into a stimulating environment with intuitive interactions and cues that increase the interactivity of the learning experience and provide for incentives and reinforcements towards frequent visits and additional practice.

Reinforcements from game mechanics are used to encourage usage and to retain users. Game mechanics include progressive unlocks of additional content; discovery of new territories with additional capabilities; instant feedback mechanisms with audio reinforcements; visual and audio reinforcements for each achievement or reward obtained; leader board to compare versus friends or general user population; badge awarded for achievement with collection value and bragging rights; hints, cues and in-game advantages that can be purchased against virtual currency; and access to third-party rewards and in-app purchases for content extension.

The typical outcomes obtained from these mechanics are measured in user engagement and loyalty, measured as frequency of visits and time spent per visit. User retention is also a typical performance indicator, which is achieved through the reward system.

The application of gaming-dynamics and social-gaming tools to learning behaviors is an innovation enabled by the ability to extend beyond the mobile device to tap into additional applications and user-groups.

Adaptation to the School Environment

In the case where the FALS would be used in conjunction with classroom learning and in the classroom context, the system offers the option to use either the main user interface or an alternative user interface that provides a more traditional navigation path and content discovery model.

Through a specific dashboard, the teacher can assign fundamental skill sets—or subsets—to different users, either individual lesson plans or by proficiency levels. The user can then access the specific content in an individual "shelf" in the user environment, and practice the lesson.

While the skill set acquisition methods are identical, the indirect components of the FALS are not available in that simplified interface. However the user information is captured and accessible for insights and recommendations in the specific dashboard.

Additional curriculum configuration tools are also available to align the supplemental material to the class syllabus, and can also be used for non-traditional curricular activities as well as reinforcing learning behaviors. Specific assessment tools are also available.

Programmatic Learning Path

In some embodiments, the FAL system defines programmatic learning paths for each of the fundamental skill sets. Completion of a learning path demonstrates proficiency in the fundamental skill set. In addition, some embodiments provide "programmable" learning paths and/or fundamental skill sets so that course content and/or teaching techniques can easily be changed to adapt to a real-world school curriculum or syllabus. Among other benefits, this permits customization of the FAL system to align with different course content and/or teaching techniques that may be used with a given individual or educational institution.

Figure 6A:
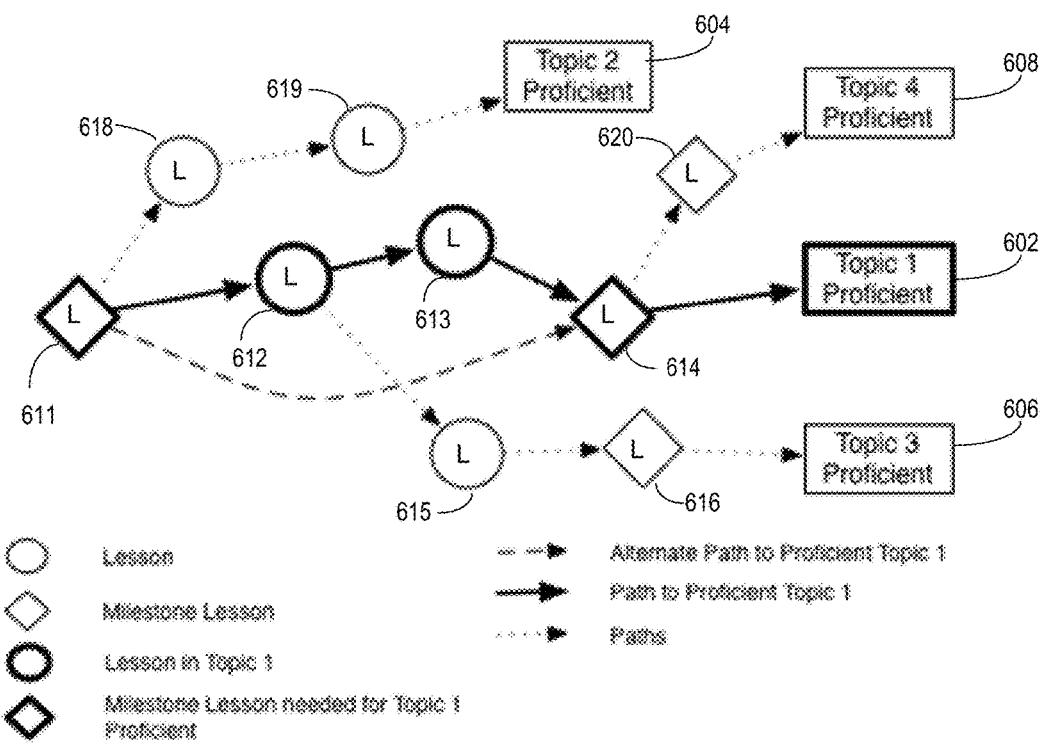
FIG. 6A-6C are diagrams illustrating aspects of the programmatic learning path of the FALS, according to some embodiments.
Figure 6B:
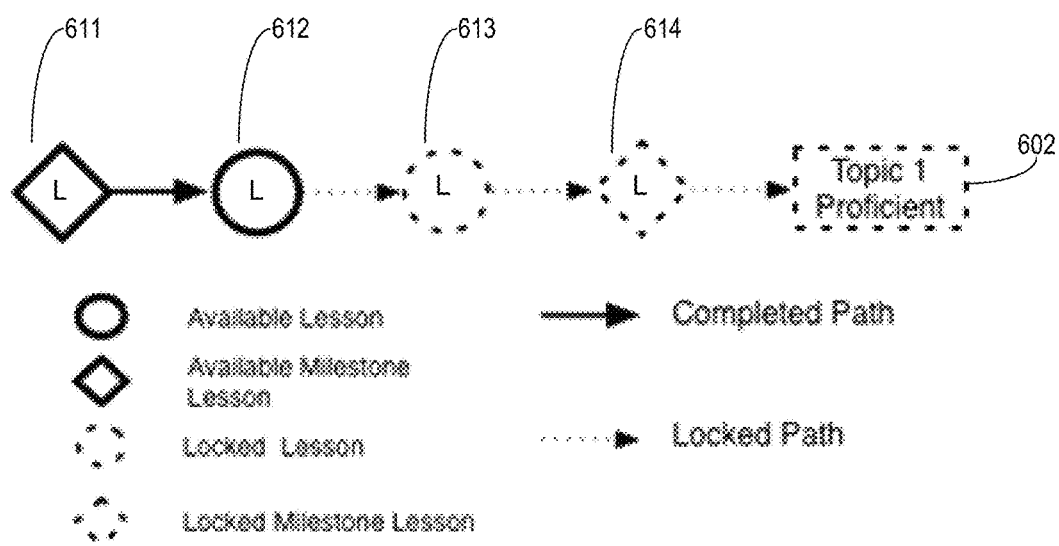
Figure 6C:
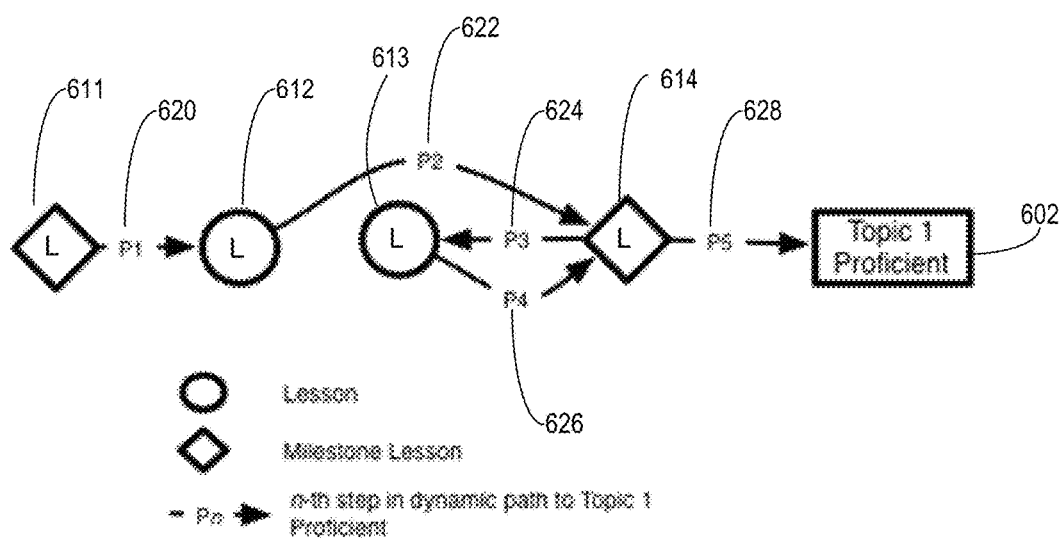

FIGS. 6A-6C are diagrams illustrating aspects of the programmatic learning path of the FALS, according to aspects of some embodiments. FIG. 6A is a diagram that presents learning paths for attaining and demonstrating proficiency in Topic 1 602, Topic 2 604, Topic 3 606 and Topic 4 608, according to aspects of embodiments of the invention. The Topic 1 path shown in bold, and comprising lessons 611, 612, 613, 614 showcases the learning path for proficiency of Topic 1. To demonstrate proficiency of Topic 1 the user is required to complete the path between "L1" and "Topic 1 Proficient".

In a typical case, to reach Topic 1 Proficient requires the completion of lessons 611, 612, 613, 614 as indicated by the solid arrow lines. Depending on the user's proficiency in completing lessons, the user may follow an alternative path, indicated by the dashed arrow line. As shown, a user may skip 612 and 613 to directly proceed to 614 after 611.

As shown in FIG. 6A, lessons may be shared among different topics. For example, lesson 611 is a shared milestone lesson that begins the paths necessary to attain Topic 1 proficient 602, Topic 2 proficient 604, Topic 3 proficient 606, and Topic 4 proficient 608. In particular, lessons 611, 618 and 619 are studied and progressed through to reach Topic 2 proficient 604.

Programmatic Learning Path for Topic Proficiency

FIG. 6B illustrates a diagram of one example a stage of navigating a learning path towards "Topic 1 Proficient" 602 when lessons 613 and 614 are locked, according to aspects of the invention. Unlocking lessons is the control method for sequencing of lesson completion. Initially, the user only has the first lesson 611 in the sequence available in a path. If the user completes the available lesson with a satisfactory score, the next lesson 612 in the sequence is unlocked. In the stage as shown in FIG. 6B, the user has 611 and 612 available. The lessons 613 and 614 are locked. The user cannot attempt 613 or 614. When 612 is completed then 613 will unlock and become available.

Dynamic Path Progression

According to aspects of embodiments of the invention, the path progression toward proficiency in a topic is dynamic. In some instances, completing lessons at the minimum completion score will continue linearly through the lesson, as shown in FIG. 6B. Completing a lesson at a top tier score may allow a user to unlock some or all lessons up to the next milestone lesson, thereby skipping some lessons along the path.

As shown in the example path illustrated in FIG. 6C, according to aspects of embodiments of the invention, if the user does not complete or fails the attempted lesson, the user may be sent "backwards" along the path to the lower-level lesson. Attempting this lower-level lesson reinforces the user's ability to pass the failed lesson. In particular, as shown in FIG. 6C, at path segment P1 620, the user has completed lesson 611 and continues to lesson 612. At path segment P2 622, the user completes lesson 612 at a high score tier, thus can "skip" to lesson 614. At path segment P3 624, the user fails at lesson 614 and is moved "backwards" to lesson 613. At path segment P4 626, the user passes lesson 613 and moves again to lesson 614. At path segment P5 628, the user passes lesson 614 and completes the lesson path to attain "Topic 1 Proficient" 602 status.

Lesson Completion Scores

According to aspects of embodiments of the invention, solving each activity in a lesson results in a numeric value. This value is stored. Solving all of the activities presented will end the lesson. When the lesson is ended, the sum of the store values is the completion "score".

Lessons are considered "completed" or "passed" if the user's completion score matches or exceeds the pre-defined standards. Completing lessons advances the user along the learning path.

If the user's completion score is lower than the passing score, the lesson is not completed. As shown in FIG. 6, not completing a lesson may result in remedial movement along the lesson path.

Adaptive Learning Algorithm

In some embodiments, the Adaptive Learning Algorithm (ALA) operates at the fundamental level. It determines user proficiency in fundamental skill sets and provides recommendations that are designed to provide guidance to the supervising user on actions to improve the user's proficiency and mastery in a grade, subject, or fundamental skill.

The recommendations and output of the ALA include additional courseware, textbooks, supplemental learning applications, and other products and services. Additionally, ALA may recommend revisiting previous skill sets, introduce related skill sets, or additional content for the currently targeted skill set.

The Assessment Engine includes at least two assessment processes which are included in the ALA. The initial assessment is a diagnostic tool used by the supervising user to assess the user's understanding and proficiency in a given fundamental skill set. The completion of an Initial Assessment provides the data to generate recommendations for the placement of the user on at specific milestone lesson. The ALA further includes a continuous assessment process of the user's progress and proficiency levels along the Learning Path. As the user attempts additional lessons, the Assessment Engine in a continuous assessment process creates or modifies recommendations, updates the dynamic lesson path, feedbacks metrics and detailed analytics-based insights, and improves and refines future assessments.

Figure 7A:
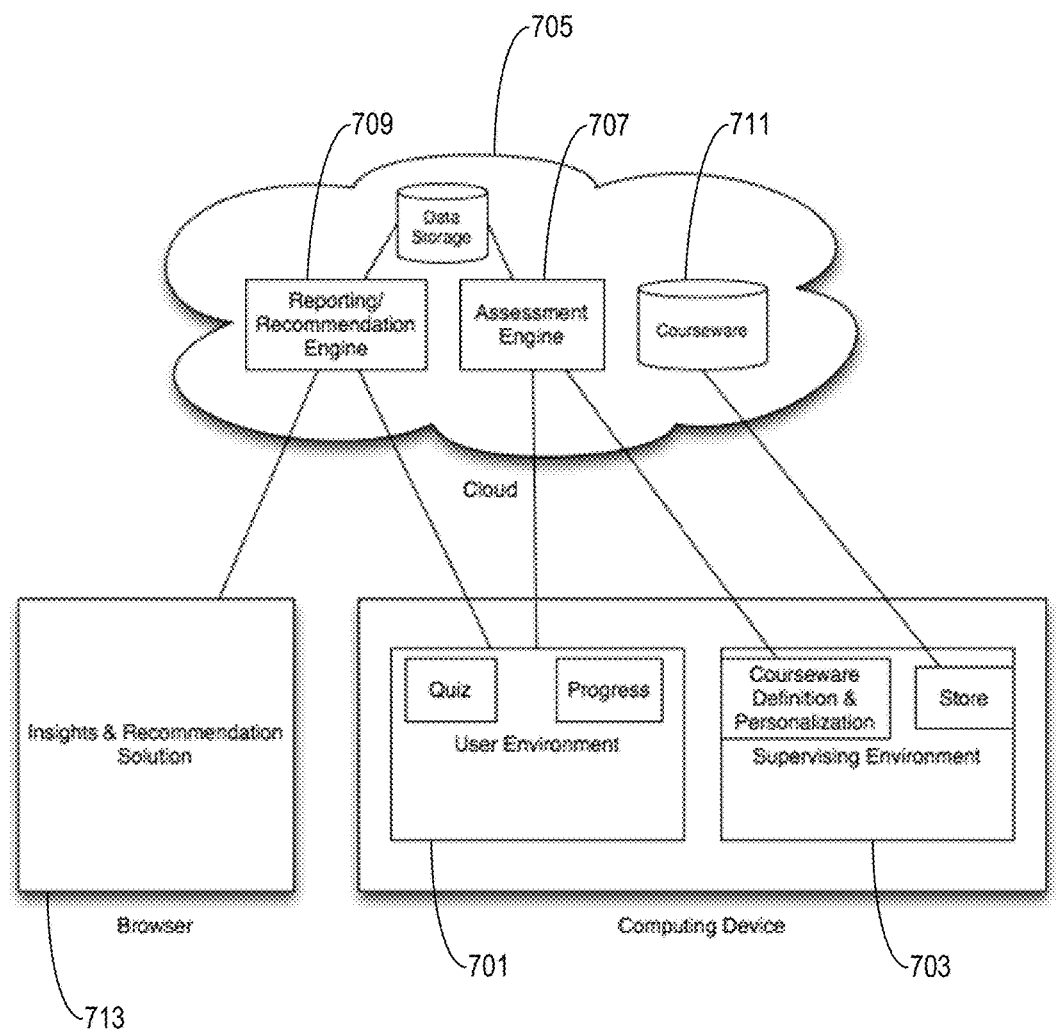
FIG. 7A-7C are diagrams illustrating aspects of the architecture and components of the FALS, according to some embodiments.

FIG. 7A is a diagram that illustrates the architecture of the Fundamental Adaptive Learning system according to aspects of embodiments of the invention, which comprises 3 main components, a User environment 701, a Supervising user environment 703, and a Cloud environment 705. The supervising user environment 703 and the user environment 701 are native to the mobile computing device and are primarily used for displaying and managing content. In some embodiments, all the analysis, storage, and computing are provided by cloud services, although embodiments may conduct the analysis, storage and computing in any combination of local or distributed manner without departing from the spirit of the invention.

The integration of the User environment 701 and the Supervising user environment 703 with the OS Overlay in a Dual- or Multi-UI configuration allows the Adaptive Learning System to manage handshakes and handovers between each user environment. As detailed below, the Adaptive Learning System is guided by the supervising user when it comes to selecting the fundamental skill set to work on, but the user can autonomously complete the assessment. In some embodiments, the assessment result and recommended courseware are submitted for approval to the supervising user, who can decide to approve or to reject if the assessment was not conclusive. Once the recommendation is approved, the user can autonomously progress through the learning program without supervision The hosting of the essential assets and engine in the cloud allow deploying the Fundamental Adaptive Learning System across a wide range of devices. Some embodiments provide for implementation on a device with a touch-screen input interface. This cross-device approach expands the use-case scenarios and facilitates practice.

With further reference to FIG. 7A, the user environment 701 is responsible for rendering lesson data. It receives lesson data from the cloud 705 and displays questions to the user in the user environment 701. It interacts with the user through the input methods provided by the mobile computing device. By extending the input types of the question to the capabilities of the mobile computing device, it allows the user to have an interactive and engaging experience as they practice lessons. Questions are displayed one at a time, each waiting for an answer from the user. At the end of a practice the results are submitted to cloud for storage and analysis.

Game-Like Interface

Although the fundamental skill sets include core learning materials aligned on State Standards, the user interface provides a rich and highly interactive experience. By using a game-like learning path interface, users can visualize their progress and stay actively engaged in learning. Users can see what milestones they have reached and what needs to be unlocked in order for them to master a fundamental skill set.

Supervising User Environment

The supervising user environment provides tools for the supervising user to guide and monitor progress through the mastery of fundamental skill sets. The supervising user can initiate assessments, which is used by the Adaptive Learning system to recommend a learning path tailored to the user proficiency level as demonstrated by the assessment. During an assessment, questions are asked to the user until the cloud-based assessment engine can recommend courseware based on the user's performance. In some embodiments, the recommendation is provided to the supervising user and, if approved, the courseware will be added to the user's learning path.

A store is also available to the supervising user for purchasing additional courseware. This allows for one-click purchase of new courseware to be added to a user's courseware list.

Cloud Services Environment

According to aspects of embodiments of the invention, the Cloud Services Environment 705 comprises an Assessment engine 707, an Insight & Recommendation engine 709 and a data repository 711 for courseware and other data and content. The Assessment engine 707 is designed to assess the user's proficiency in the fundamental skill set and establish the Learning path to achieve a skill set. The Insight & Recommendation engine 707 is responsible for saving and analyzing lesson data that a user has taken. In some embodiments, it is an network-based solution that provides a highly customizable interface with instant insight into the user's performance and proficiency. Insight-based recommendations are provided to the supervising user to help personalize a user's courseware.

A cloud-based repository storage system 711 is primarily responsible for serving lesson data and assets. Downloadable courseware packages, built for portable offline access, can be imported into the user environment. Lesson data is inputted into the repository with an input tool that allows a data entry user to visually create a problem via web interface. This allows for a controlled and standardized look and feel of lesson data and input types.

Skill Acquisition Methods Integrated to a Touch Mobile Computing Device

The primary user interface of mobile computing devices is the touch interface, which allows for intuitive and natural user interactions and instructions. Recognizing this expansion, for some embodiments of the invention, the Fundamental Adaptive Learning System has been specifically designed to take full advantage of the touch interface. For example, the user interface of the lessons is designed for touch input, providing assets that are "clickable" and selectable by touch. Drag and drop input actions are broadly used. Menu bars are expandable/retractable to allow for comfort. More importantly, certain skill sets require the use of touch and cannot be replicated on a non-touch device. Further described below are non-traditional input methods and firmware level integration with a Mobile Computing device interface.

Not all skill sets can be acquired through traditional curricular activities. For example, some fundamental skill sets, such as motor skills and phonetic skills that are either mandatory in the core curriculum standards or commonly taught in schools, require non-traditional input methods. Certain behavioral skills cannot be taught, reinforced or measured without the intervention of the supervising user are nevertheless conducive to the successful acquisition of curricular fundamental skill set. Examples of motor skills include hand-writing, which can be practiced by use of stylus input devices that can be held by a user. Using the touch-screen input interface, hand-writing can be evaluated against a standard letter, which can be introduced in the interface along with guide lines for a child to use when copying the letter. Examples of phonetic skills include recording a voice input, and evaluating the input against a stored answer (e.g., a waveform for the sound) to determine if the correct word, morpheme or phoneme was said.

The Fundamental Adaptive Learning System addresses both of these challenges with specific and unique methods not found in traditional online learning environments. These methods are built upon firmware-level integration with the mobile computing device interface in order to enable kinesthetic and audio activities as well as customization of the user interface to the particular set of activities; and integration with the OS Overlay and with native applications integrated across the Dual UI system that supports the acquisition of non-traditional curricular skills.

The mix of user interfaces required, the layouts and visual cues in the lessons, the sequence in which they are introduced and the reinforcement and assessment of mastery are inspired by classroom teaching and follow teachers' recommendations on how to achieve skill set acquisition. The FALS also allows addressing non-traditional curricular activities, including research and outdoor collection of items, as well as reinforcing learning behaviors that are conducive to mastery of the Fundamental skill set, such as assiduousness of the child to a task, having a clean workspace, all of which can be assigned a score by evaluated by a supervisor, and received by the system as input from the supervisor.

Firmware-Level Integration with the Mobile Computing Device Interface

In some embodiments, the Fundamental Adaptive Learning system incorporates skill-building activities and a range of input/output methods that support the acquisition of motor skills and phonetic skills. In particular, the input/output methods call on single and multi-touch gestures, finger-based and stylus-based input, audio-recording and audio-playback, visual and audio displays for hints and guidance. The interface-layer integration with these I/O interfaces directly reinforces the acquisition of the required motor skill or phonetic skill.

For example, input regarding handwriting may be captured via a pen-like device that enables users to practice handwriting exercises in an environment similar to a conventional pen and paper experience that also provides for the capture of data regarding pen markings and for the transfer of such data to a computer for assessment and provision of feedback to the user via the tablet computer screen. The pen device may include one or more optical cameras or other sensors to capture data regarding the markings made with the pen as well as data regarding the user's grip on the pen. Handwriting exercises may be provided on printed writing surfaces that include physical representations of handwriting exercises available within the FALS. One or more cameras may be mounted at the top of or along the length of the pen to record an image of the user's grip and the paper surrounding the area being marked, which the system uses to contextualize the user's markings in a digital representation of the physical writing surface. Alternatively, an optical sensor may be mounted at or near the writing tip of the pen to capture data regarding movement of the tip over the paper similar to the manner of operation of known optical mouse input devices. The FALS receives user input from the pen-like device, assesses conformity with corresponding instructional standards, and provides feedback, including instruction and remedial exercises as appropriate, via the screen of the tablet computer.

In some instances, the measurement of the user proficiency cannot be achieved in an automated way through the collection of an input through the user interface. In those instances, the supervising user can supplement the learning model by observing synchronously or asynchronously the user's outcome, and validating or invalidating the response.

Integration with the OS Overlay and with Native Applications Integrated Across the Dual UI System According to aspects of embodiments of the invention, two type of activities cannot be performed solely in the computerized environment, and require managed interactions between the offline performance of the activity and its tracking and validation through the computing device. For example, such activities include activities that require users to go offline to perform tasks such as research, item collection, and writing a report; and the adoption of behaviors that reinforce or condition the acquisition and retention of knowledge, called here "learning behaviors."

In both instances, the Fundamental Adaptive Learning system provides an interface and handshake system between the user environment and the supervising user environment that enables actions for monitoring performance, including agreeing or "contracting" on a task and a goal, either pre-defined in the user interface or personalized by the supervising user; associating a frequency of measurement and duration to that contract or to the achievement of the goal; associating a reward to the achievement of the goal, in the form of a virtual currency redeemable for virtual or tangible goods, as further described below; and validating the achievement and releasing the reward.

In some embodiments, achievements obtained are included in the Learning Path for the activities that are compulsory fundamental skill sets, and are reported through the Insights & Recommendation solution together with the rewards obtained.

Analytics-Based Insight and Recommendation Engine

With reference to FIG. 7A, the insight and recommendation engine 709 is an online monitoring and reporting interface that ties into the cloud-service infrastructure. It provides supervising users with functional capabilities that allow to generate detailed insights into the end user proficiency, to detect problem areas and to recommend intervention or to adapt the learning path. The monitoring interface can be accessed through the user device or through any other device connected to the internet.

According to aspects of embodiments of the invention, the insight and recommendation engine 709 includes features such as real-time monitoring of progress and performance against standards, data-mining analysis at 4 to 5 levels of granularity, direct access to summary indicators of performance, tracking of achievements and rewards, tracking of practice time and usage, and recommendation of instructional items, additional practice or courseware based on the needs of the user, as further described below.

The insight and recommendation engine 709 provides real-time monitoring of progress and performance against standards. The monitoring includes collecting in real-time user level data from the native application and stored in the cloud, compiling the data according to standardized key performance indicators and automatically updating the monitoring interface. In addition to comparison to proficiency standards, user performance can be compared to personalized standards defined by the supervising user or to peer-group performance benchmarks.

Figure 7B:
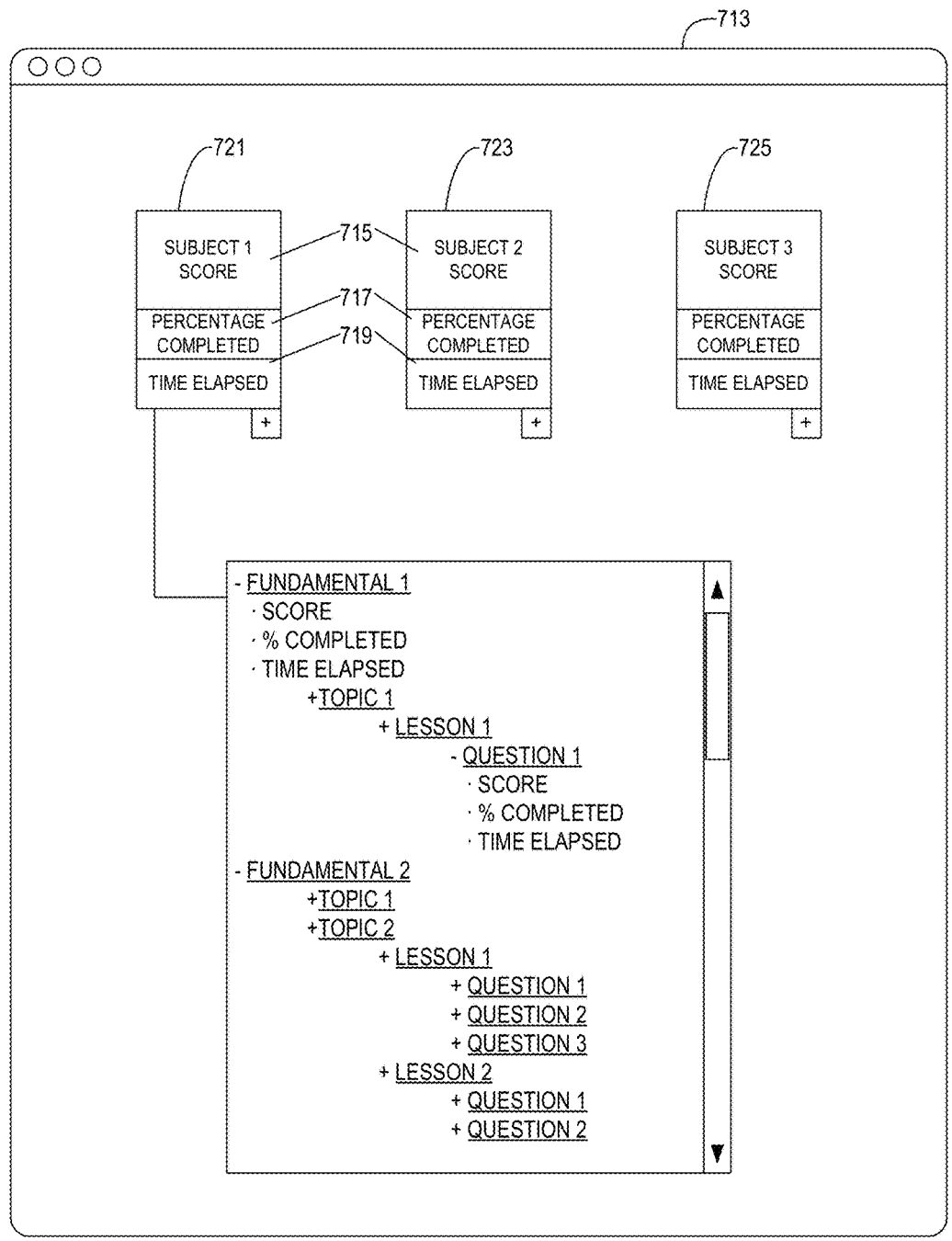

The insight and recommendation engine 709 also provides data-mining analysis at, for example, 4 to 5 levels of granularity. FIG. 7B provides an exemplary view of an interface provided in web-based browser interface 713, according to aspects of some embodiments. In some exemplary embodiments, as shown in FIG. 7B, data-mining analysis is provided at a coarse level of granularity for whole subjects, such as math, reading and writing, and can be drilled down at finer levels of granularity. Key performance indicators, such as scores earned 715, degree of completion of the courseware 717, and time spent 719 can be provided at the subject level of granularity for each subject 721, 723, and 725. At the lower levels of granularities from coarse to fine, key performance indicators are provided for each fundamental skill set within the subject, for topics within a fundamental skill set, for lessons within a topic, and for questions within a lesson. The supervising user can customize several parameters to analyze the key performance indicators for other hierarchies of information, including analysis by different periods of reference, including by day, week, month, year, or a custom period, or analysis by main difficulty areas and proficiency levels in each area. Different methods of customized reporting are available to the supervising user, such as by dynamic dashboard update or by selection-based updates. Such levels of analysis allow a supervising user to investigate the details behind an average score at a high level of granularity to identify trouble spots to target with tailored learning activities.

The insight and recommendation engine 709 further provides direct access to summary indicators of performance. In order to streamline the data-analysis process, summary indicators are readily available at first glance, at the overview reporting level. Further detailed drill downs are also available for each data point, as per granularity levels defined above.

The insight and recommendation engine 709 further provides tracking of achievements and rewards, including a searchable repository of past achievements, awards received, certificates obtained, and rewards gathered in addition to performance indicators.

The insight and recommendation engine 709 further provides tracking of practice time and usage. In addition to performance and proficiency-based monitoring, supervising users can correlate user level results to time spent and to practice lessons attempted.

The insight and recommendation engine 709 further provides recommendation of additional practice or courseware. Depending on the level of proficiency achieved, additional courseware is recommended to a user. For example, if the proficiency level is below acceptable standards (at default settings or supervising-user settings), additional practice is recommended until mastery is achieved. In the adaptive learning approach, this may lead to the practice of lower difficulty lessons until the lesson under consideration can be mastered. If the proficiency level is at or above acceptable standards (at default settings or supervising-user settings), the lesson under consideration is considered mastered. Additional practice is recommended in the same topic or in the same fundamental skill set until the higher level in the hierarchy is mastered. In the adaptive learning approach, this may lead to the practice of higher difficulty lessons until the Topic or Fundamental skill set under consideration is mastered.

The capabilities offered by the insight and recommendation engine 709 reinforce the acquisition of the fundamental skill sets. They allow for early detection of problem areas, intervention through coaching or provision of tutorials, adaptation of the learning path, and reinforcement of achievements. They provide capabilities to adapt the schedule of the learning path to align with classroom learning and to adapt to the schedule of the user.

According to aspects of some embodiments, the insights and recommendation engine 709 is accessed by an insights and recommendations solution in a web-based browser interface 713. A web-based browser interface 713 for the recommendation and insights solution allows for flexible access either from the mobile computer device with the OS overlay system and adaptive learning system, or one any device with a web browser running thereon.

A Virtual-Currency Based Reward System Redeemable for Virtual and Tangible Goods The virtual-currency based reward system provides incentives to the user to sustain practice and motivates achievements. The virtual currency can be earned through achieving high levels of proficiency in each lesson, topic and fundamental skill set. After each lesson, the user receives an instant feedback on his performance and is informed of the number of coins earned. An account indicator is available in the user environment and displays the number of coins earned to date. In addition to providing incentive for desired behaviors, in some embodiments virtual currency is used as part of a financial learning process to teach money management, how to save, how to use, how to choose, and other financial skills Financial education course work may be included as part of the FAL system or may be configured by parents according to personal guidelines.

The virtual coins can be redeemed for real rewards in the user environment. The user can visit the Treasure Box store and redeem the coins for a range of rewards. Rewards are organized by categories and by virtual coins value, and range from virtual goods—such as games, applications, music, ebooks, video content . . . —to real goods—such as toys, games, outdoor equipment, consumer electronics and consumer electronics accessories. Users can also identify wished items and work towards the specific number of coins required for these items.

The virtual coins used in the rewards system are purchased through the parental controls in the parental environment, and can also be used in chore list, further described below, towards educational or non-educational goals. Supervising users can for instance add "bonus" coins to the achievement of specific fundamental skill set mastery goals, and help ensure that the user focuses on priority learning objectives. From another point of view, supervising users can reward sustained practice or superior performance by awarding additional coins in chore list towards the redemption of a specific item identified as a wish by the user.

The integration of the Fundamental Adaptive Learning system with the Virtual currency rewards system raises the real and perceived value of learning achievements for the user, and drives repeat visits.

Content Store

A content store within the FALS allows additions, extension and updates to existing instructional items. In some embodiments, the content store further opens the FALS to providing third-party content, such as applications, textbooks, work-books, books and multimedia content such as video. This extends the subjects offered and the languages offered to make the FALS increasingly relevant to a greater number of children, including users for whom English is a second language.

The Content Store environment provides the features of browsing and search by grade, subject, fundamental skill set; courseware update and extension, with preview capabilities; recommendation of instructional items, from the FALS curriculum or from third-parties; in-app purchases and acquisition of third-party applications; and localization for other geographies, including navigation, content and payment.

In some exemplary embodiments, in-app purchasing functionality allows third party applications to use a central user account to make a purchase through a payment gateway included as part of the tablet's eco-system. The transaction may require a password for preventing unauthorized purchases.

Eco-System Integration with Third Party Apps

According to aspects of some embodiments of the invention, FALS, as a platform, leverages eco-system applications to enable some of the functions described above, such as a child-safe store where virtual coins can be redeemed for rewards, and a planning and goal-setting application that organizes commitments between the user and the supervising users. The FALS also enables, through authorization and configuration systems, monitoring and controlling behaviors with third-party-provided instructional applications that are not directly part of the FALS, such as third-party games and applications. In addition, the FALS enables third-party applications and accessories to be seamlessly integrated into some of the FALS functions, such as the recommendations, supervisor monitoring, and the reward and redemption system. These enablers allow to provide control, data capture, monitoring and incentives towards the educational purpose of FALS. The FALS platform supports a wide range of content types and formats, including paper, digital books, interactive textbooks and workbooks, audio and video material as well as applications.

The FALS platform is an environment for education third-party developers, content owners, and accessory makers to create applications integrated into the Adaptive Learning System. The Platform allows third-parties to integrate into and to have controlled access to user data, functions, and other features of the Adaptive Learning System including, user authentication and authorization, adaptive learning path, achievements and rewards system, virtual currency for "in-app" rewards and purchases, tracking and analytics, cloud storage and integration across devices and websites, application discovery and distribution through store environment. End user benefits include in particular the extension of the courseware accessible to a varied range of subjects as well as additional teaching methods and multiple languages.

The Platform has a software development kit, tools, documentation, and a developer web portal to assist with development, integration and management of third-party applications. The software development kit (SDK) consists of component libraries, example applications, and documentation for developers of application for the platform. The component libraries standardize the methods for accessing to the integration points of the platform. In some embodiments, the component libraries are available for use in Android-based application and web-based application (HTML/Javascript). The Platform includes a developer web portal, where developers request accounts, submit applications and content for review and approval, manage application permissions, and access application reports. The developer web portal is also where developer access documentation, libraries, examples, and support tools.

The platform allows integration of a third-party application into the Adaptive Learning System's user authentication and authorization scheme. This integration provides consistent workflow and user experience to initiate user "sign in" and permission requests. In some embodiments, OpenID and Oauth 2.0 standards for authentication and authorization are used. Authentication is exposed to third-party applications using a provided component library. This library simplifies the initiation and UI for authentication requests. Authorization is similarly simplified for third-party application. For example, the third-party application uses a provided component library to request a specific list of permissions. The component library will render a standard UI to prompt the user to allow or reject the request. The result is then passed back to the application.

The benefits of integration of user authentication/authorization include the ability for end users to quickly start using third-party applications and services without going through lengthy sign up processes; the retention of control by the end user over the data that applications can access; and the elimination of the need for sign-up/sign-in flows in the third-party application, thereby saving developers' efforts.

The platform further allows integration of third-party applications or content "lessons" into the Adaptive Learning Path by the user of categorization and metadata tags. Lessons are elements of an application or content library that is typically consumed in one sitting. For example, in a game, a lesson would be a level of the game. In a book, a lesson would be a chapter of the book. The Adaptive Learning Path will use this lesson data to create learning paths that can be personalized for the end-user.

Integration into the Adaptive Learning Path allows developers to receive an increase in spontaneous usage as end-users will organically experience and discover their applications and content. End-users benefit from discovering and experience varied application and content.

The platform also allows integration of the Adaptive Learning Path's achievements and rewards features into the third-party applications and content. End users will be able to mark achievements and receive rewards by badges, leader boards, and challenges that are standardized within the platform. The integration allows end-users to have sense of progression and accomplishment that transcends a single application, and developers benefit from the stronger and deeper engagement that an end-user experience within the Adaptive Learning System.

Other rewards schemes of the Adaptive Learning System that are available to the third-party applications and content providers include access to the virtual currency system. Under integration, the virtual currency/credits that are purchased by a parent and distributed to a user to as an incentive for usage and to monetize rewards and achievements are redeemable through the Kid Mode redemption interface to acquire third-party applications, and can also be distributed through achievements on a third-party application. Virtual currency can also be used to upgrade a third-party application from a trial or free version.

The platform further allows integration with the tracking and analytics features of the Adaptive Learning System with third-party applications. In some embodiments, third-party applications submit results, actions and experiences to the platform. The data is processed into usable information for integration into recommendations in the store, reports for end-user, and analytics for the developer in the developer web portal. With this integration, end-users receive reports on learning activity from third-party applications, and status, progress and recommendations for new lessons and activities based on both FALS and third-party applications.

Integration of the eco-system's cloud storage enables third-party applications to store state and data in the cloud. Progress, scores, and other user state data will be available and synchronized on every device to the cloud storage system to provide end-users with seamless integration across multiple devices. The integration provides reliable and secure storage at the eco-system for persistent user data, eliminating the need for a third-party application developer to provide separate data storage for end-users.

The Application Discovery and Distribution System is used to publish and integrate third-party applications and content into the content store environment. Developers use the developer web portal to submit application and content for approval. The approval process ensures the level of quality and API usage is up to standard. Once approved, applications and content are available for end-users to purchase and download.

Tracking Data Capture and Acquisition

Figure 7C:
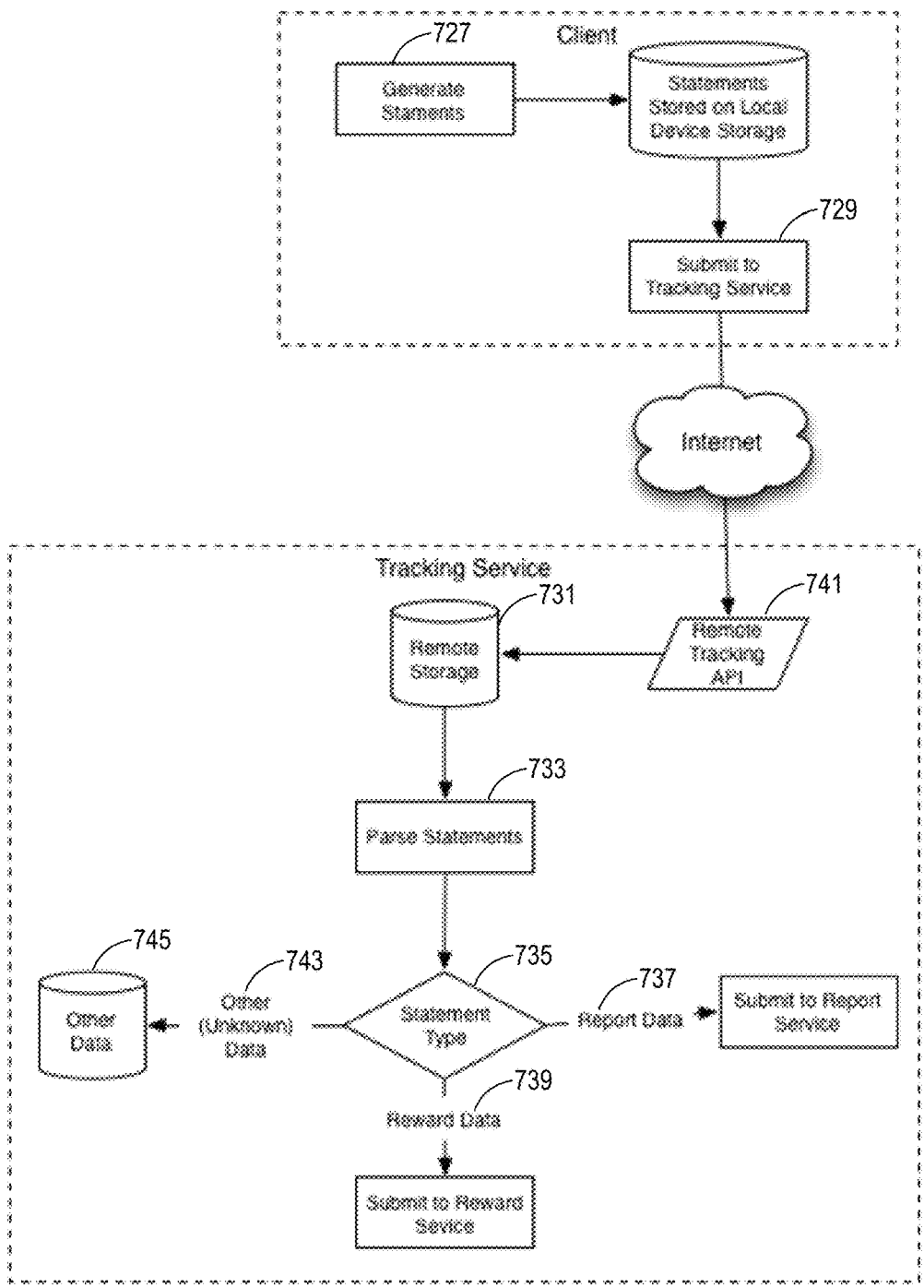

FIG. 7C illustrates a diagram showing some exemplary embodiments of a system for capture and acquisition of tracking data. According to aspects of some embodiments of the invention, the FALS data tracking technology allows capturing user information and behaviors in terms of interactions with the mobile device. All of the captured data is stored and can be used either for direct educational purposes, such as informing the Adaptive Learning Algorithm, or for indirect educational purposes, such as improving the user interaction to acquire or reinforce a specific skill set. While not all of the captured data is used up front, it is stored for historical purposes and provides a dataset that can be mined to keep enriching and evolving the FALS.

In a process for data capture and acquisition, tracking data is generated 727 and submitted 729 as statements. Each statement expresses a single action, event, or other state. Statements are in the form of actor-verb-object. Actor is the end-user performing the verb. The object is the target of the verb. Statements also translate to human-readable sentences. Statements further comprise a statement identification (I.D.) for detecting duplicate statements; a timestamp of the statement; an actor; a verb; and an object.

Statements also have common properties that are dependent on the verb/object being tracked, including data representing the result of the statement. For example, for a statement comprising actor-verb-object of "user answers question," the result would include if user correctly answered questions, the duration it took to answer the question, and the answer the user submitted. Common properties for statements further includes information that describes the context of the statement. For example, if statement is part of larger set of statements, the context would include reference to the larger set. Another use of context is to describe the device or location of the statement.

Tracking statements are designed to be flexible. New statements are easily created. Optional context and additional data properties allow tracking of user behavior across multiple types of devices and environments. This includes submitted statements based on input mechanism (touch, stylus, keyboard), device screen size, physical location, and other device and demographic information.

The raw tracking data is stored in a high-performance, high-availability data store 731. From there, the raw tracking data is processed and transformed into usable data by parsing 733 the statement into statement types 735. The usable data, such as report data 737 submitted to the report service, primarily results in reports for the end-user, and the parents, supervisors, or educators of the end-user of FALS.

The usable data is also used to synchronize state on the client device and the backend services. Achievements, rewards, and other gaming mechanics data 739 are submitted through the tracking API 741 to the reward service. The usable data is also used in internal processes to understand and analyze user behavior, engagement rates, benchmarking of the effectiveness of adaptive learning, and other usage metrics and statistics.

Other data 743 may include free-form structured data that does not fall into any known statement types. Data 743 is stored in backend service 745 for future use. Free-form structured data may be generated by a new client application configured to track certain data that is not known to the tracking API 741. At a later time, the tracking API 741 may be updated such that the free-form data 743 becomes usable data, for example, a new statement type is defined for such data, and the data 743 may then be incorporated into reports. This accommodation of other data 743 allows for new client apps to be developed separately from the development of the tracking API 741, and allows for future use of the acquired data.

The ability to build simple tracking statements in an asynchronous tracking system allows third-party applications to provide the same high-performance tracking and data synchronization for Adaptive Learning System Platform users.

Offline Usage and Syncing Between Offline and Online

According to aspects of some embodiments of the invention, the FALS operates and delivers direct instructional capabilities in offline mode, namely, in the absence of an internet connection. This capability enables use-cases for the FALS that far extend existing solutions. Unlike pen and paper solutions, the FALS system can capture user interactions and inputs, without limitation as to place and time. For example, any partial attempt or practice runs are captured in the system, and can be mined for additional insights into the level of proficiency and the learning path. Unlike traditional pen and paper, the online synchronization enables consistent and detailed reports on user activity.

Unlike online solutions, the user can be mobile, and can use the FALS in settings that do not provide Internet connections. For example, the user can be working in groups outside of the classroom or of the school environment, "in the field," and pursue practice or capture insights on the go. Additionally, the FALS can be configured with assignments and syllabus by one supervising user and handed over for the user's benefit in a different time, location or learning context. The ability to achieve this level of personalization while making the supervision asynchronous is very distinct from the online solution model, which typically requires the supervising user to be present during the session.

Captured dataset, input and interactions are captured and synchronized automatically with back-end and cloud-services the moment an Internet connection becomes available.

To support offline usage, the backend service is designed to receive data asynchronously. Clients submit statements in bulk whenever an Internet connection is available. The backend service is lightweight and flexible to allow quick and reliable submission of tracking data. By using an asynchronous Statement submission and placing the core of the application logic in the client, the educational service can operate without Internet connection.

Settings and data are synchronized periodically from the backend service to the educational service clients. This effectively enables a "push" service whereby the service can sent updates to the client for update courseware and curriculum data.

Parental Controls on a Tablet PC

Parental controls have been utilized in digital television services, computers, browsers, video games, mobile phones and software. Parental controls have been implemented in various forms, including: 1) content filters—which limit access to content; 2) usage controls, which place time limits or forbid certain types of usage; 3) usage management tools, which allow enforcement of behaviors; and 4) monitoring tools, which can track activity. Parental controls are typically for the management of movies, music, pictures and web pages, or other traditionally defined content. However, on a tablet computer these functions are very different because a tablet computer further includes a touch-input interface, third-party applications, in-app purchases, social networking integration and interfaces, and social gaming features.

According to aspects of embodiments of the invention, parental controls include a content acquisition white list that allows children to choose by character picture rather than by text description or name for children who cannot read yet. In some embodiments, the parental controls interface are implemented in a touch screen input environment rather than input by a mouse and cursor.

Parental controls are embedded across multiple children profiles and across different user interfaces or devices that are registered or set up under the parental control system, in some embodiments one for parents and another for children. A tablet presents a unique environment for implementing parental controls because it introduces multiple user interfaces and software environments for the operating system, system overlays, browser and third party applications, including social networking, social gaming features and in-app purchases.

According to aspects of embodiments of the invention, parental controls are also implemented for third party applications running on the OS Overlay System. While content filtering as a methodology for implementing parental controls may not be effective in third party applications that can bypass such controls, parental controls implemented in the OS Overlay System are effective for controlling usage of third-party applications. For example, on a web browser, parental controls may filter and block access to web addresses or web pages that may otherwise allow a user to gain access to the native OS system of the device. Requests for web resources in the browser are captured and allowed to be processed only if they meet predetermined parameters corresponding to the user environment, such as parameters determining permissible content, web pages and/or domains, in-app purchases, and the like. Requests for resources that are not permitted in the corresponding user environment are disregarded. This approach advantageously prevents display of third-party ads and link outs to unapproved web pages and/or domains.

In some embodiments, password entry may be required to authorize access to certain processes and actions in the OS Overlay system while in Kid Mode. The password may be the same password set for entry into Parent Mode. Granting of access by entry of the password does not require leaving the Kid Mode UI or leaving the current navigation state. Further, the interface for prompting entry of the password includes a prompt to the child user to ask a parent for access or permission, rather than a direct instruction to enter a password. In a tablet environment across dedicated user interface for children content limitations are less important than secondary approvals like buy or not buy.

In some embodiments, in addition to limiting and managing access, parental controls include the use of virtual currency to reward positive behavior as monitored by the device. An example of an interface for rewarding and using virtual currency includes a redemption center for content, apps, games, apps and real games, which may be themed as a treasure chest motif.

In some embodiments, parental controls provide usage controls within third-party apps, in-app purchases and social networking linking and advertising. While a third-party application may be approved and/or appropriate for a given user, it may include functionality for in-app purchases, advertising, social networking links that are not approved and/or appropriate for the user. The OS Overlay and native driver implementation facilitates disabling this type of linking by intercepting all linking web requests and only allowing authorized linking to approved web pages and/or domains. Further, in some embodiments, parental controls are implemented and/or enforced within a browser, such as browsers for the Android mobile OS.

Figure 8:
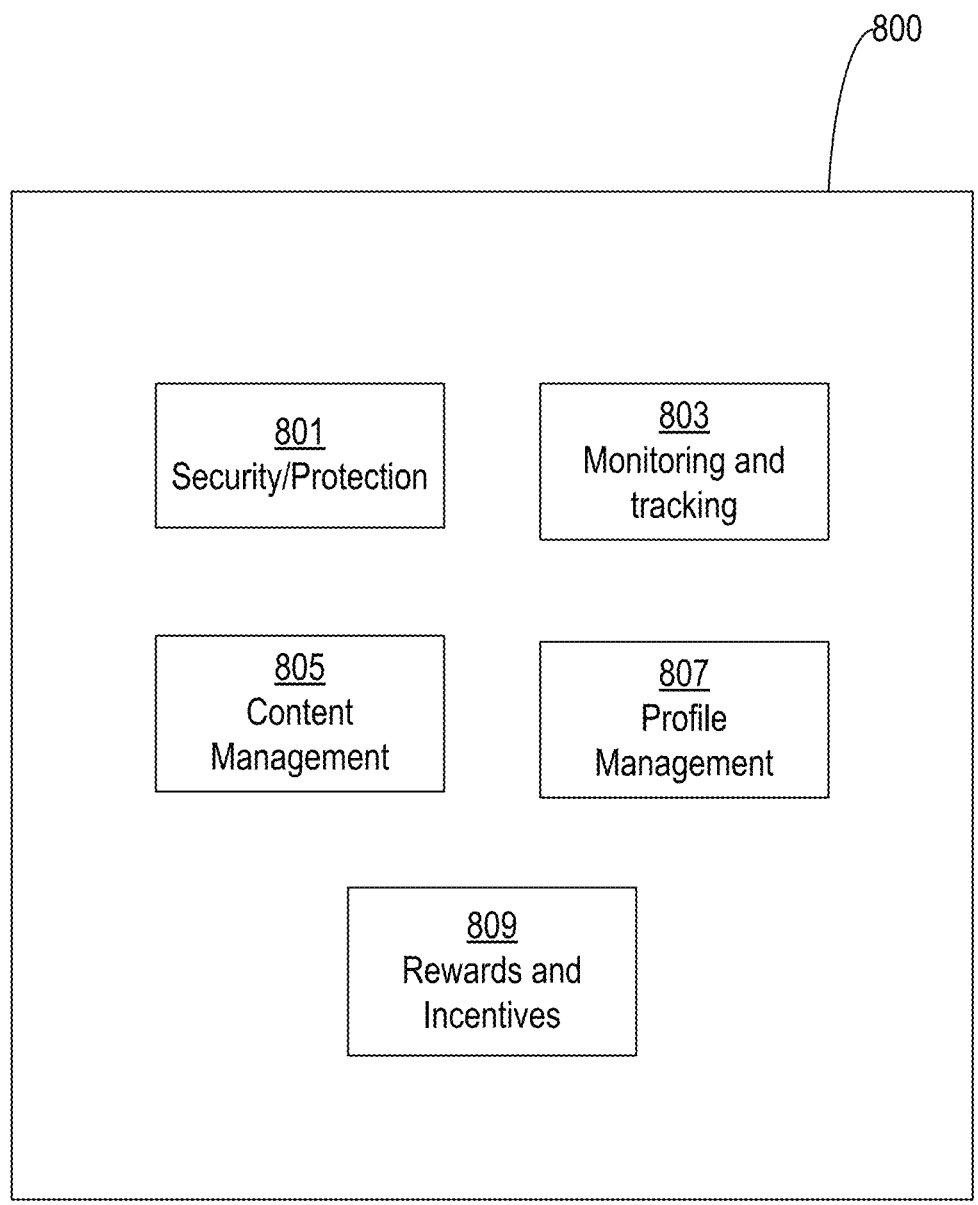
FIG. 8 is a diagram illustrating aspects of the parental control system, according to some embodiments.

FIG. 8 is a diagram illustrating parental control system 800, according to aspects of embodiments of the invention. Parental control system 800 may be accessible as a interface on a tablet device, as a web-browser-based interface, or as a personal computer application running on a personal computer operating system. Changes to the management parameters or settings may be propagated to the applicable devices. Parental control system 800 includes security/protection features 801, monitoring and tracking features 803, content management features 805, profile management features 807, and rewards and incentives features 809.

Figure 9:
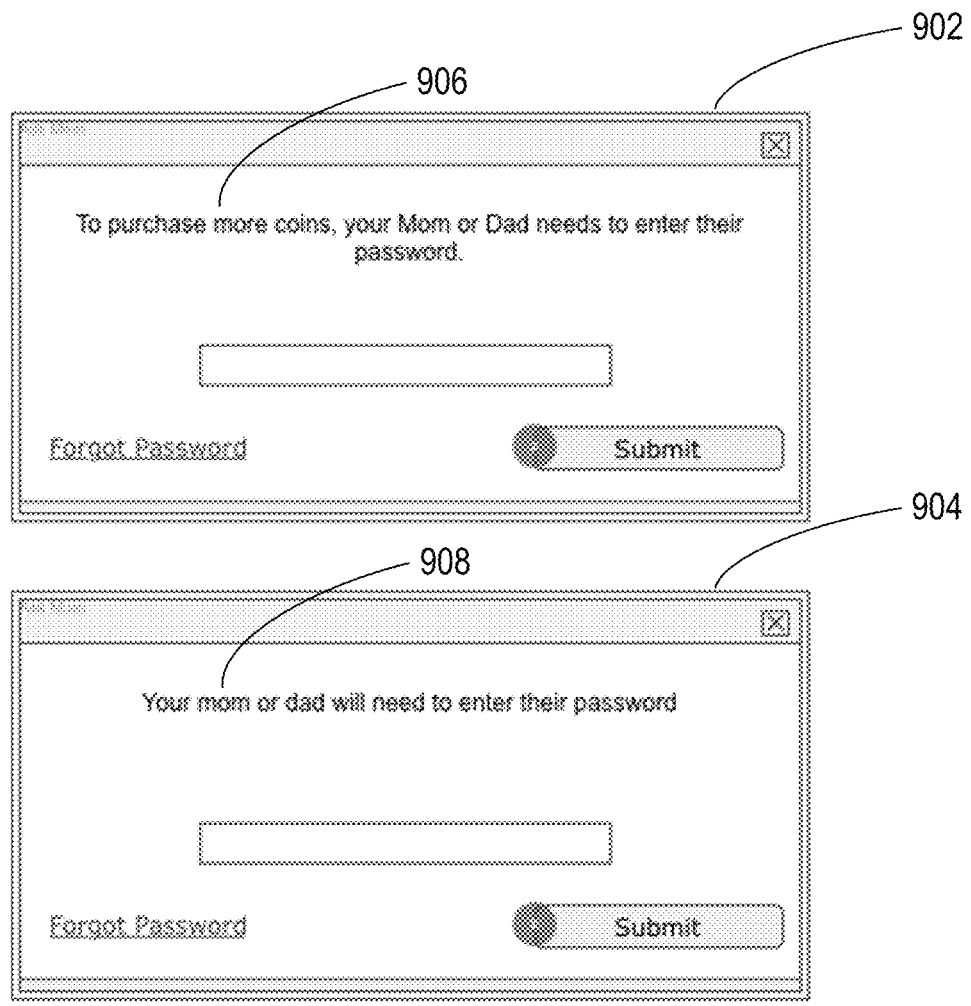
FIG. 9 is a diagram illustrating examples of user interfaces for prompting the input of a password, according to some embodiments.

Security/protection features 801 include features which manage the security of the system's environment and of your child's privacy. For example, security/protection features 801 include a persistent management tool for prompting of password entry, and granting access to a restricted action, interface, application, or area when the password is authenticated. FIG. 9 illustrates an example of interfaces 902 and 904, and prompts 906 and 908 employed for instructing a user to seek parental passwords.

FIGS. 10 to 25 include user interfaces used to access some features of the parental control system 800. The interfaces may be implemented in a variety of formats, including in mobile device apps, in a windowed computing application, in a browser-based environment, or other user interface format or combination of the above.

Figure 10:
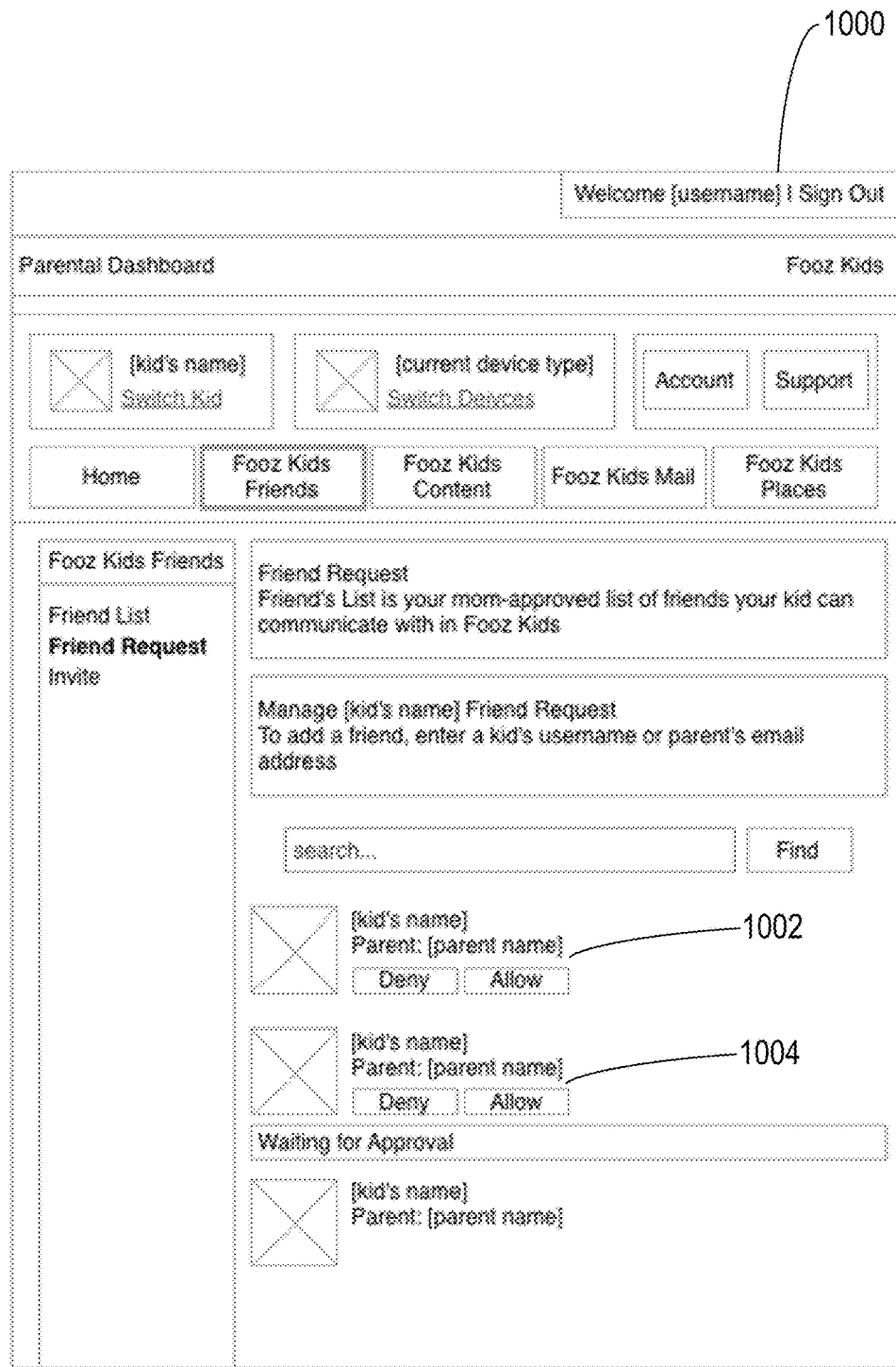
FIG. 10 is a diagram illustrating a user interface for accessing a parental dashboard, according to some embodiments.

FIG. 10 illustrates an example of an interface 1000 for managing a friend list as part of security/protection features 801. The friend-list management feature allows management of whom each child can connect with by adding, deleting or blocking friend requests, such as friend request 1002 and 1004. From the parent account, a supervising parent can control which other ecosystem user establishes a friend connection with a kid account.

Figure 11:
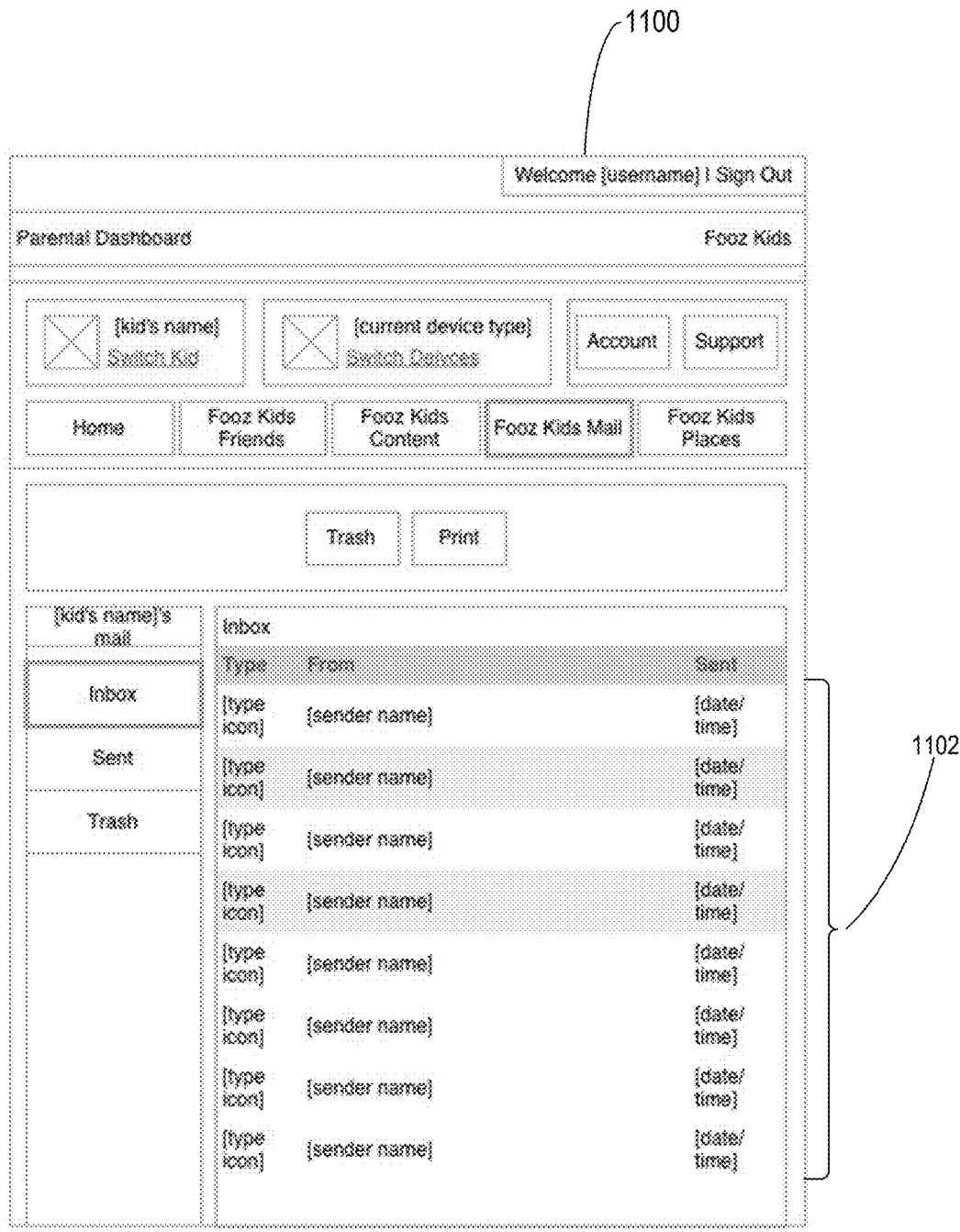
FIG. 11 is a diagram illustrating a user interface for managing notifications, messages, and alerts for a child's profile, according to some embodiments.

FIG. 11 illustrates an example of an interface 1100 for managing notifications, messages, and alerts for a child's profile. According to some embodiments, the parental control system 800 provides the interface within the parent account from the server of the child-safe ecosystem. The interface delivers and manages alerts and notifications, such as messages 1102, that are accessible to a parent account about the each child's activities, messages and progress in the ecosystem. The interface also allows control over when and how to receive notifications regarding the child's account.

Figure 12:
FIG. 12 is a diagram illustrating a user interface for alerting the user of a blocked link-out, according to some embodiments.

FIG. 12 illustrates an example of an interface 1200 alerting the user of a blocked link-out, blocked by the OS Overlay System and Parental Control System 800. The parental control system also systematically blocks third party ads, in-app purchases and link outs to unapproved web sites on third-party apps without requiring any changes to the third-party app as provided by the third-party app developer. In exemplary embodiments, the OS Overlay System captures substantially all user input, including user input in third-party apps, determines whether each user request is for a permitted resource as determined in a user profile, and only allows processing of user requests that are determined to be for resources that are permissible under the corresponding user profile. In addition, with respect to web resources, the OS Overlay System limits the content accessible in a web browser by permitting the browser to access and render content only from predetermined web pages and/or domains, thus preventing display of third party ads from different domains, in-app purchases, and link outs to unapproved web sites.

Figure 13:
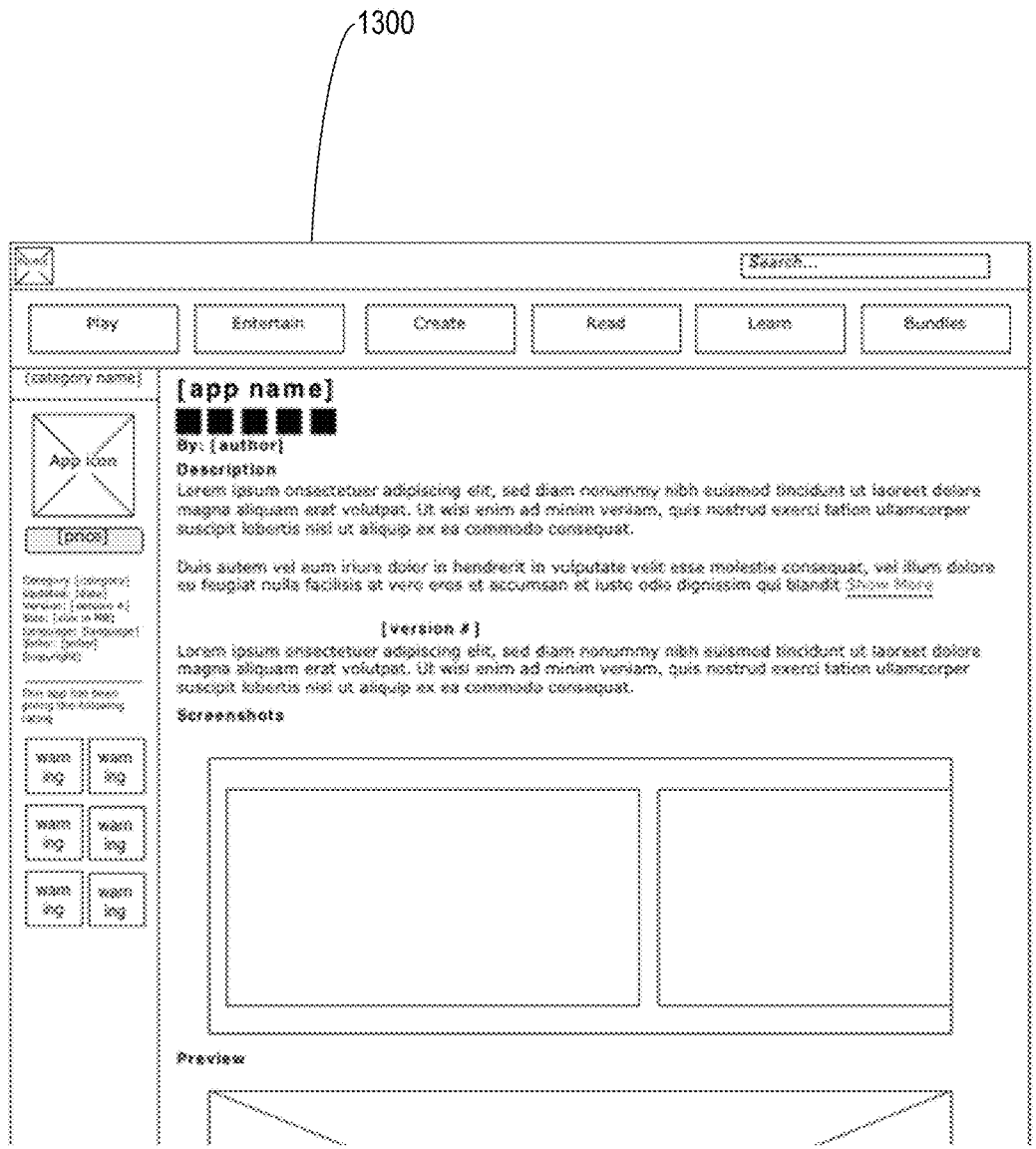
FIG. 13 is a diagram illustrating an example of a user interface for providing parental guidance, ratings and warnings, according to some embodiments.
Figure 14:
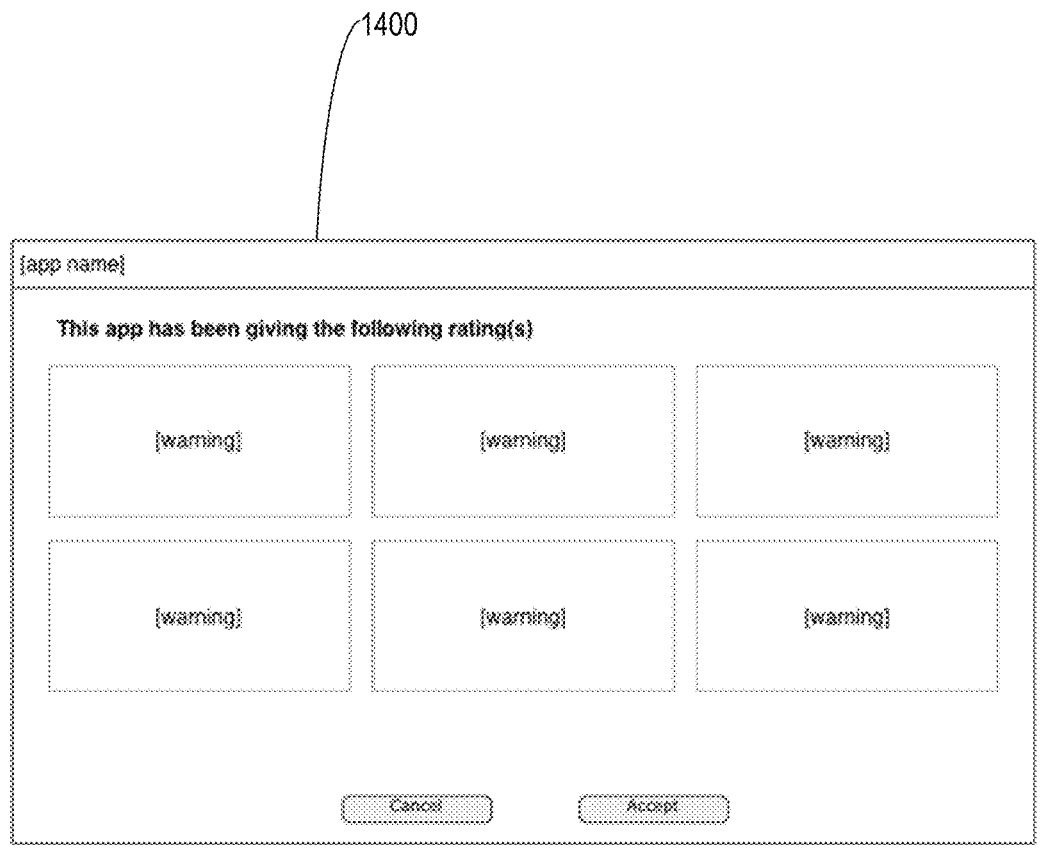
FIG. 14 is a diagram illustrating an example of an user interface for informing a parent of particular warnings for apps, according to some embodiments.

FIG. 13 illustrates an example of an interface 1300 for providing parental guidance, ratings and warnings on ads, social networks, web link-outs and age suitability for apps, websites and third party content. FIG. 14 illustrates an interface 1400 for informing a parent of particular warnings for apps.

Monitoring and tracking features 803 for activities performed online and on the device are included in parental control system 800, with further reference to FIG. 8, according to aspects of embodiments of the invention. Tracking and monitoring features 803 include monitoring messages, which includes: reviewing and approving messages sent to and from each child's account, which may be performed from the interface as shown in FIG. 11; monitoring whom each child can connect with by approving or rejecting friend requests, which may be performed from the interface as shown in FIG. 10; tracking and controlling time and usage on interface 1500, as shown in FIG. 15, including tracking and controlling each child's activity usage and time spent, receiving immediate feedback on the type and level of activities completed as well as specific content or recommendations they may be interested in; and locating the device through a personal global-positioning-system locator or Wi-Fi locator.

Figure 15:
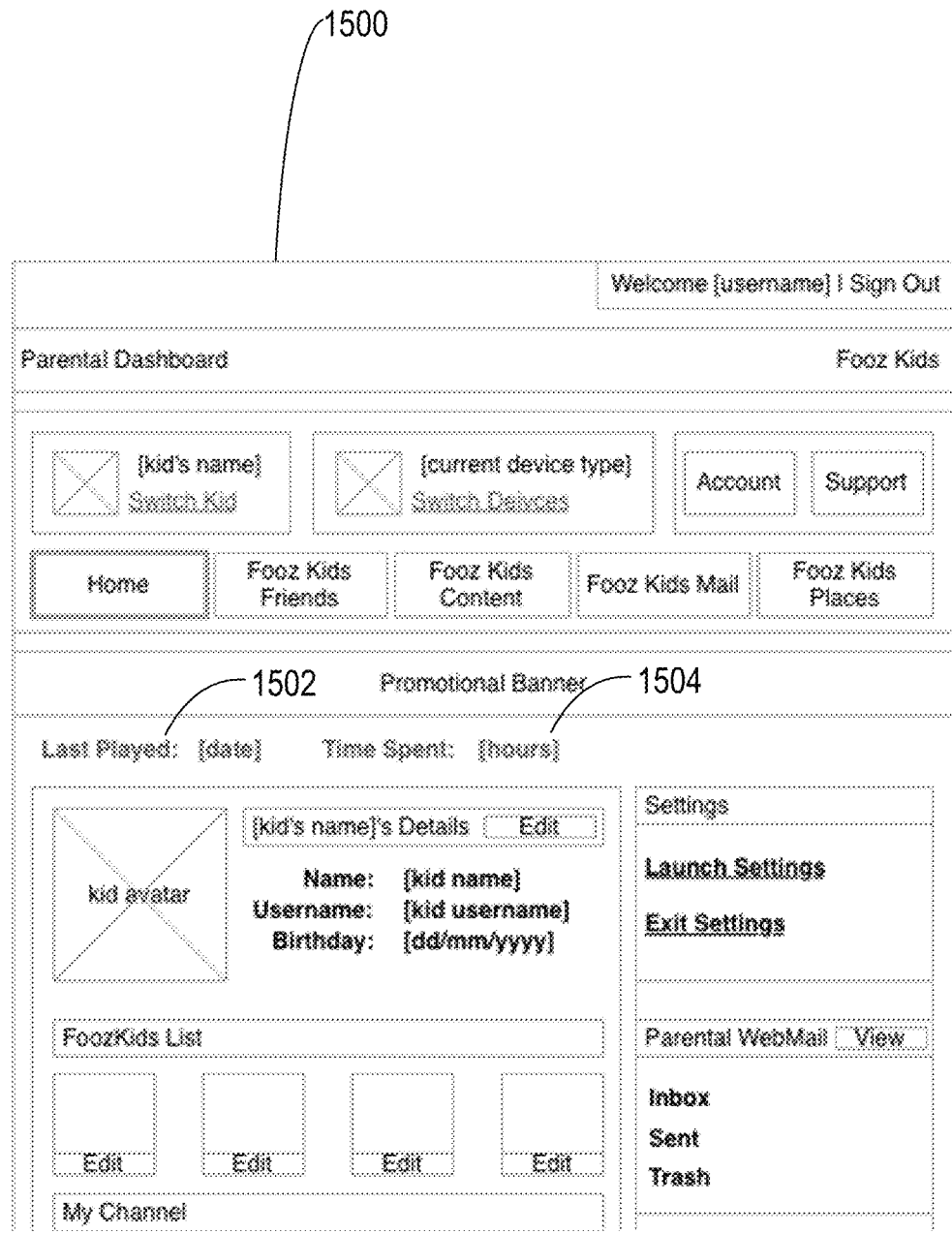
FIG. 15 is a diagram illustrating an example of a user interface for tracking and controlling time and usage, according to some embodiments.

With further reference to FIG. 15, which shows a particular view of interface 1500, the time management and usage interface 1500 includes usage indications, such as for date last played 1502, time spent 1504, for a particular kid profile on a particular device. Immediate activity-specific feedback, and content and activity recommendations may be introduced to the parent through one of the views (not shown) within the time management and usage interface 1500. This information can provide parents with insight as to how well their child is performing or not performing.

Content management features 805 for content management for websites, videos, music, pictures and apps is included in the parental control system 800, with further reference to FIG. 8. Content management features 805 includes management and control of multiple devices, management of applications, management of content white list, and management of categorization and rating of third party applications for kid-friendliness, management of personalized content lists for each kid user account in the ecosystem.

Figure 16:
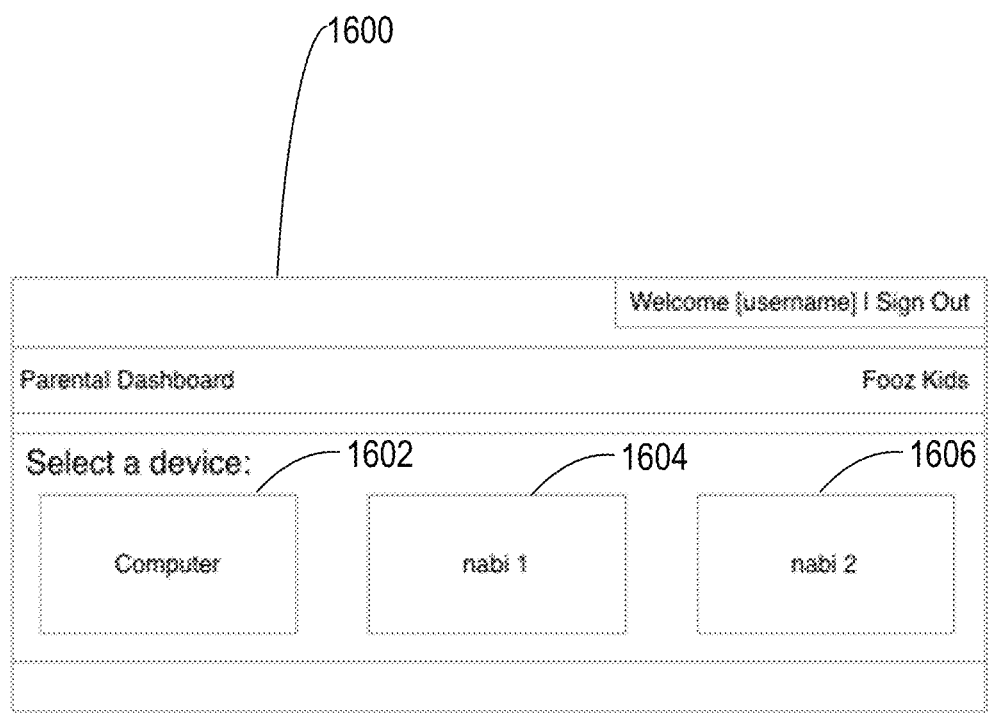
FIG. 16 is diagram illustrating the selection user interface for parental controls to select a particular device, according to some embodiments.

FIG. 16 is a diagram illustrating the selection interface 1600 for parental controls to select a particular device out of a group of devices registered under the same parental control system for management. Such a centralized system and interface allows parental control over the content available across multiple devices registered within the system (i.e., computer 1602, tablet 1604, television box 1606).

Figure 17:
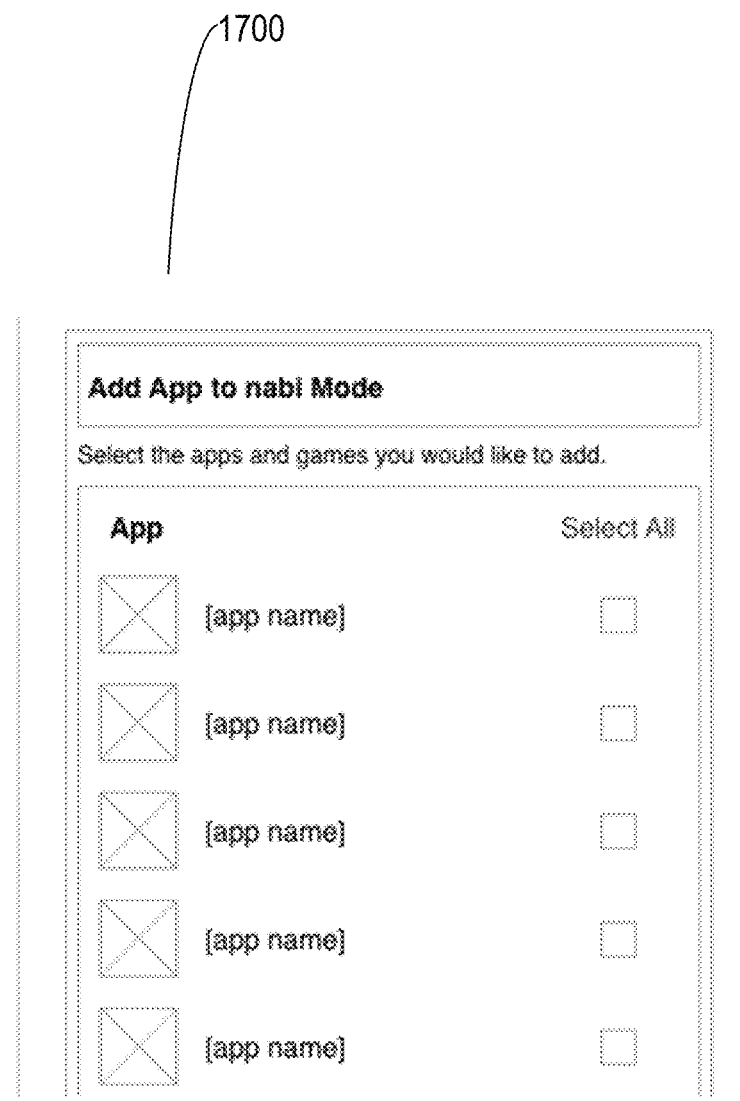
FIG. 17 is a diagram illustrating a user interface for managing to access to applications, according to some embodiments.

FIG. 17 is a diagram illustrating an interface for managing to access to applications according to aspects of embodiments of the invention. As shown, the interface 1700 is for managing applications for a particular device that was previously selected from interface 1600 as shown in FIG. 16. The interface 1700 allows a parent to manually add and remove apps that each child can see, hear, play, and experience. This feature allows users to separately control what content is displayed on both child mode and parent mode. In both modes, there is a separate browser made available. In child mode there is a kid-safe browser where kids can safely explore specific content online and in parent mode the browser is a full-featured browser with no restrictions.

Figure 18:
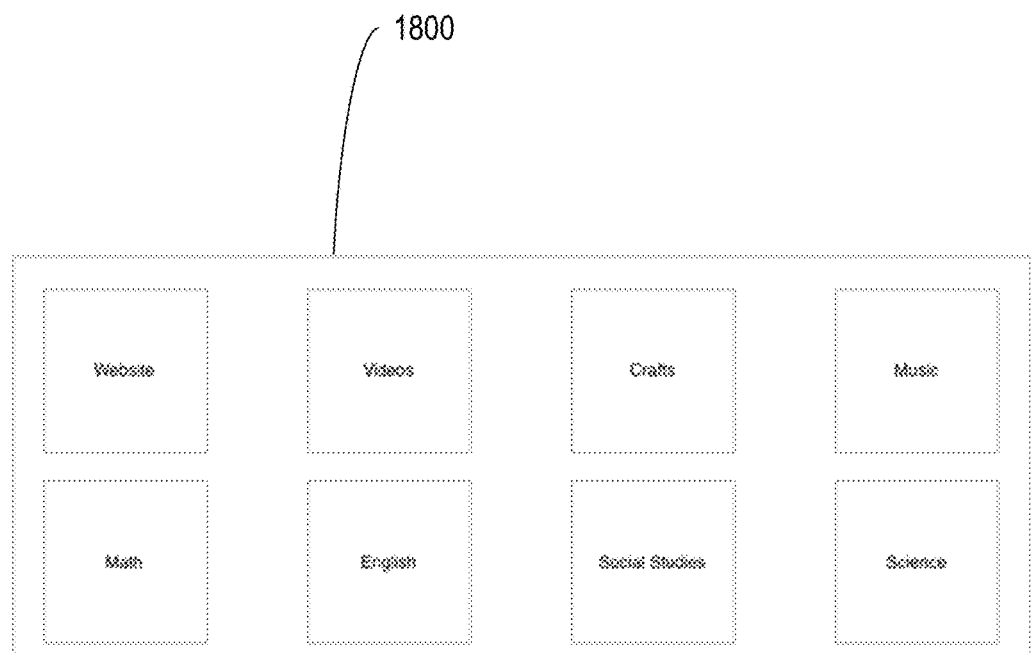
FIG. 18 is a diagram illustrating a user interface for placing content onto a "white list" of approved content, according to some embodiments.

FIG. 18 is a diagram illustrating an interface 1800 for placing content onto a "white list" of approved content, organized as shown on interface 1800 by category-based icons, curated and pre-selected manually, that are age appropriate and aligned to a kid's interests. In contrast to black listing content based on a list of restricted words, white listing content provides the parents complete control of what they want their child to view and explore.

Figure 19:
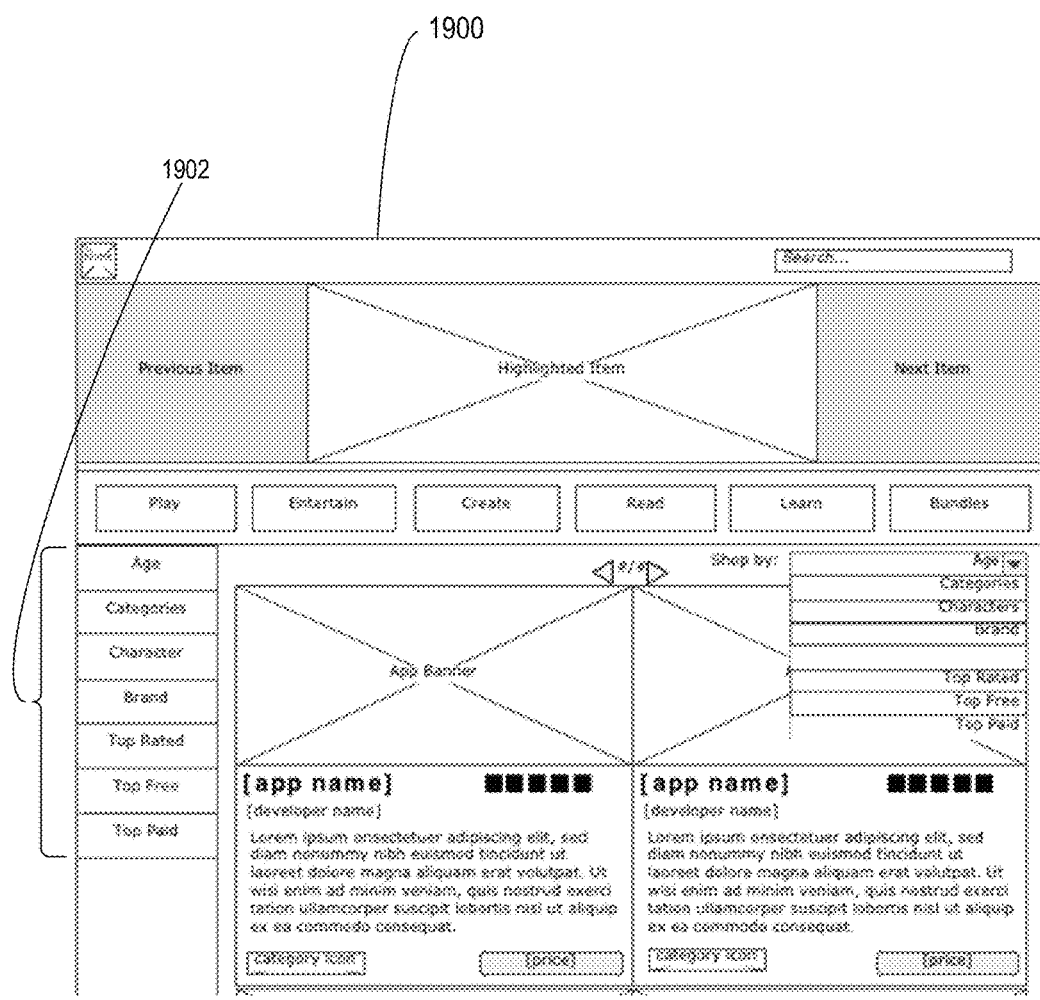
FIG. 19 is a diagram illustrating a user interface for acquiring and downloading content, according to some embodiments.

FIG. 19 is a diagram illustrating an interface 1900 for acquiring and downloading content according to aspects of embodiments of the invention, which includes filtering options 1902 for listings of third-party applications and content by suitability for age, gender, character, brand and interests.

Figure 20:
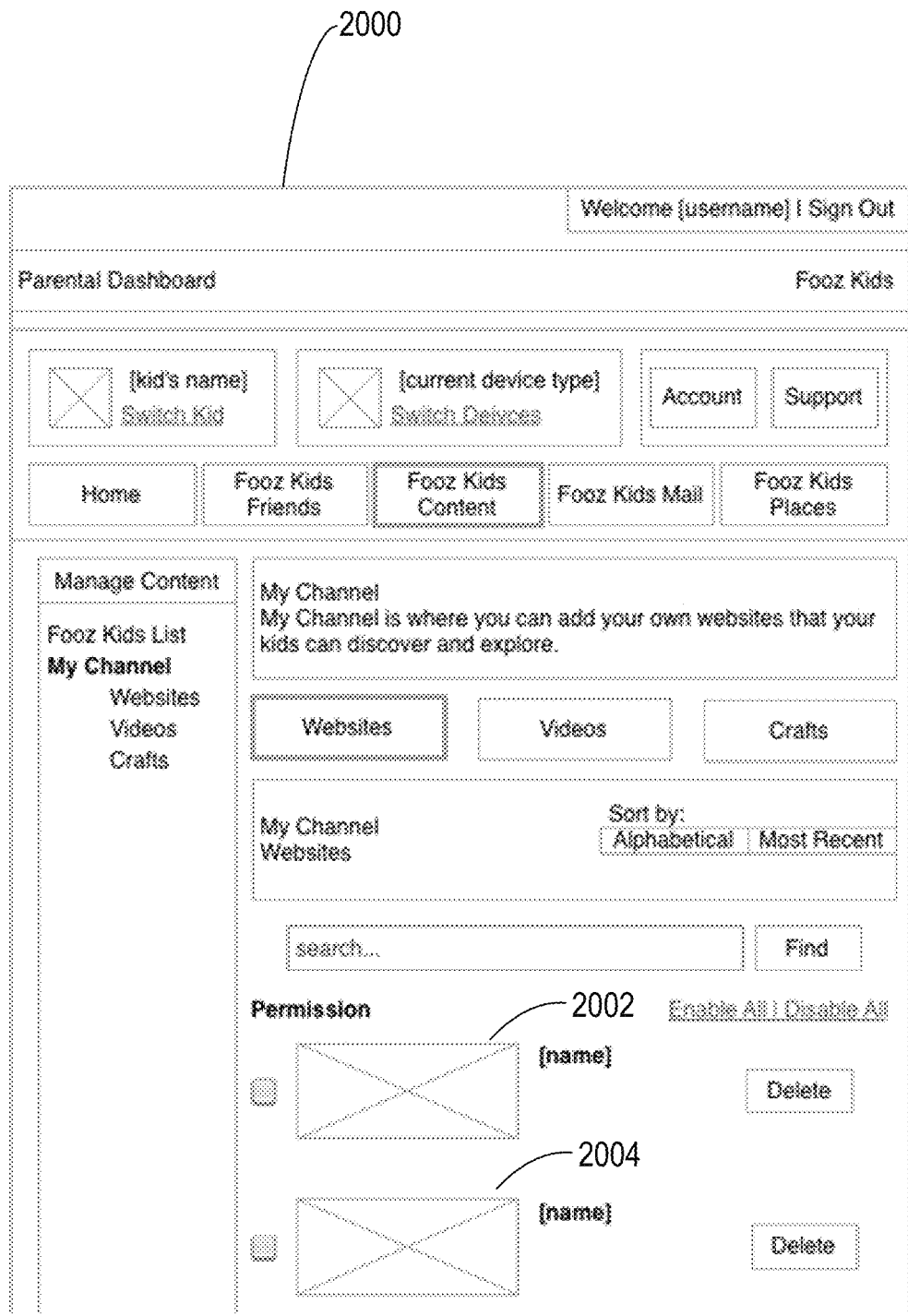
FIG. 20 for personalized content for a particular kid user account, according to some embodiments.

FIG. 20 is a diagram illustrating an interface 2000 with a view of the parental controls for personalized content for a particular kid user account. Interface 2000 is an area where parents can search and create customized white lists of websites, videos, games and crafts. In the view shown in FIG. 20, websites 2002 and 2004 have been added to a white list. In some embodiments, the white list is managed by a server of the child-safe ecosystem, and is controlled via a web interface. The white lists are made available via a network connection to any mobile device in the child-safe ecosystem for permitting access to the white-listed items by the devices associated with the particular kid user account. Each white listed item may be assigned an icon, which is shown in a kid mode interface on the mobile device for selection. In some embodiments, white lists are arranged and customized for each separate child's user account. The customized white list allows a parent to broaden mobile device system's access to content that is available on the Internet, but may not be part of the curated apps available in the child-safe ecosystem. This feature further allows parents to control all content specifically to a particular child.

Figure 21:
FIG. 21 is a diagram illustrating a user interface where the profile details are inputted by the parental control system, according to some embodiments.

With further reference FIG. 8, profile management features 807 is included in the parental control system 800. Profile management features 807 include management of one or more specific kid user account created or registered under the parental control system 800. More particularly, profile management features 807 include automatically curating experiences across content and applications to create an automated experience for each child's profile based on age, gender and other preferences associated with the profile. FIG. 21 is a diagram illustrating an example of an interface 2100 where the profile details are inputted by the parental control system. Other profile management features 807 include virtual currency management, and management of multiple child user accounts and profiles registered with the particular parental control system.

Figure 22:
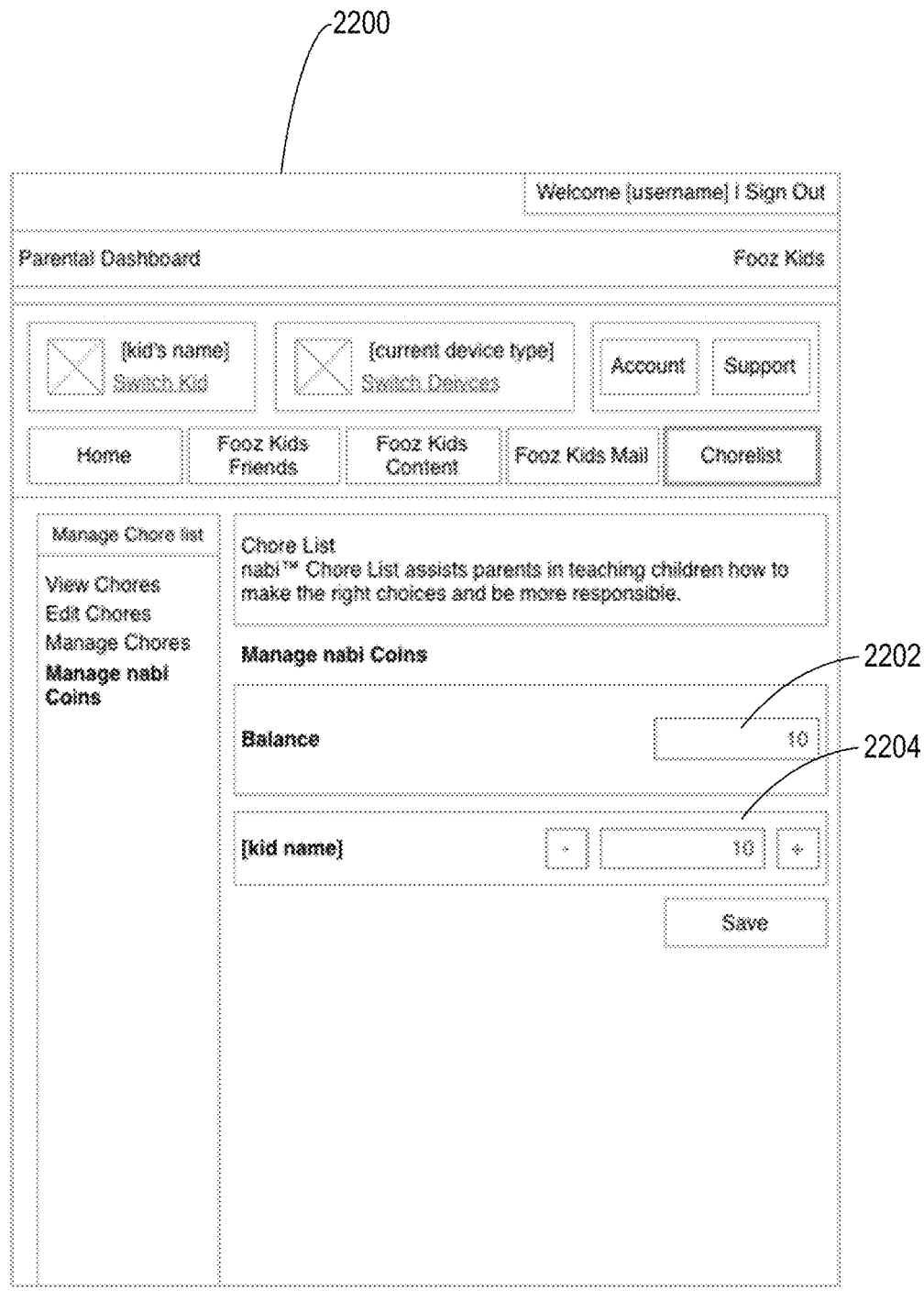
FIG. 22 is a diagram illustrating a user interface which includes a view for management and acquisition of virtual currency, according to some embodiments.

FIG. 22 is a diagram illustrating interface 2200 which includes a view for management and acquisition of virtual currency. According to aspects of embodiments of the invention, virtual currency is earned in return for completing certain activities or tasks, including completing lessons from the Adaptive Learning System described above, or by recording completion of tasks, such as chores on a chore list, in an interface. Chore lists are described in further detail below.

The interface 2200 as shown in FIG. 22 allows the allocation, and management of a kids' currency that can be earned and spent within the child-safe ecosystem. In some embodiments, the management and allocation of coins is based on each child's activity and performance. For example, a method for rewarding activity includes purchasing virtual currency with real currency; distributing virtual currency to user accounts based on the recordation of the completion of certain tasks, objectives, or activities in the child-safe ecosystem, and providing content and apps to a child's user account to fulfill orders paid for by the virtual currency. In some embodiments, the parental control system 800 has full control over the virtual currency purchased with real currency, and may distribute the currency manually to a child's user account, or it may be automatically distributed based on a predetermined distribution scheme as related to certain achievements and accomplishments. The predetermined distribution scheme for automatic distribution can also be managed and overridden by a parent account. In some embodiments, if different children's user accounts buys content or an app with virtual currency, where the content or application has already been purchased by another child's account associated with the same parent account, access to the content or app will be given to the new child account, but the parent account may be credited with the virtual currency spent. Interface 2200 shows balance 2202 of virtual currency available for distribution, and an area 2204 for inputting a distribution amount for distributing to a kid's user account.

Figure 23:
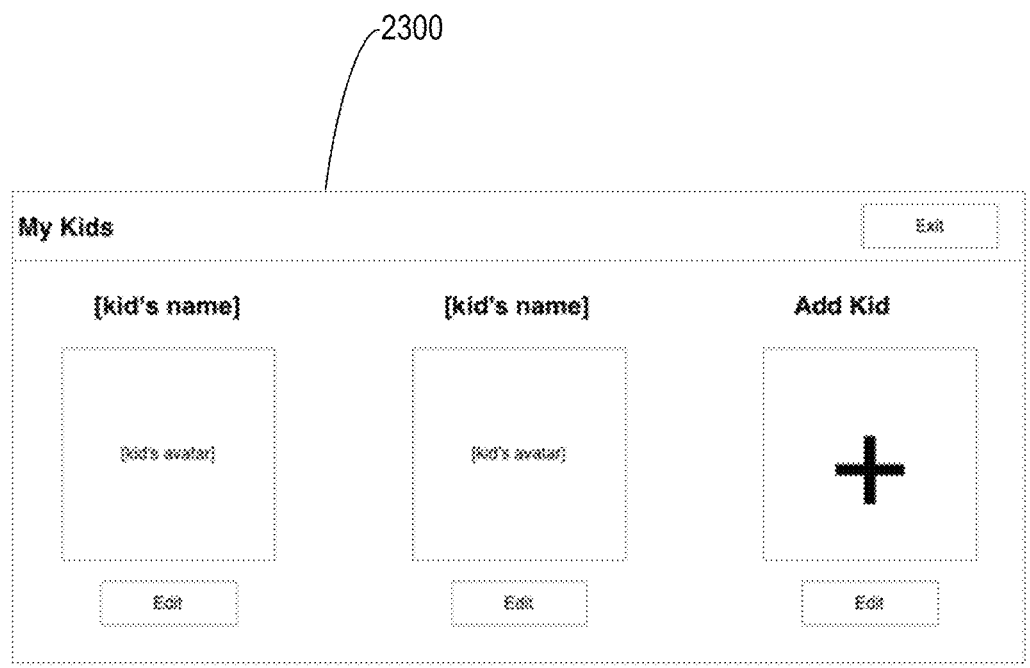
FIG. 23 is a diagram illustrating a user interface for accessing controls to multiple kid user profiles and/or accounts registered with the parental control system, according to some embodiments.

FIG. 23 is an diagram illustrating an interface 2300 for accessing controls to multiple kid user profiles and/or accounts registered with the parental control system 800. The parental control system 800 provides the ability to control, monitor and personalize multiple kid accounts on any device.

Figure 24:
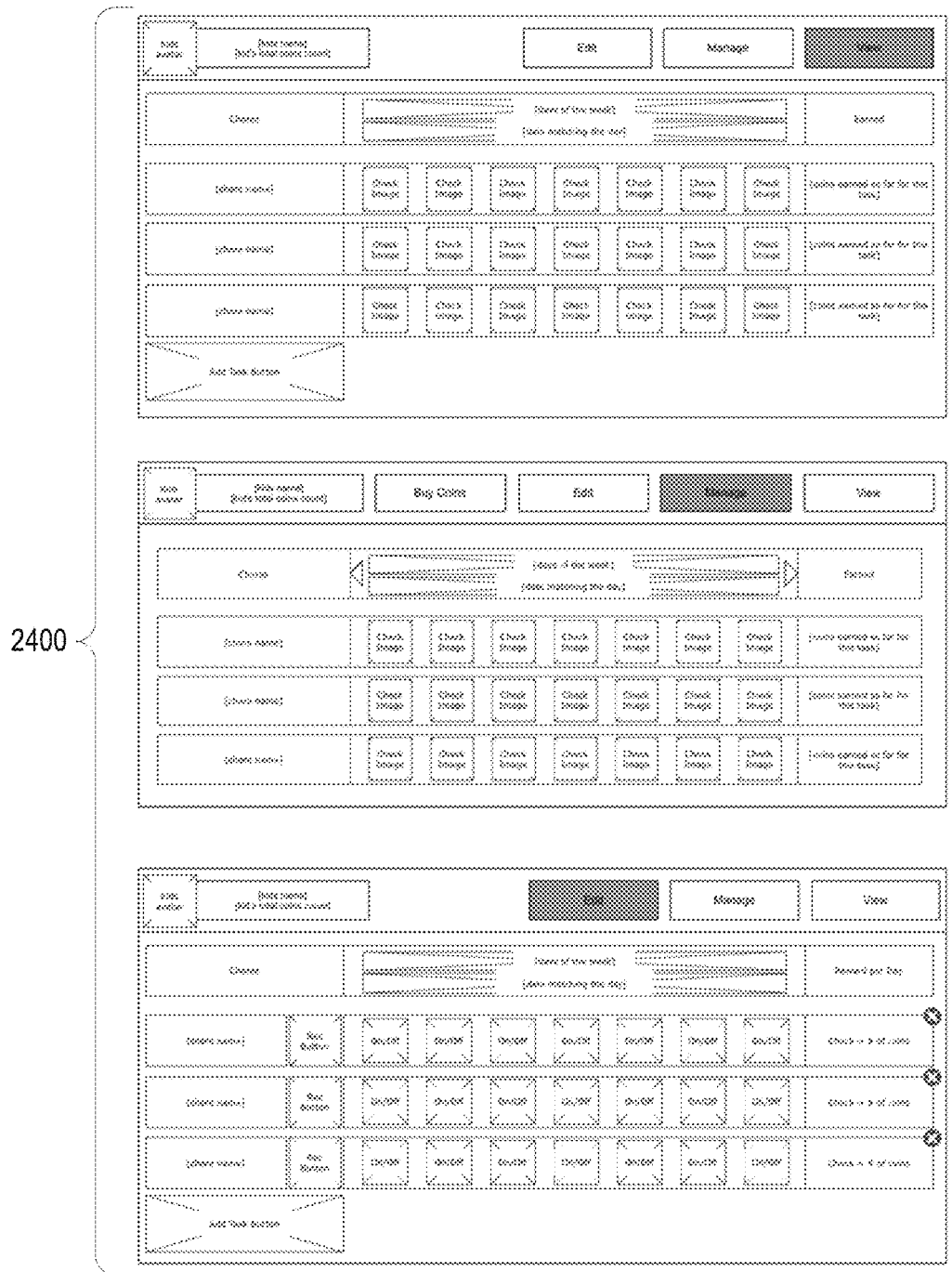
FIG. 24 is a diagram illustrating a user interfaces for a chore list system, according to some embodiments.
Figure 25:
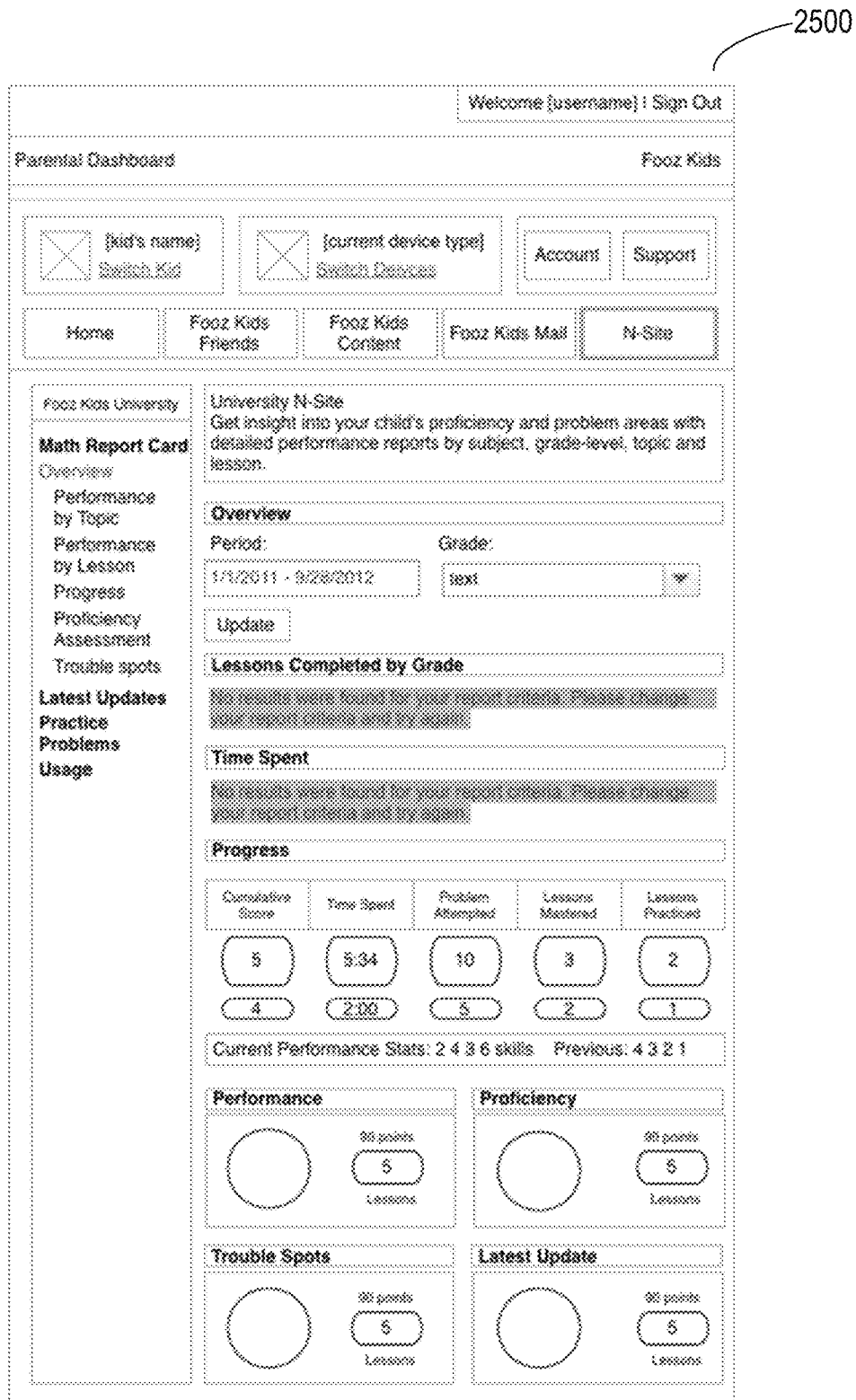
FIG. 25 is a diagram illustrating a user interface for reviewing and tracking rewards and incentives as relating to progress in educational content, according to some embodiments.
Figure 26:
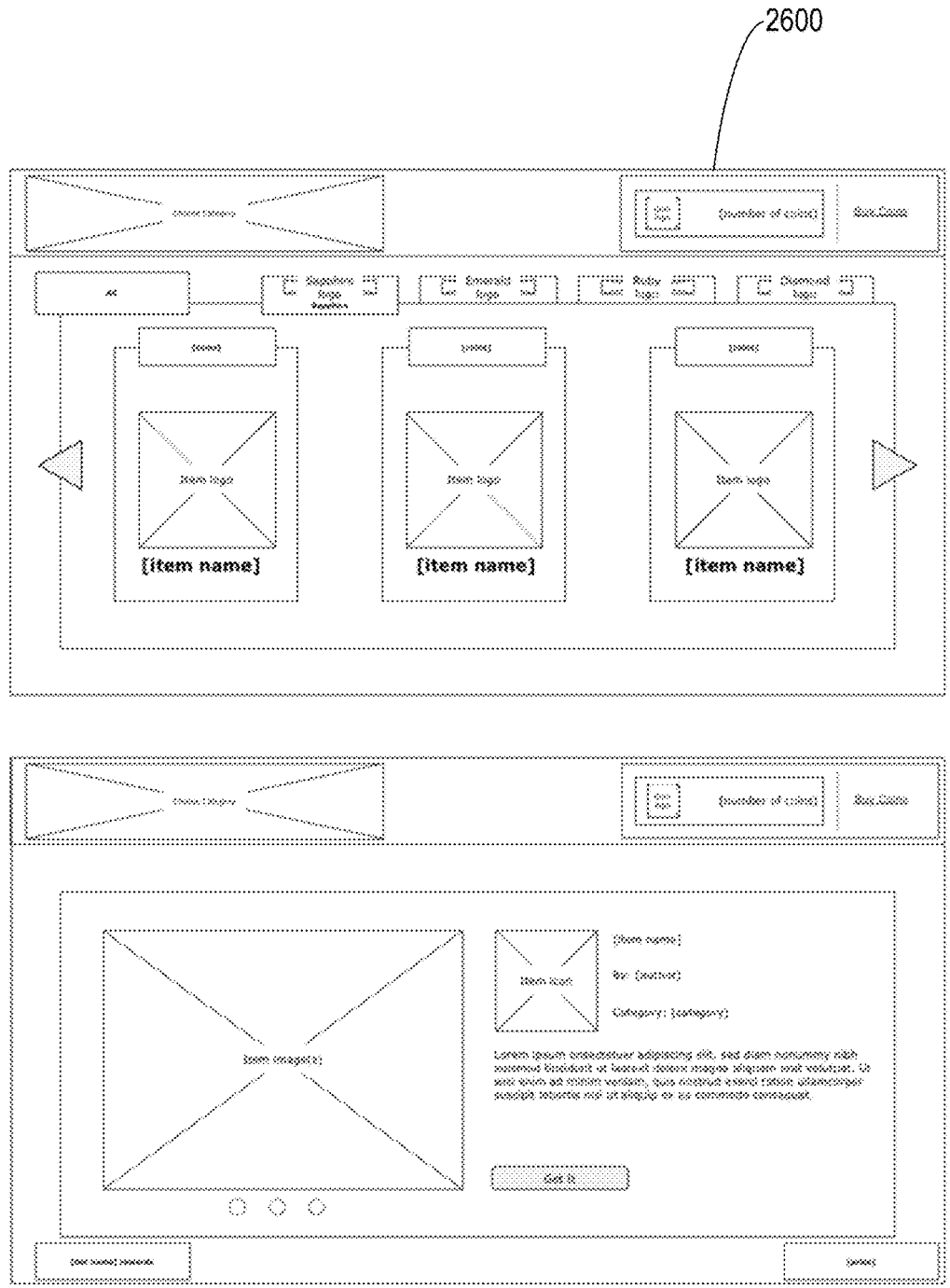
FIG. 26 is a diagram illustrating a user interface for spending or redeeming virtual currency or other credit or reward for obtaining digital content or real items, according to some embodiments.

FIGS. 24 to 26 are diagrams of interfaces for accessing and managing rewards and incentives in the child-safe ecosystem, including the chore list system, the adaptive learning system, and the treasure box virtual currency store system. FIG. 24 is a diagram illustrates chore list interfaces 2400 for the chore list system. The chore list system helps kids learn about responsibility, accountability, and trust by assigning and tracking activities, or chores, to kids through the chore list interfaces. Parents can choose which chore priorities the child has by day and by week, and track and reward them in the chore list interfaces 2400.

FIG. 25 is a diagram that illustrates interface 2500 for reviewing and tracking rewards and incentives as relating to progress in educational content. The interface 2500 displays reports as associated with a selected kid user profile, including reports for performance by topic, performance by lesson, progress across assignments, problem sets, lessons and topics, proficiency assessments, and summaries of mastered skills, skills in progress, deficiencies, trouble spots, or difficulties. Interface 2500 includes views for particular children, including reports of performance as associated with a particular kid user profile. Interface 2500 also provides detailed metrics and insights into a child user's proficiency by grade, subject, topic and lesson.

FIG. 26 is a diagram that illustrates interface 2600 for spending or redeeming virtual currency or other credit or reward for obtaining digital content or real items, such as games, apps, music, videos, or tangible goods or accessories. As previously described for some embodiments, the virtual currency is managed and distributed by the parental control system, and can be purchased with real funds. Virtual currency can also be credited to a parent account through a promotional or subscription program. In some embodiments, a treasure chest or treasure box theme is employed for presenting interface 2600.

Character-Based Display of Parental Control Information

Figure 34:
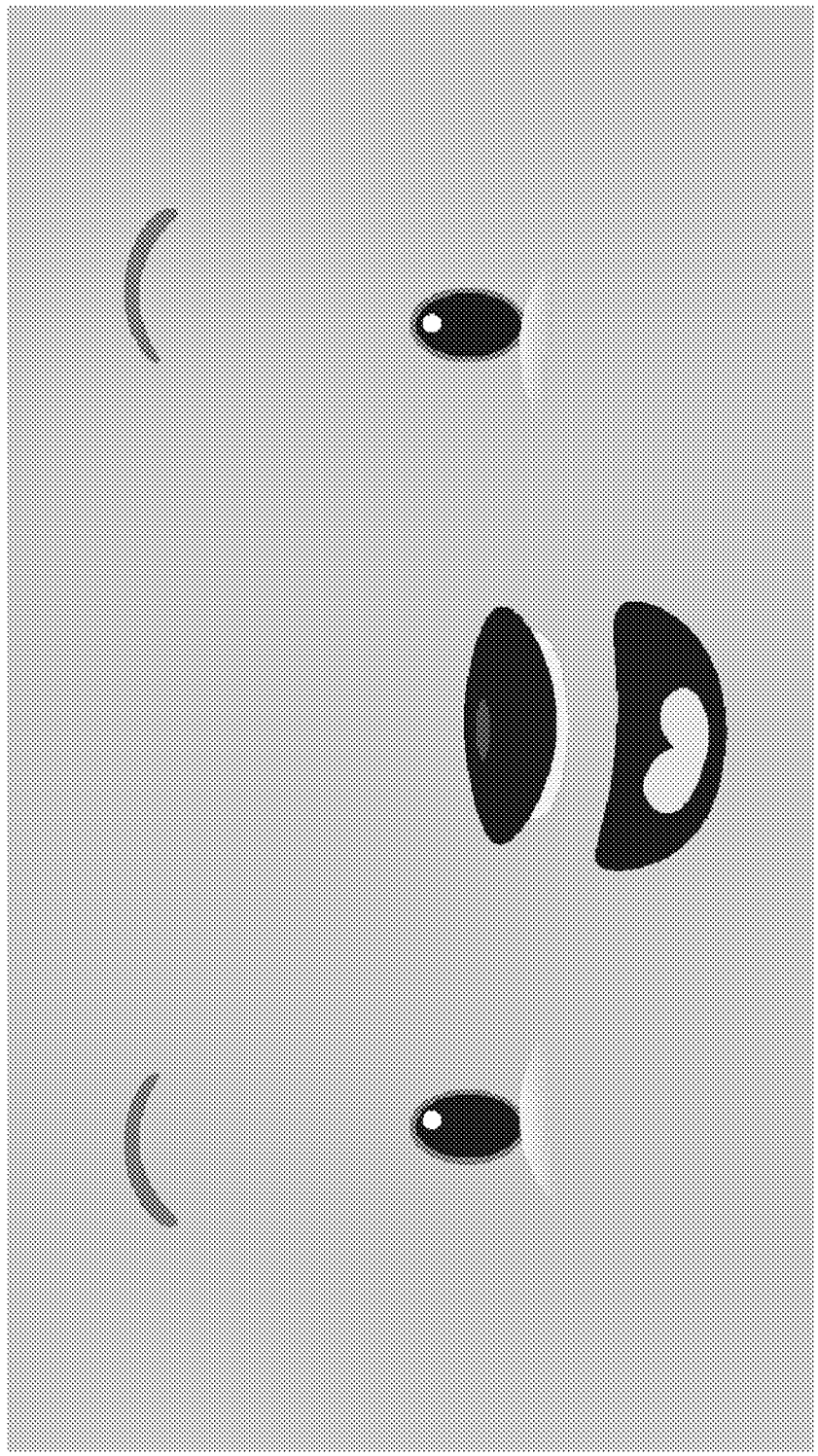
FIG. 34 is an example illustrating a view of a visual aspect of an interface for displaying information, according to some embodiments.

FIG. 34 is an exemplary interface for displaying messages to a user regarding parental controls or other information. In some embodiments, information regarding parental controls, such as time controls and access controls, is displayed on the touch screen of the tablet computer using a child-friendly, animated character, an example of which is shown in FIG. 34. In such embodiments, the use of the animated character provides an illusion that the tablet computer is a character capable of speaking to the user. The animated character is not limited to displaying information regarding parental controls but, instead, may be used in connection with the display of any information to a user.

For example, without limitation, animations of the character may: explain that a time limit is approaching or has been reached; explain that a requested content requires parental authorization; suggest a break from use of the tablet computer for exercise or other activities; remind a user of a condition required to be satisfied under an operative configuration of a parental control in order for the user to receive a requested access; or provide instruction and/or feedback in the FALS described herein. Animations may optionally be scripted as if the computer itself is imposing parental controls or other limitations on use of the tablet computer and/or access to content, relieving parents or other supervisors of the time, inconvenience, and interpersonal conflict associated with enforcing controls directly. The use of a friendly, non-threatening visual style in the design of the face, such as but not limited to as shown in FIG. 34, and in the phrasing of content spoken by the animated character, also help diffuse user emotional response to the imposition of time controls, access controls, and/or other limitations.

Curated Application Store on a Tablet PC

According to aspects of embodiments of the invention, the child-safe ecosystem for a tablet computer includes an interface for access to purchasing curated apps from a Curated App Store. In some embodiments, the Curated App Store is implemented as a device application run on the OS Overlay System of the mobile device. Depending on which UI is being used, a different application with a different interface may be used to connect with the Curated App Store. In some embodiments, the Curated App Store contains curated apps, grouped by age, gender and interest. In some embodiments, each app is selected individually certified and tested prior to its being listed in the Curated App Store. Alternatively some apps are assessed automatically based on parameter values for parameters such as age, gender, and interest assigned by the third-party app publisher. Each app may be given a content rating. In some embodiments, App Store purchases within the Kid Mode UI are limited to being transacted in virtual currency or credit, while purchases within the Parent Mode UI are transacted with real funds, virtual currency, or other credit.

According to aspects of embodiments of the invention, curated apps in the Curated App Store are subjected to filtering steps before being included in the store An app is first submitted by a developer, for example via a dedicated website that receives all apps for approval. The apps are reviewed, rated and approved prior to being included in the store for purchase. In some embodiments, the ratings and approval are associated with demographic parameters such as age, gender, and/or interest. The demographic parameters for an app are compared against the user's profile to determine suitability of the app for a particular profile. The apps are made available to a particular kid's account based on a combination of kid profile and general ratings. The benefit of having a curated app store ensures that apps are suitable to a given user type.

Content ratings for apps, which may be determined by the app publisher, by a system manager, or by a parent user, are used to assist in the curating of apps. Content ratings may include categorical content descriptions categories such as "social media" or "mature content," or may be rated against a maturity scale. Content ratings may provide (1) a visual reminder of the app and (2) a level of censorship based on a user's profile. Certain ratings may cause the app to be not included in the store because, for example, the content rating would leave no profile that remains suitable for the app. Content ratings may be given to the app by a third-party content ratings provider, which may be retrieved and stored in the device ecosystem database, which are used with the user profile to filter Curated App Store contents based on user profile.

Figure 27:
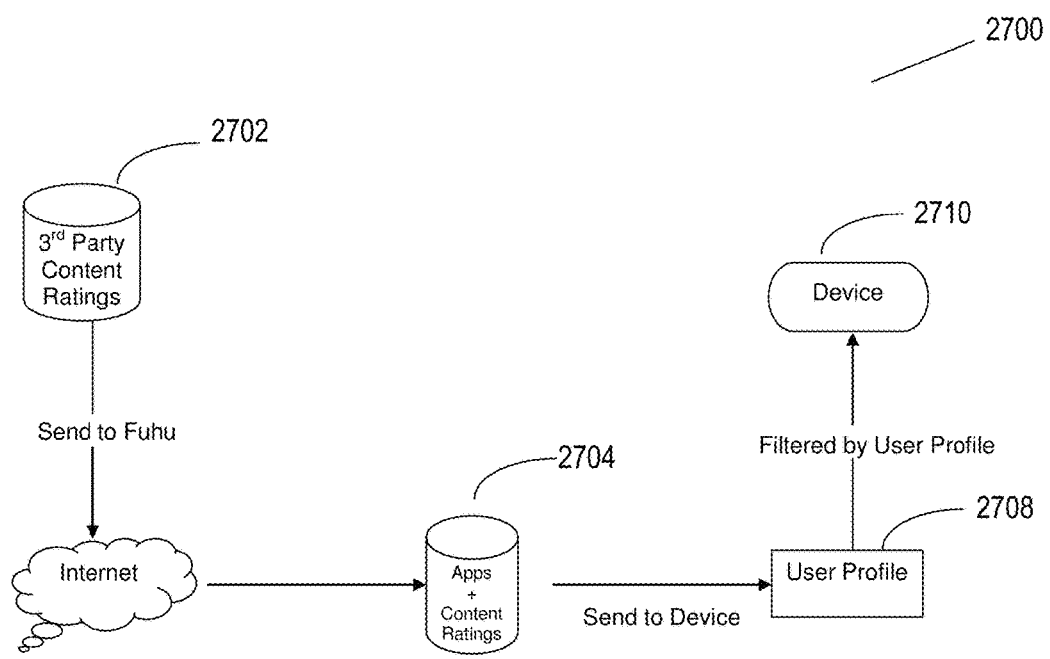
FIG. 27 is a diagram illustrating the components and steps for curating apps for a user profile, according to some embodiments.

FIG. 27 is diagram illustrating the process 2700 for curating apps for a user profile. Third-party content ratings 2702 are sent via a wide-area network, such as the internet, to a device ecosystem database 2704, such as one managed by Fuhu, Inc., for its tablet devices. The app with the content rating is sent to the device, where the content ratings for the apps are compared against user profile 2706. A determination is made by the device as to whether a particular app is suitable for the profile. If so, the app will appear as available in the Curated App Store interface, such as the interface represented by the views shown in FIGS. 28 to 32, further described below.

In addition to censorship at the purchasing stage, apps which have been purchased and released to one environment, such as Kid Mode, can be controlled or supervised from another environment, such as Parent Mode, by turning access on or off via an app management tool.

A Curated App Store further provides the advantage of a smaller inventory, which may present promotional opportunities for app developers that may be not be possible with an applications store with a larger inventory. App developers that may otherwise get buried in other app "superstores" can be featured on large app banners or as highlighted app throughout the entire app store. Unlike app superstores that typically charge developers for these types of promotional opportunities, a curated app store may give developers exposure that only a "boutique" app store with a smaller inventory can offer.

Figure 28:
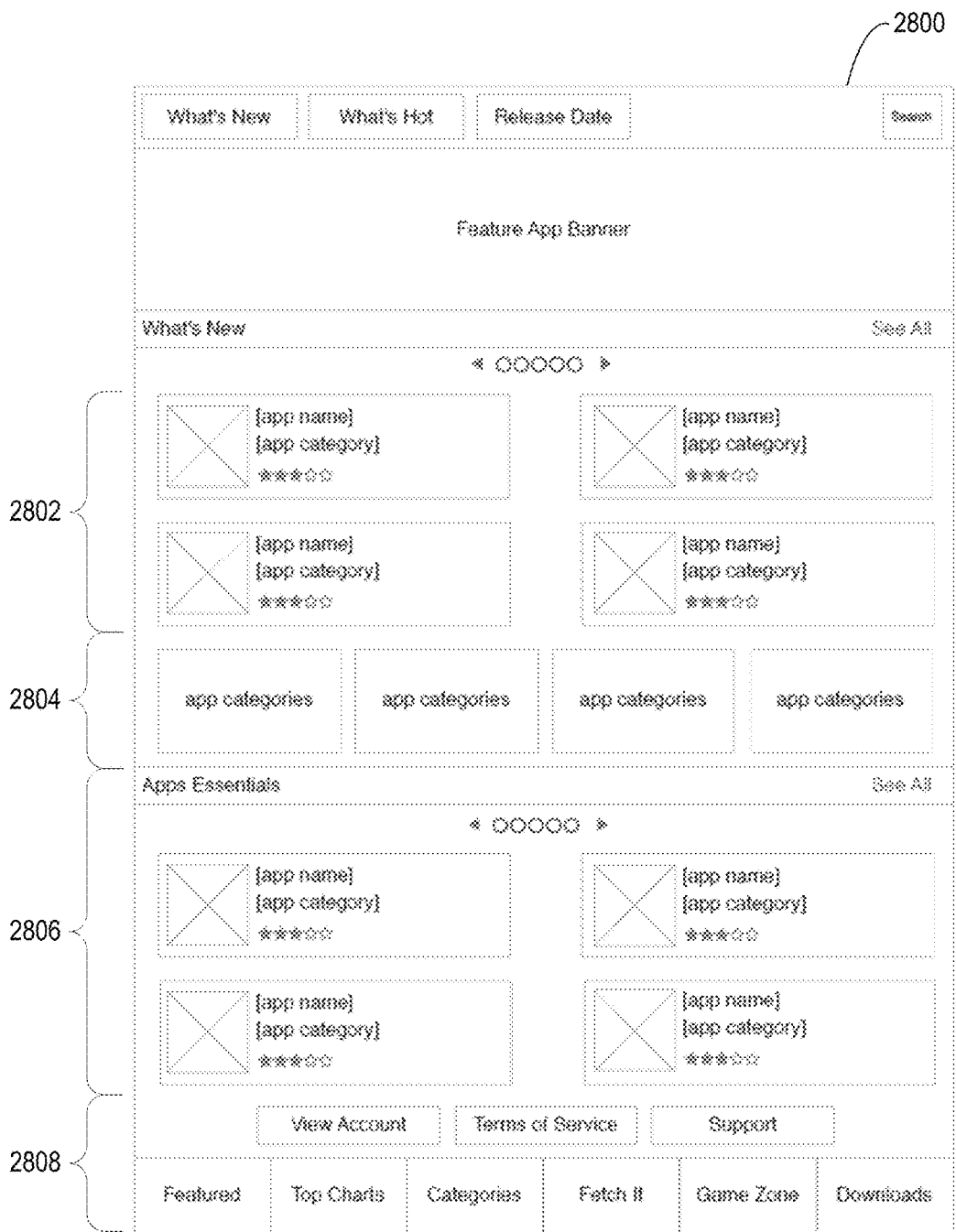
FIG. 28 is a diagram illustrating a user interface for home pages for the Curated Apps Store, according to some embodiments.
Figure 29:
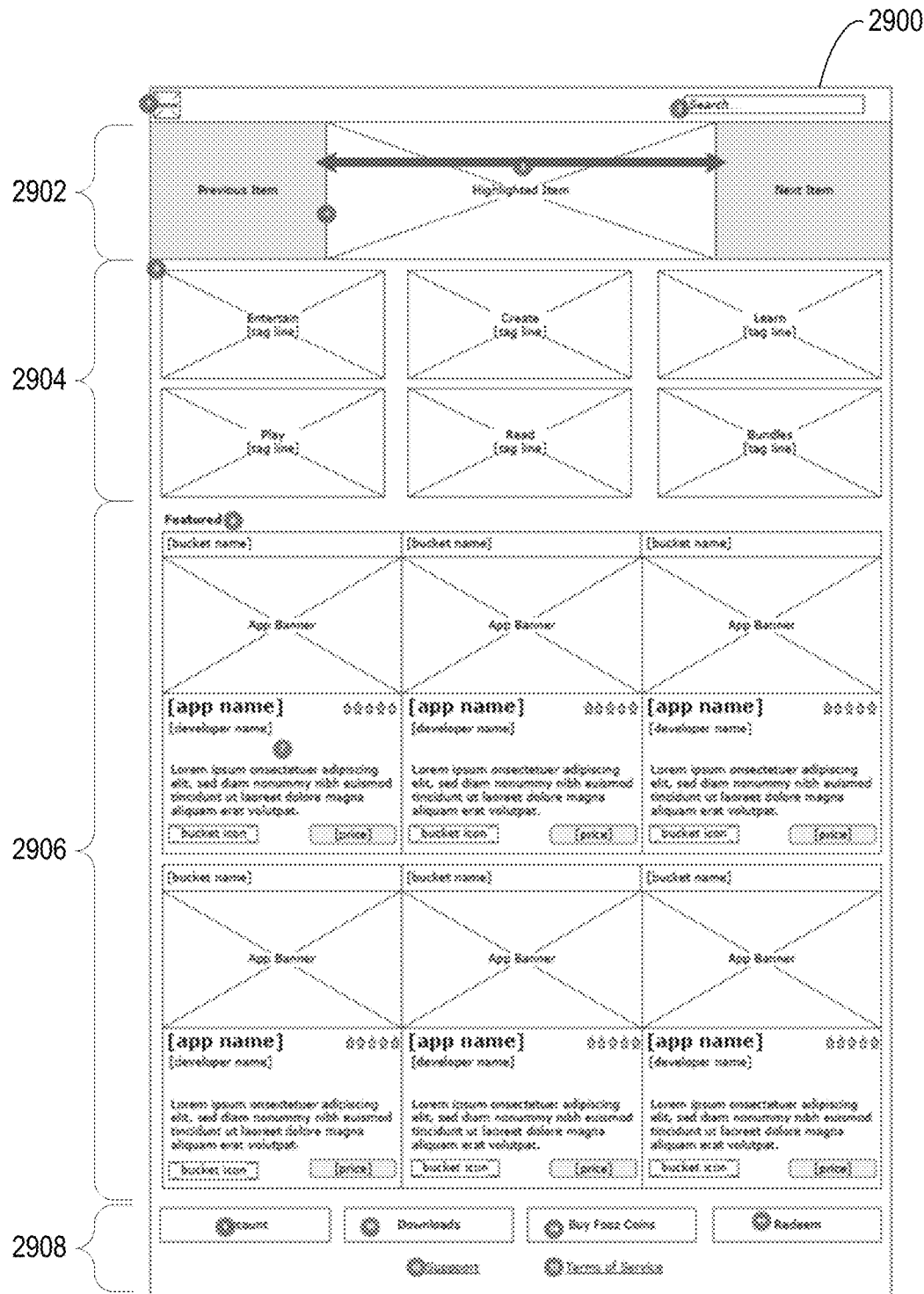
FIG. 29 is a diagram illustrating a user interface for home pages for the Curated Apps Store in another view, according to some embodiments.

FIGS. 28 to 29 are diagrams illustrating views 2800 and 2900 from the Curated App Store as provided in parent mode, according to aspects of embodiments of the invention. FIGS. 28 and 29 illustrate home pages for the Curated App Store app. FIG. 28 shows a featured app banner at the top of the interface 2800, below which is a zone 2802 for showing a grouping of apps, such as new apps. Zone 2802 is a horizontally scrollable zone independent of the other portions of the interface. Interface 2800 further includes zone 2804 for showing app categories, zone 2806 for showing another grouping of apps, such as app essentials. Zone 2808 includes icons that link to other areas of the Curated App Store.

FIG. 29 illustrates a different view or interface 2900 for the Curated App Store. Interface 2900 includes a banner 2902 featuring a horizontally scrollable and selectable banner of cover art illustrations for apps, zone 2904 for selecting categories, zone 2906 for showcasing a grouping of apps, such as featured apps, and zone 2908 for accessing other Curated App Store features, such as account settings, downloaded apps, purchasing virtual coins or credit, redeem virtual coins or credit, support, and terms of service.

Figure 30:
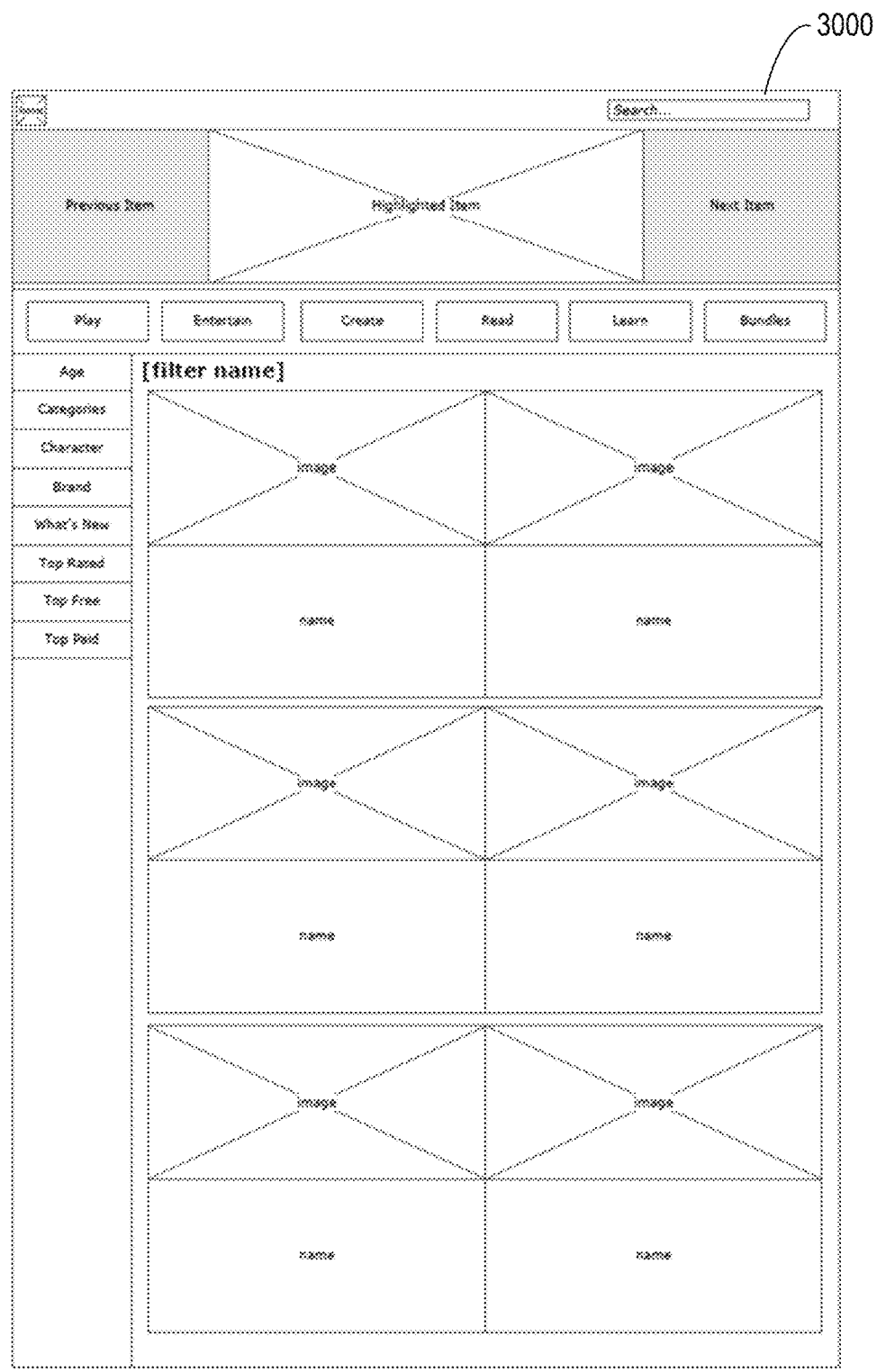
FIG. 30 is a diagram illustrating a user interface for the Curated App Store interface, according to some embodiments.

FIG. 30 illustrates one example of the Curated App Store interface 3000 as it appears in the Kid Mode operating environment when logged in under a particular kid user profile. Specifically designed for children, Curated App Store interface 3000 for Kid Mode operation has a simple, easy to use interface for children to browse for their interested apps by scrolling to different screens of apps. It is a secure system that requires password input and a prompt to seek a parent or guardian to enter the password for every purchase to eliminates unauthorized purchases from children. The payment gateway is based from the parent user account, and allows the supervisor of the parent environment to receive an email notifying him or her about purchases.

Figure 31:
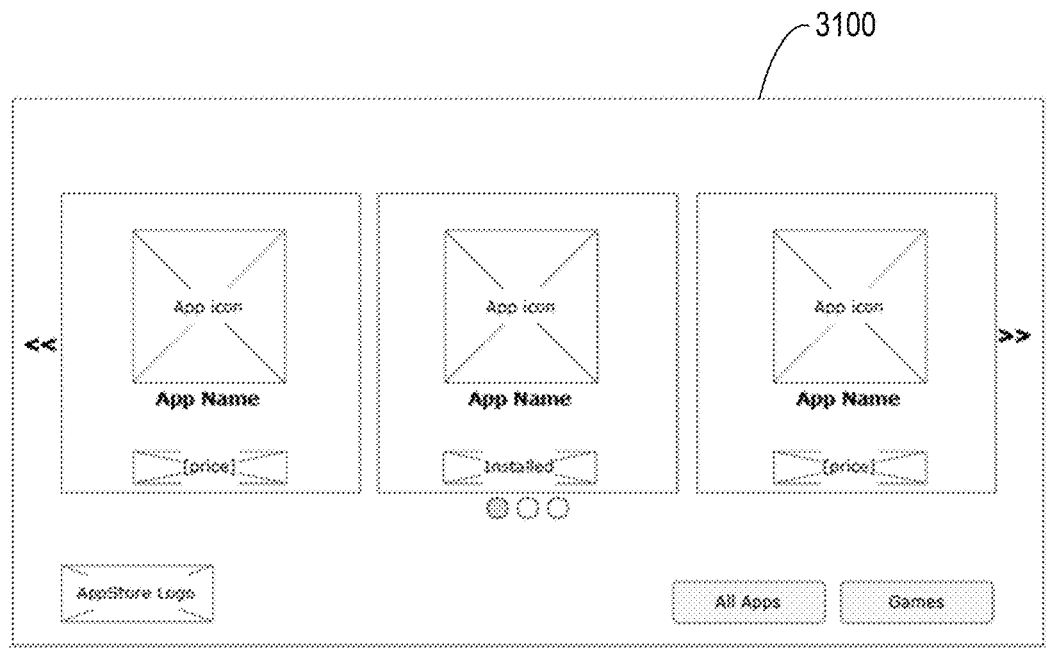
FIG. 31 is a diagram illustrating a user interface for presentation of available apps, according to some embodiments.

FIG. 31 illustrates another simple, horizontally scrollable interface 3100 for presentation of available apps when the device is operated in Kid Mode. The Curated App Store interface for Kid Mode filters a subset of all apps available to the supervisor for purchase. According to aspects of embodiments of the invention, the curated apps contain no in-app advertisements or any social network integration. Apps purchased from the Curated App Store may be made automatically available to a user in Kid Mode, or it may be further restricted based on the user's profile.

Figure 32:
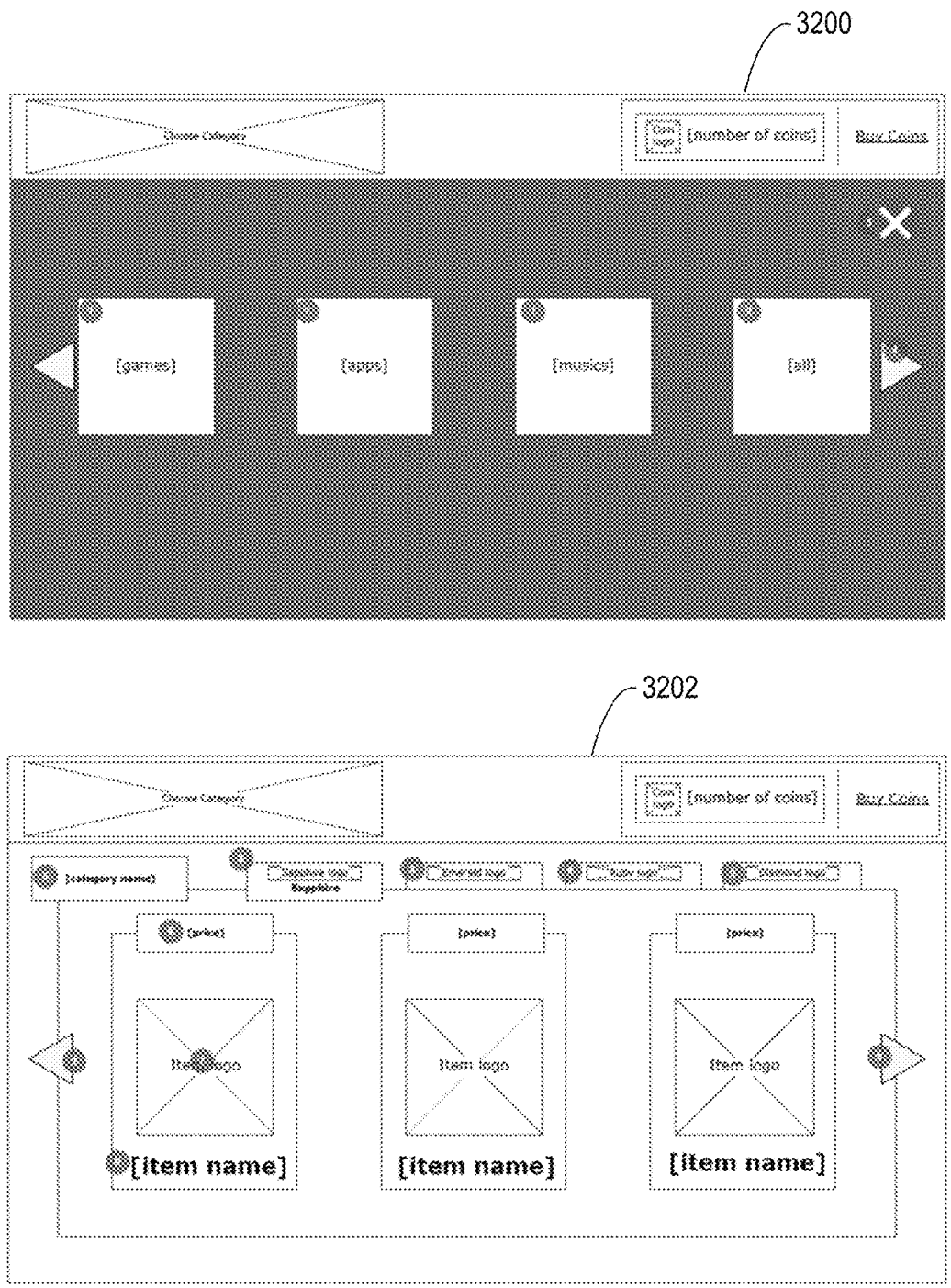
FIG. 32 is a diagram illustrating two views of a Curated App Store, according to some embodiments.

FIG. 32 shows two views 3200 and 3202 of a Curated App Rewards Store restricted to purchases with virtual currency or credit. In some embodiments, the Curated App Rewards Store does not require password entry before every purchase. As previously described, corresponding virtual currency can be obtained by purchase with real funds through the parent account's payment gateway. Once purchased, the currency can be disbursed by completing learning activities, or be rewarded to children upon progression or completion of tasks on the Chore List. Offerings in the Curated App Rewards Store may include some if not all the apps that would be available for purchase in the Curated App Store to this particular user profile. The Curated App Rewards Store provides simple categorization of games, apps, and music.

Multiple Profile Management on a Tablet PC

According to aspects of some embodiments of the invention, user profile is an account linked with a specific individual user of the electronic device. It associates the specific settings and preferences of an individual with a unique identifier, and offers the individual an option to require a password to log into the profile. This allows individuals to personalize their User Interface while providing them with privacy and security measures.

Computers have faced the problem of having multiple users share a single electronic device, which creates well-known risks: invasion of privacy, stolen personal data, unauthorized purchases, credit card information or identity theft. Tablet computers are particularly susceptible to these dangers by their very nature: they are portable and unlike smartphones they are often shared within the home or work environment.

The device ecosystem gives the option to create multiple user profiles to manage content on a tablet computer. Firstly, this allows parents of multiple children to keep each child's experience separate from the other child, which is important in early years or when the age gap is large. Secondly, parents may tailor the experience to each user profile, based on factors such as age, gender, interests, preferences. Thirdly, parents can monitor the activities of each profile thanks to the built-in parental controls, including frequency of use, preferences, location usage, system requirements, system functionality, availability of peripherals, and connectivity.

Kid Safe Browsing on Tablet PC

The Kid-Safe Browser is a web browser that runs on portable, touch-based computing devices. The Kid-Safe Browser checks all requests and compares them against white list of parent-approved URLs. If the request URL does not exist in the white list, the Kid-Safe Browser will prevent the request from completing. Other features of a Kid-Safe Browser includes an easier UI for use by young children, parental controls, security features, content blocking and filtering.

In some embodiments, running on touch-based device requires a simplified browser UI. Text entry can be a challenge, especially for younger kids. Instead of requiring text input, the Kid-Safe browser shows the white listed URLs as graphical icons. By using graphics instead of text, younger kids can quickly and easily identify their favorite websites.

Security features of the Kid-Safe Browser include parental URL management interface of the white list of URLs, with restricted access by password entry. The parental URL management interface allows adding, modifying, and updating of the white list. Downloads, popups, and other unsafe activities are blocked. Any change to the Kid-Safe Browser settings requires the parent to successfully enter their password. Kids are prevented from following links to external sites from any advertisement, marketing and promotional links that are not on the white list. The kid is prevented from entering any URL in the Kid-Safe Browser's address bar. In addition, by default, access to web search engines is blocked.

Figure 33:
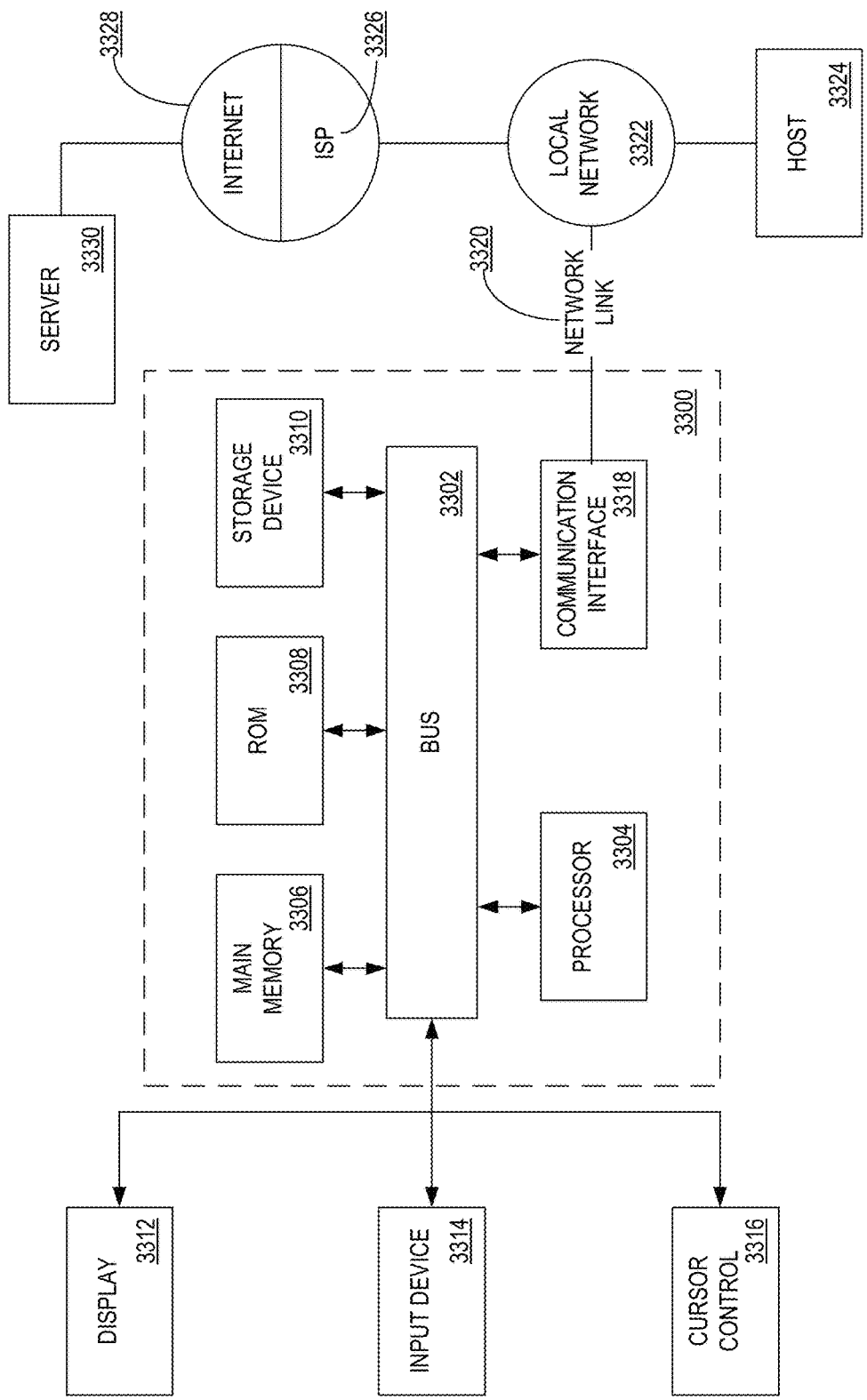
FIG. 33 is a block diagram illustrating a computer system upon which some embodiments of the invention may be implemented, according to some embodiments.

FIG. 33 is a block diagram that illustrates a computer system 3300 upon which some embodiments of the invention may be implemented. Computer system 3300 includes a bus 3302 or other communication mechanism for communicating information, and a processor 3304 coupled with bus 3302 for processing information. Computer system 3300 also includes a main memory 3306, such as a random access memory (RAM) or other dynamic storage device, coupled to bus 3302 for storing information and instructions to be executed by processor 3304. Main memory 3306 also may be used for storing temporary variables or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk, optical disk, or a flash memory device, is provided and coupled to bus 3302 for storing information and instructions.

Computer system 3300 may be coupled via bus 3302 to a display 3312, such as a cathode ray tube (CRT) or liquid crystal display (LCD), for displaying information to a computer user. An input device 3314, including alphanumeric and other keys, is coupled to bus 3302 for communicating information and command selections to processor 3304. Another type of user input device is cursor control 3316, such as a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y), that allows the device to specify positions in a plane. In some embodiments, input device 3314 is integrated into display 3312, such as a touch screen display for communication command selection to processor 3304. Another type of input device includes a video camera, a depth camera, or a 3D camera. Another type of input device includes a voice command input device, such as a microphone operatively coupled to speech interpretation module for communication command selection to processor 3304.

Some embodiments are related to the use of computer system 3300 for implementing the techniques described herein. According to some embodiments, those techniques are performed by computer system 3300 in response to processor 3304 executing one or more sequences of one or more instructions contained in main memory 3306. Such instructions may be read into main memory 3306 from another machine-readable medium, such as storage device 3310. Execution of the sequences of instructions contained in main memory 3306 causes processor 3304 to perform the process steps described herein. In alternative embodiments, hard-wired circuitry may be used in place of or in combination with software instructions to implement the invention. Thus, embodiments are not limited to any specific combination of hardware circuitry and software. In further embodiments, multiple computer systems 3300 are operatively coupled to implement the embodiments in a distributed system.

The terms "machine-readable medium" as used herein refer to any medium that participates in providing data that causes a machine to operate in a specific fashion. In an embodiment implemented using computer system 3300, various machine-readable media are involved, for example, in providing instructions to processor 3304 for execution. Such a medium may take many forms, including but not limited to storage media and transmission media. Storage media includes both non-volatile media and volatile media. Non-volatile media includes, for example, optical disks, magnetic disks, or flash memory devices, such as storage device 3310. Volatile media includes dynamic memory, such as main memory 3306. Transmission media includes coaxial cables, copper wire and fiber optics, including the wires that comprise bus 3302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, flash memory device, any other memory chip or cartridge, a carrier wave as described hereinafter, or any other medium from which a computer can read.

Various forms of machine-readable media may be involved in carrying one or more sequences of one or more instructions to processor 3304 for execution. For example, the instructions may initially be carried on a magnetic disk of a remote computer. The remote computer can load the instructions into its dynamic memory and send the instructions over a data transmission line using a modem. A modem local to computer system 3300 can receive the data on the data transmission line and use an infra-red transmitter to convert the data to an infra-red signal. An infra-red detector can receive the data carried in the infra-red signal and appropriate circuitry can place the data on bus 3302. Bus 3302 carries the data to main memory 3306, from which processor 3304 retrieves and executes the instructions. The instructions received by main memory 3306 may optionally be stored on storage device 3310 either before or after execution by processor 3304.

Computer system 3300 also includes a communication interface 3318 coupled to bus 3302. Communication interface 3318 provides a two-way data communication coupling to a network link 3320 that is connected to a local network 3322. For example, communication interface 3318 may be an integrated services digital network (ISDN) card or other internet connection device, or a modem to provide a data communication connection to a corresponding type of data transmission line. As another example, communication interface 3318 may be a local area network (LAN) card to provide a data communication connection to a compatible LAN. Wireless network links may also be implemented. In any such implementation, communication interface 3318 sends and receives electrical, electromagnetic or optical signals that carry digital data streams representing various types of information.

Network link 3320 typically provides data communication through one or more networks to other data devices. For example, network link 3320 may provide a connection through local network 3322 to a host computer 3324 or to data equipment operated by an Internet Service Provider (ISP) 3326. ISP 3326 in turn provides data communication services through the world wide packet data communication network now commonly referred to as the Internet 3328. Local network 3322 and Internet 3328 both use electrical, electromagnetic or optical signals that carry digital data streams. The signals through the various networks and the signals on network link 3320 and through communication interface 3318, which carry the digital data to and from computer system 3300, are exemplary forms of carrier waves transporting the information.

Computer system 3300 can send messages and receive data, including program code, through the network(s), network link 3320 and communication interface 3318. In the Internet example, a server 3330 might transmit a requested code for an application program through Internet 3328, ISP 3326, local network 3322 and communication interface 3318.

The received code may be executed by processor 3304 as it is received, and/or stored in storage device 3310, or other non-volatile storage for later execution. In this manner, computer system 3300 may obtain application code in the form of a carrier wave.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A tablet computer, comprising:

a touch screen display, one or more processors, a storage media, a wireless data communication interface, an operating system comprising an application framework layer and an application layer, an adaptive learning system, and an overlay system and an access control stored in the storage media and configured to be executed by the one or more processors, the overlay system comprising:

instructions for controlling access to one or more application programs in the application layer;

instructions for providing a first user interface that receives input through the touch screen display;

instructions for providing a second operating environment associated with a second user interface that receives input through the touch screen display;

instructions for requiring input of an authentication code through the touch screen display to access the first user interface from the second operating environment; and instructions for accepting, in the first user interface, a configuration of the access control configured to permit or deny a request for access in the second operating environment to one or more of a system setting, an application program, an audio file by a media player app, a video file by the media player app, a hardware resource, an internet resource, a text file, an image file, and an electronic book;

the adaptive learning system comprising:

instructions for executing at least one direct instructional component comprising at least one of a definition of a desired skill, a skill acquisition exercise, and a configuration and evaluation interface;

instructions for executing at least one indirect instructional component comprising one or more reinforcements designed to encourage one or more behaviors associated with acquisition or reinforcement of the desired skill;

instructions for executing at least one technological enabler to support at least one of the direct instructional component and the indirect instructional component;

instructions for analyzing data captured regarding the skill acquisition exercise;

instructions for determining an assessment regarding the skill acquisition exercise based on one or more predetermined criteria, wherein the one or more predetermined criteria comprise one or more of a user proficiency in the desired skill and a user learning style; and instructions for personalizing a subsequent instance of a skill acquisition exercise automatically based on the assessment.

2. The tablet computer of claim 1, wherein the access control comprises:

instructions for intercepting user input through the touch screen display in the second operating mode, instructions for determining whether a request for access through the touch screen display in the second operating environment is permitted under an operative configuration of the access control, and instructions for granting the request for access in the second operating environment only if the request for access in the second operating environment is permitted under the operative configuration of the access control.

3. The tablet computer of claim 1, wherein the access control comprises:
instructions for requiring a confirmation of compliance with one or more conditions specified in the first user interface before permitting the request for access in the second operating environment, wherein the one or more conditions specified in the first user interface comprises one or more of an event external to the tablet computer and an event in the second operating environment.

4. The tablet computer of claim 1, wherein the overlay system further comprises:
instructions for tracking a user activity in the second operating environment, and
instructions for generating a report regarding the user activity in the second operating environment,
instructions for displaying, in the first user interface, the report regarding the user activity in the second operating environment.

5. The tablet computer of claim 4, wherein the overlay system further comprises:
instructions for accepting a configuration of the access control from a different computer using the wireless data communication interface, and
instructions for communicating report regarding the user activity in the second operating environment to a different computer using the wireless data communication interface.

6. The tablet computer of claim 1, wherein the overlay system is configured to be executed by the one or more processors in the application framework layer of the operating system.

7. The tablet computer of claim 1, wherein the overlay system further comprises:
instructions for providing a first operating environment associated with the first user interface.

8. The tablet computer of claim 1, wherein the overlay system comprises instructions for executing a hypervisor configured to provide an operating platform comprising the first user interface, the second user interface, and an application space providing access to the application layer.

9. The tablet computer of claim 1, wherein the at least one indirect instructional component of the adaptive learning system is associated with a configuration of the access control requiring a confirmation of compliance with one or more conditions specified in the first user interface before a request for access in the second operating environment is permitted, wherein the one or more conditions specified in the first user interface comprises one or more of an event external to the tablet computer, an event in the second operating environment, and a performance of a skill acquisition exercise.

10. The tablet computer of claim 1, wherein the adaptive learning system further comprises:
instructions for awarding, to a user of the second operating environment, a virtual award responsive to the one or more behaviors associated with acquisition or reinforcement of the desired skill, wherein the virtual award comprises one or more of a virtual credit and a badge, and
instructions for mediating an exchange of the virtual award for one or more of a status, a usage time allotment, and an authorization to access a content.

11. The tablet computer of claim 10, wherein the adaptive learning system further comprises:
instructions for awarding, to a user of the second operating environment, a supplemental virtual award responsive to a desired award behavior, wherein the desired award behavior comprises one or more of maintaining some or all of the virtual award for a predetermined period of time and conforming with predetermined goals regarding allocation of virtual awards.

12. The tablet computer of claim 1, wherein the at least one technological enabler comprises at least one of:
instructions for capturing an input data from an input source, the input source comprising one or more of the touch screen display and an alternate input source operable to capture and transmit input data for processing by the one or more processors, wherein the alternate input source comprises one or more of a keyboard, a touch sensitive pad, a mouse, a track ball, a pen device, a joystick, a game controller, a motion detecting device, a microphone, and a camera;
instructions for capturing an offline use data reflecting use of the tablet computer in an offline mode; and
instructions for using the wireless data communication interface to automatically transmit the offline use data reflecting use of the tablet computer in an offline mode to a different computer when the tablet computer is in an online mode.

13. The tablet computer of claim 1, wherein the overlay system is configured to default to the second operating environment responsive to one or more events selected from the group comprising: a boot up of the tablet computer, an activation of the tablet computer from a dormant state, an activation of the tablet computer from a locked state, and an inactivity of the tablet computer for a predetermined period of time.

14. The tablet computer of claim 1, wherein the overlay system further comprises:
instructions for providing an e-commerce interface configured to communicate with a remote content source using the wireless data communication interface, and
instructions for mediating acquisition and installation on the tablet computer of a content from the remote content source.

15. The tablet computer of claim 1, wherein the access control comprises instructions for permitting or denying a request for access based on one or more of a time of day, a time allotment, a satisfaction of a predetermined condition, and a maximum session duration.

16. The tablet computer of claim 1, further comprising instructions for causing the touch screen display to display information using a character-based interface.

17. A tablet computer, comprising:
a touch screen display, one or more processors, a storage media, a wireless data communication interface, an operating system comprising an application framework layer and an application layer, an adaptive learning system, and an overlay system and an access control stored in the storage media and configured to be executed by the one or more processors, the overlay system comprising:
instructions for controlling access to one or more application programs in the application layer;
instructions for providing a first operating environment associated with a first user interface that receives input through the touch screen display;

instructions for providing a second operating environment associated with a second user interface that receives input through the touch screen display;
instructions for requiring input of an authentication code through the touch screen display to access the first user interface from the second operating environment; and
instructions for accepting, in the first user interface, a configuration of the access control configured to permit or deny a request for access in the second operating environment to one or more of a system setting, an application program, a hardware resource, an internet resource, a text file, an image file, and an electronic book, wherein the access control comprises:
instructions for intercepting a request for access through the touch screen display in the second operating environment,
instructions for determining whether the request for access in the second operating environment is permitted under an operative configuration of the access control, and
instructions for granting the request for access in the second operating environment only if the request for access in the second operating environment is permitted under the operative configuration of the access control;

the adaptive learning system comprising:
instructions for executing at least one direct instructional component comprising at least one of a definition of a desired skill, a skill acquisition exercise, and a configuration and evaluation interface;
instructions for executing at least one indirect instructional component comprising one or more reinforcements designed to encourage one or more behaviors associated with acquisition or reinforcement of the desired skill;
instructions for executing at least one technological enabler to support at least one of the direct instructional component and the indirect instructional component;
instructions for analyzing data captured regarding the skill acquisition exercise;
instructions for determining an assessment regarding the skill acquisition exercise based on one or more predetermined criteria, wherein the one or more predetermined criteria comprise one or more of a user proficiency in the desired skill and a user learning style; and
instructions for personalizing a subsequent instance of a skill acquisition exercise automatically based on the assessment.

\* \* \* \* \*